(12) United States Patent
Kim et al.

(10) Patent No.: US 10,986,351 B2
(45) Date of Patent: Apr. 20, 2021

(54) METHOD AND DEVICE FOR DECODING IMAGE BY USING PARTITION UNIT INCLUDING ADDITIONAL REGION

(71) Applicant: IUCF-HYU (INDUSTRY-UNIVERSITY COOPERATION FOUNDATION HANYANG UNIVERSITY), Seoul (KR)

(72) Inventors: Ki Baek Kim, Seoul (KR); Je Chang Jeong, Seoul (KR)

(73) Assignee: IUCF-HYU (INDUSTRY-UNIVERSITY COOPERATION FOUNDATION HANYANG UNIVERSITY), Seoul (KR)

(*) Notice: Subject to any disclaimer, the term of this patent is extended or adjusted under 35 U.S.C. 154(b) by 0 days.

(21) Appl. No.: 16/627,905

(22) PCT Filed: Jul. 3, 2018

(86) PCT No.: PCT/KR2018/007520
§ 371 (c)(1),
(2) Date: Dec. 31, 2019

(87) PCT Pub. No.: WO2019/009590
PCT Pub. Date: Jan. 10, 2019

(65) Prior Publication Data
US 2020/0137401 A1  Apr. 30, 2020

(30) Foreign Application Priority Data

Jul. 3, 2017 (KR) .................. 10-2017-0084517
Jul. 17, 2017 (KR) .................. 10-2017-0090638
(Continued)

(51) Int. Cl.
*H04N 19/176* (2014.01)
*H04N 19/117* (2014.01)
*H04N 19/124* (2014.01)
*H04N 19/182* (2014.01)
*H04N 19/44* (2014.01)
*H04N 19/61* (2014.01)
*H04N 19/82* (2014.01)

(52) U.S. Cl.
CPC ......... *H04N 19/176* (2014.11); *H04N 19/117* (2014.11); *H04N 19/124* (2014.11);
(Continued)

(58) Field of Classification Search
None
See application file for complete search history.

(56) References Cited

U.S. PATENT DOCUMENTS 9,554,131 B1  1/2017 Haskell et al.
2014/0247875 A1  9/2014 Hattori et al.
(Continued)

FOREIGN PATENT DOCUMENTS

KR  10-1504888 B1  3/2015
KR  10-2016-0038062 A  4/2016
(Continued)

OTHER PUBLICATIONS

International Search Report for PCT/KR2018/007520 dated Oct. 5, 2018 [PCT/ISA/210].
(Continued)

*Primary Examiner* — Lindsay J Uhl
(74) *Attorney, Agent, or Firm* — Sughrue Mion, PLLC

(57) ABSTRACT

The invention relates to a method and a device for decoding an image by means of a partition unit comprising an additional region. The method of decoding an image by means of a partition unit comprising an additional region comprises the steps of: partitioning, by reference to a syntax element acquired from a received bit stream, an encoded image, which is included in the bitstream, in at least one partition unit; define an additional region for at least one partition unit; and decoding the encoded image based on the partition
(Continued)

unit for which the additional region is defined. The invention improves the image coding efficiency.

11 Claims, 71 Drawing Sheets

(30)     Foreign Application Priority Data

| May 16, 2018 | (KR) | ........................ 10-2018-0055980 |
| Jul. 3, 2018 | (KR) | ........................ 10-2018-0076918 |
| Jul. 3, 2018 | (KR) | ........................ 10-2018-0076932 |

(52) U.S. Cl.
      CPC ........... *H04N 19/182* (2014.11); *H04N 19/44* (2014.11); *H04N 19/619* (2014.11); *H04N 19/82* (2014.11)

(56)         References Cited

U.S. PATENT DOCUMENTS

| 2014/0247883 | A1* | 9/2014 | Lee ..................... H04N 19/463 375/240.16 |
| 2014/0254679 | A1* | 9/2014 | Ramasubramonian ..................... H04N 19/577 375/240.15 |
| 2015/0023406 | A1 | 1/2015 | Lee et al. |
| 2015/0030086 | A1 | 1/2015 | Jeong et al. |
| 2015/0117538 | A1 | 4/2015 | Sjoberg et al. |
| 2015/0215631 | A1 | 7/2015 | Zhou |
| 2015/0334404 | A1 | 11/2015 | Lee et al. |
| 2016/0065974 | A1* | 3/2016 | Alshina ................ H04N 19/186 375/240.25 |
| 2018/0152702 | A1 | 5/2018 | Hattori et al. |

FOREIGN PATENT DOCUMENTS

| KR | 10-1644539 | B1 | 8/2016 | |
| KR | 10-1649284 | B1 | 8/2016 | |
| WO | 2018/066992 | A1 | 4/2018 | |
| WO | WO-2019159820 | A1 * | 8/2019 | ........... H04N 19/597 |

OTHER PUBLICATIONS

Chi Ching Chi et al., "Improving the Parallesization Efficiency of HEVC Decoding", 2012 19th IEEE International Conference on, IEEE, Sep. 30, 2012, pp. 213-216 (XP032333151).

Communication issued in European Patent Office in corresponding European Patent Application No. 18 82 8772.6 dated Feb. 11, 2021.

* cited by examiner

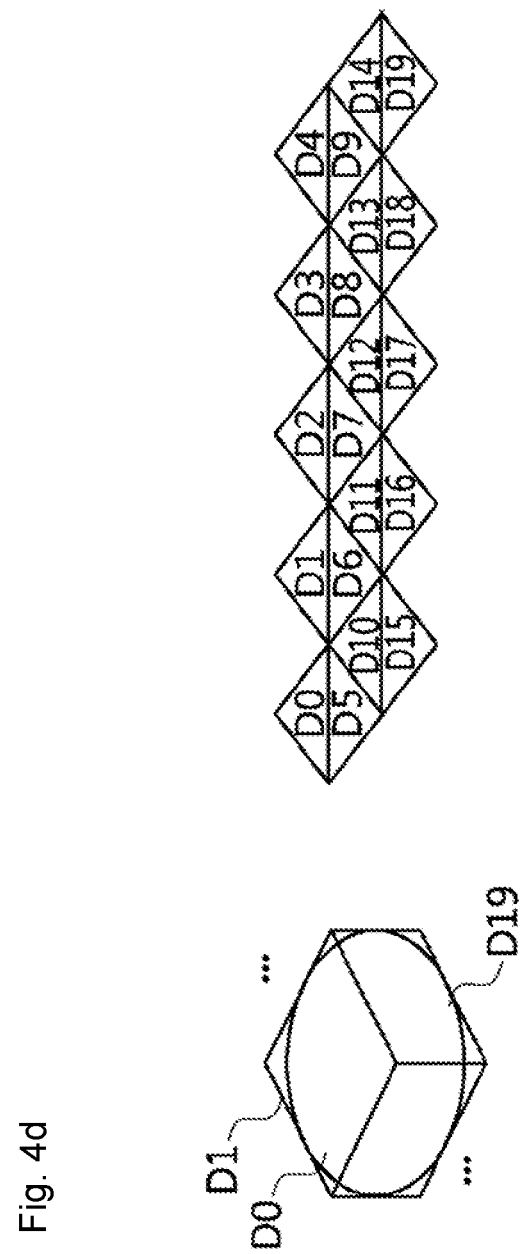

Non-compact frame packing

Compact frame packing

Non-compact frame packing

Compact frame packing

Fig. 7

| 0 | 1 | 2 |
|---|---|---|
| 3 | 4 | 5 |
| 6 | 7 | 8 |

METHOD AND DEVICE FOR DECODING IMAGE BY USING PARTITION UNIT INCLUDING ADDITIONAL REGION

CROSS REFERENCE TO RELATED APPLICATIONS

This application is a National Stage of International Application No. PCT/KR2018/007520, filed on Jul. 3, 2018, which claims priority from Korean Patent Application No. 10-2017-0084517, filed on Jul. 3, 2107, Korean Patent Application No. 10-2017-0090638, filed on Jul. 17, 2017, Korean Patent Application No. 10-2018-0055980, filed on May 16, 2018, Korean Patent Application No. 10-2018-0076918, filed on Jul. 3, 2018, and Korean Patent Application No. 10-2018-0076932, filed on Jul. 3, 2018.

TECHNICAL FIELD

The present invention relates to an image decoding method and apparatus using a division unit including an additional area. More specifically, the present invention relates to a technique for improving coding efficiency by setting additional areas up, down, left, and right for the division unit such as a tile in an image, and encoding by referring to image data in the additional area.

BACKGROUND ART

Recently, demands for multimedia data such as moving pictures is rapidly increasing on the Internet. However, the pace at which a bandwidth of a channel develops is increasing rapidly, and there is a need for a method of efficiently compressing the amount of multimedia data. ISO/ISE MPEG (Moving Picture Experts Group) and ITU-T VCEG (Video Coding Experts Group) are researching video compression standards through constant joint research.

On the other hand, when performing independent encoding on an image, since encoding is generally performed independently for each division unit including a tile, there is a problem which is not possible to refer to image data of another division unit adjacent in time and space.

Accordingly, there is a need for a method of referring to adjacent image data while maintaining parallel processing according to independent encoding as in the prior art.

In addition, an intra prediction according to an existing image encoding/decoding method configures a reference pixel using pixels nearest to a current block, but it may be not preferable to configure the reference pixel as the nearest pixel depending on a type of an image.

Therefore, there is a need for a method of improving intra prediction efficiency by configuring the reference pixel unlike the conventional method.

DISCLOSURE

Technical Problem

An object of the present invention for solving the above problems is to provide an image decoding method and apparatus using a division unit including an additional area.

Another object of the present invention for solving the above problems is to provide an image encoding method and apparatus using a division unit including an additional area.

An object of the present invention for solving the above problems is to provide an image decoding method supporting multiple reference pixel layers.

Another object of the present invention for solving the above problems is to provide an image decoding apparatus supporting multiple reference pixel layers.

Technical Solution

One aspect of the present invention for achieving the above object is to provide an image decoding method using a division unit including an additional area.

Herein, a method for decoding an image using a division unit including an additional area comprises dividing an encoded image included in a received bitstream into at least one division unit by referring to a syntax obtained from the received bitstream, setting an additional area for the at least one division unit, and decoding the encoded image based on the division unit in which the additional area is set.

Herein, the decoding of the encoded image comprises, according to information indicating a possibility of referencing included in the bitstream, determining a reference block for a current block to be decoded in the encoded image.

Herein, the reference block is a block belonging to a position overlapping with the additional area set in the division unit to which the reference block belongs.

Another aspect of the present invention for achieving the above object provides an image decoding method supporting multiple reference pixel layers.

an image decoding method supporting multiple reference pixel layers may include checking whether a bitstream supports multiple reference pixel layers, determining a reference pixel layer to be used for a current block by referring to syntax information included in the bitstream if the plurality of reference pixel layers is supported, constructing a reference pixel using a pixel belonging to the determined reference pixel layer, and performing intra prediction on the current block by using the constructed reference pixel.

Herein, after the checking of whether the plurality of reference pixel layers are supported, the method may further include checking whether the bitstream supports an adaptive reference pixel filtering method.

Herein, after checking whether the plurality of reference pixel layers is supported, if the plurality of reference pixel layers is not supported, the method may include configuring a reference pixel using the preset reference pixel layer.

Advantageous Effects

In the case of using the above-described image decoding method and apparatus using the division unit including the additional area according to the present invention, since there is a lot of image data that may be referred to, image compression efficiency may be improved.

In the case of using the above-described image decoding method and apparatus for supporting the plurality of reference pixel layers according to the present invention, since the plurality of reference pixels is used, an accuracy of intra prediction may increase.

In addition, according to the present invention, since adaptive reference pixel filtering is supported, optimal reference pixel filtering may be performed according to characteristics of an image.

In addition, there is an advantage that the compression efficiency according to image encoding/decoding may be increased.

DESCRIPTION OF DRAWINGS

FIGS. 4a to 4d are conceptual diagrams for illustrating a projection format according to an embodiment of the present invention.

FIG. 7 is an exemplary diagram in which one picture is partitioned into multiple tiles.

FIGS. 13a to 13g are exemplary diagrams for illustrating an area in which a specific division unit may be referred to.

MODE FOR INVENTION

Figure 1:
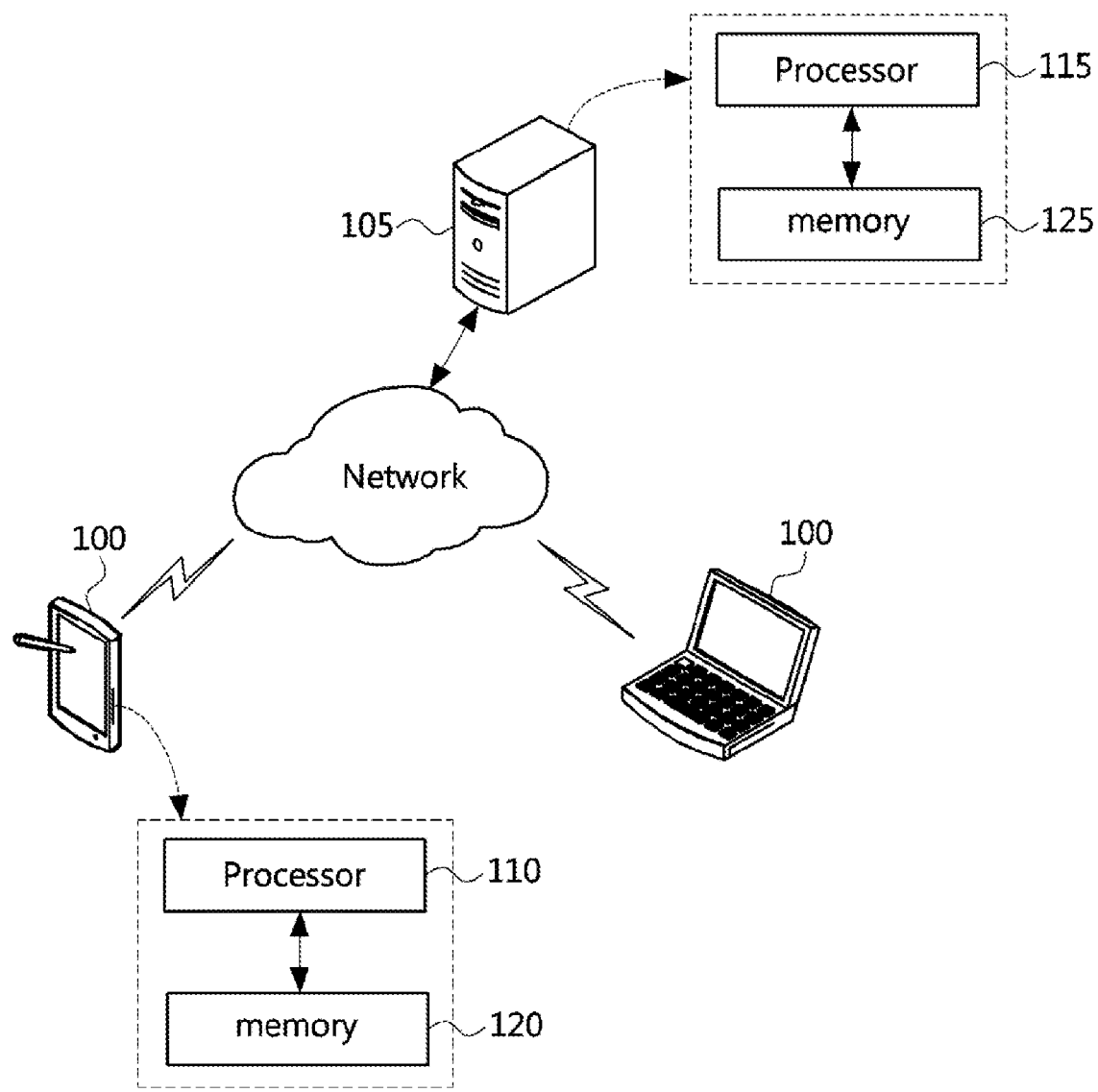
FIG. 1 is a conceptual diagram of an image encoding and decoding system according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', 'A', 'B', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of multiple items or any one of multiple terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Unless defined otherwise, all terms used herein, including technical or scientific terms, have the same meaning as commonly understood by one of ordinary skill in the art. Terms such as those defined in the commonly used dictionaries should be interpreted as having meanings consistent with those in the context of the related art. Unless expressly defined herein, they are not to be interpreted in an ideal or excessively formal sense.

In general, an image may be composed of a series of still images, and these still images may be divided into groups of pictures (GOP), and each still image may be called a picture or a frame. As a higher concept, a unit such as a GOP, a sequence, or the like may exist, and each picture may be divided into predetermined areas such as slices, tiles, blocks, and the like. In addition, one GOP may include a unit such as an I picture, a P picture, and a B picture. An I picture may mean a picture that is encoded/decoded by itself without using a reference picture, and a P picture and a B picture use a reference picture to perform a process such as motion estimation and motion compensation. This may mean a picture to be encoded/decoded by performing. In general, a P picture may use an I picture and a P picture as a reference picture, and a B picture may use an I picture and a P picture as a reference picture.

Herein, a picture referred to for encoding/decoding is referred to as a reference picture, and a referred block or pixel is referred to as a reference block and a reference pixel. In addition, the reference data may be not only pixel values in a spatial domain but also coefficient values in a frequency domain and various encoding/decoding information generated and determined during an encoding/decoding process.

The minimum unit constituting an image may be a pixel, and the number of bits used to represent one pixel is called a bit depth. In general, the bit depth may be 8 bits and may support different bit depths according to encoding settings. The bit depth may support at least one bit depth according to a color space. In addition, at least one color space may be configured according to a color format of an image. It may consist of one or more pictures with a certain size or one or more pictures with other sizes, depending on the color format. For example, in case of YCbCr 4:2:0, it may be composed of one luminance component (Y in this example) and two chrominance components (Cb/Cr in this example). In this case, a constituent ratio of the chrominance component and the luminance component may have a ratio of 1:2 in the horizontal and vertical directions. As another example, 4:4:4 may have the same configuration ratio in the horizontal and vertical directions. When the picture is composed of one or more color spaces as described above, the picture may be divided into each color space.

In the present invention, description will be made based on some color spaces (Y in this example) of some color formats (YCbCr in this example). The same or similar application (setting dependent on a specific color space) may be made for other color spaces (Cb, Cr in this example) according to the color format. However, it may also be possible to make partial differences (settings independent of a particular color space) in each color space. That is, a setting dependent on each color space has a setting proportional to or dependent on the composition ratio of each component (for example, 4:2:0, 4:2:2, 4:4:4, etc.), and a setting independent of each color space may mean having a setting of only the corresponding color space irrespective of the composition ratio of each component or independently. In the present invention, depending on the encoder/decoder, some components may have independent settings or dependent settings.

Setting information or syntax elements required in an image encoding process may be determined at the unit level of a video, sequence, picture, slice, tile, block, and the like, these may be included in a bitstream and transmitted to a decoder in a unit such as a video parameter set (VPS), a sequence parameter set (SPS), a picture parameter set (PPS), a slice header, a tile header, a block header, and the like. etc., and in the decoder, the setting information transmitted from an encoder by parsing in the same level unit may be restored and used in an image decoding process. In addition, related information may be transmitted in a bitstream, parsed, and used in the form of Supplement Enhancement Information (SEI), Metadata, or the like. Each parameter set has a unique ID value, and a lower parameter set may have an ID value of a higher parameter set to be referred to. For example, the lower parameter set may refer to information of the higher parameter set having a matching ID value among one or more higher parameter sets. A unit corresponding to a case in which any one of the examples of the various units mentioned above includes one or more other units may be referred to as a higher unit, and the included unit may be referred to as a lower unit.

The setting information generated in the unit may include a content of an independent setting for each corresponding unit, or may include a content of a setting depending on a previous, subsequent, higher unit, or the like. Herein, the dependent setting may be understood as indicating setting information of the corresponding unit as flag information (for example, as a 1-bit flag, if the value of the flag is 1, follow; if 0, do not follow) indicating that the dependent setting follows the setting of a previous, subsequent, and higher unit. In the present invention, the setting information will be described based on the example of the independent setting, but the example of adding or replacing to a content about the relationship depending on the setting information of the previous, subsequent, or higher unit of a current unit may be included.

Hereinafter, exemplary embodiments of the present invention will be described in detail with reference to the accompanying drawings.

FIG. 1 is a conceptual diagram of an image encoding and decoding system according to an embodiment of the present invention.

Referring to FIG. 1, the image encoding apparatus 105 and the decoding apparatus 100 may be a personal computer (PC), a notebook computer, a personal digital assistant (PDA), a portable multimedia player (PMP), a playstation portable (PSP), a wireless communication terminal, a smart phone, a user terminal such as a TV or the like, or a server terminal such as an application server, a service server or the like, and may include various apparatuses including a communication device such as a communication modem for performing communication with various devices or wired and wireless communication networks, memory 120, 125 for storing various programs and data for inter or intra prediction for encoding or decoding an image, processors 110, 115 for operating and controlling, etc. In addition, an image coded into a bitstream by the image encoding apparatus 105 may be transmitted to the image decoding apparatus 100 through wired and wireless networks such as the Internet, short-range wireless communication network, wireless LAN network, WiBro network, mobile communication network, etc., or through various communication interfaces such as cables, Universal Serial Bus (USB), etc., in real-time or non-real-time. Also, an image encoded in the bitstream by the image encoding apparatus 105 may be transferred from the image encoding apparatus 105 to the image decoding apparatus 100 through a computer-readable recording medium.

Figure 2:
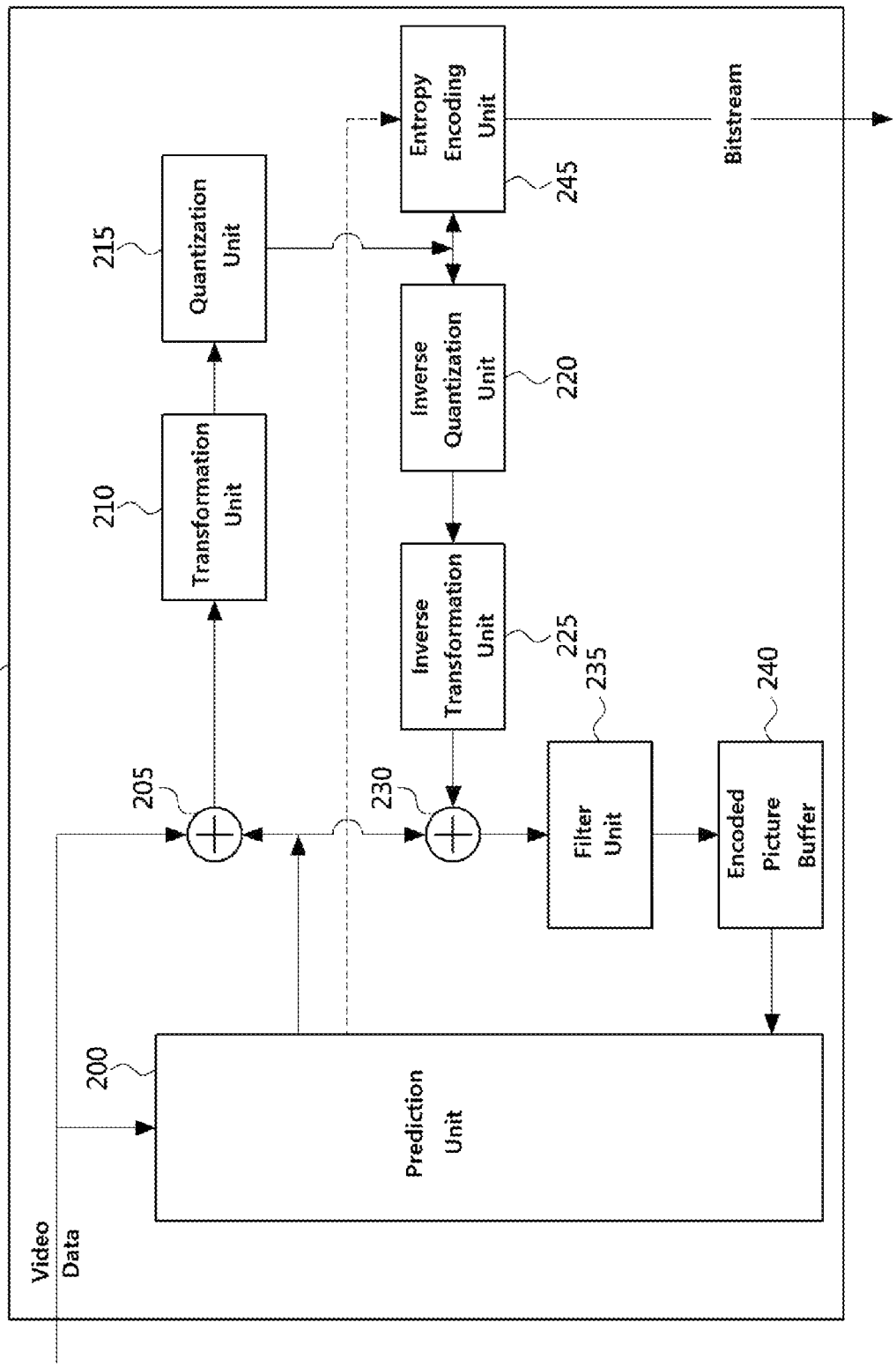
FIG. 2 is a block diagram of an image encoding apparatus according to an embodiment of the present invention.

FIG. 2 is a block diagram of an image encoding apparatus according to an embodiment of the present invention.

An image encoding apparatus 20 according to the present embodiment, as shown in FIG. 2, may include a prediction unit 200, a subtractor 205, a transformation unit 210, a quantization unit 215, an inverse quantization unit 220, an inverse transformation unit 225, an adder 230, a filter unit 235, an encoded picture buffer 240 and an entropy encoding unit 245.

The prediction unit 200 may include an intra prediction unit performing intra prediction and an inter prediction unit performing inter prediction. The intra prediction may generate a prediction block by performing spatial prediction using a pixel of block adjacent to the current block, and the inter prediction may generate a prediction block by finding a area that most matches the current block from the reference picture and performing motion compensation. Whether to use intra-prediction or inter prediction for the unit (coding unit or prediction unit) may be determined, and specific information (e.g., intra-prediction mode, motion vector, reference picture, etc.) for each prediction method may be determined. In this case, a processing unit in which the prediction is performed and a processing unit where the prediction method and concrete contents are decided may be determined according to an encoding/decoding setting. For example, the prediction method, the prediction mode, etc. may be determined in a prediction unit, and the performance of the prediction may be performed in a transformation unit.

The intra prediction unit may have a directional prediction mode such as a horizontal and a vertical mode used according to a prediction direction, and a non-directional prediction mode such as a DC and a planar mode using a method of averaging or interpolating reference pixels. An intra prediction mode candidate group may be configured through the directional and non-directional modes. One of a variety of candidates such as 35 prediction modes (33 directional+2 non-directional) or 67 prediction modes (65 directional+2 non-directional), 131 prediction modes (129 directional+2 non-directional) may be used as a candidate group.

An intra prediction unit may include a reference pixel configuration unit, a reference pixel filter unit, a reference pixel interpolation unit, a prediction mode determination unit, a prediction block generation unit, and a prediction mode encoding unit. The reference pixel configuration unit may configure a pixel belonging to a neighboring block around a current block and adjacent to the current block as a reference pixel for intra prediction. According to an encoding setting, one nearest reference pixel line may be configured as reference pixels, or another adjacent reference pixel line may be configured as the reference pixel, and multiple reference pixel lines may be configured as the reference pixel. If a part of the reference pixel is not available, the reference pixel may be generated using the available reference pixel, and if all of the reference pixel is not available, the reference pixel may be generated using a preset value (e.g., median of the range of a pixel value represented by a bit depth, etc.)

The reference pixel filter unit of the intra prediction unit may perform filtering on the reference pixel in order to reduce deterioration remaining through an encoding process. At this time, the filter used may be a low-pass filter such as a 3-tap filter [¼, ½, ¼], a 5-tap filter [2/16, 3/16, 6/16, 3/16, 2/16], etc. Whether to apply filtering or a filtering type may be determined according to encoding information (e.g., a size, a shape, an prediction mode of a block, or the like).

The reference pixel interpolation unit of the intra prediction unit may generate a pixel in a decimal unit through a linear interpolation process of a reference pixel according to a prediction mode, and an interpolation filter applied according to encoding information may be determined. In this case, the interpolation filter used may include a 4-tap cubic filter, a 4-tap Gaussian filter, a 6-tap Wiener filter, an 8-tap Kalman filter, and the like. Interpolation is generally performed separately from a process of performing the low pass filter, but the filtering process may be performed by combining the filters applied to the two processes into one.

The prediction mode determination unit of the intra prediction unit may select an optimal prediction mode among a prediction mode candidate group in consideration of an encoding cost, and the prediction block generation unit may generate a prediction block using the selected prediction mode. The prediction mode encoding unit may encode the optimal prediction mode based on a prediction value. In this case, prediction information may be adaptively encoded according to the case where the prediction value is correct or the case where the prediction value is not correct.

In the intra prediction unit, the prediction value is referred to as Most Probable Mode (MPM), and some modes among all modes belonging to a prediction mode candidate group may be configured as an MPM candidate group. The MPM candidate group may include a preset prediction mode (e.g., a DC, planar, vertical, horizontal, diagonal Mode, etc.) or a prediction mode of a spatially adjacent block (e.g., a left, top, top left, top bottom block, etc.). In addition, a mode derived from a mode previously included in the MPM candidate group (difference of +1, −1, etc. in the directional mode) may be configured as the MPM candidate group.

There may be a priority of prediction mode for configuring an MPM candidate group. The order of inclusion in the MPM candidate group may be determined according to the priority, and when the number of MPM candidates (determined according to the number of prediction mode candidates in the MPM candidate groups) is filled according to the priority, the MPM candidate group configuration may be completed. In this case, a priority may be determined in order of a prediction mode of a spatially adjacent block, a preset prediction mode, and a mode derived from a prediction mode previously included in the MPM candidate group, but other modifications are also possible.

For example, they may be included in the candidate group in the order of blocks, such as left—top—bottomleft—topright—topleft, among spatially adjacent blocks. In addition, the preset prediction mode may be included in the candidate group in the order of a DC mode—a Planar mode—a Vertical mode—a Horizontal mode. In addition, A total of six modes may be configured as the candidate group by including modes obtained by adding +1, −1, and the like to a previously included mode. In addition, a total of seven modes may be configured as the candidate group by including modes with one priority such as the prediction mode of the left block—the prediction mode of the top block—the DC mode—the Planar mode—the prediction mode of the bottom left block—the prediction mode of the top right block—the prediction mode of the top left block—(the prediction mode of the left block+1)–(the prediction mode of the left block−1)–(the prediction mode of the top block+1).

Validation may be performed on the candidate group configuration, and if it is valid, it is included in the candidate group and if it is not valid, it goes to the next candidate. If a neighboring block is located outside of a picture or belongs to a different division unit from a current block, or if a coding mode of the corresponding block is inter prediction, it may not be valid. In addition, it may not be valid even if it is not possible to refer to it (described later in the present invention)

In the case of a spatially adjacent block among the candidates, it may be composed of one block, or may be composed of several blocks (sub blocks). Therefore, in the same order as (left—top) of the candidate group configuration, the left block may be validated at any one position (for example, the bottom block among the left blocks) and then the order may be shifted to the top block, may be validate at several positions (for example, one or more sub-blocks starting downward from the top block among the left block) and then the order may be shifted to the top block, or may be decided depending on an encoding setting.

A moving motion model and a non-moving motion model may be classified in the inter prediction unit according to a motion prediction method. In the case of the moving motion model, prediction may be performed by considering only a parallel movement, and in the case of the non-moving motion model, prediction may be performed by considering not only the parallel movement but also movements such as rotation, perspective, and zoom in/out. Assuming a unidirectional prediction, one motion vector may be required for the moving motion model, but one or more motion vectors may be required for the non-moving motion model. In the case of the non-moving motion model, each motion vector may be information applied to a predetermined position of the current block, such as a top left vertex and an top right vertex of the current block, and a position of a area to be predicted of the current block may be acquired in a pixel unit or a sub block unit through the corresponding motion vector. The inter prediction unit may be commonly applied to some processes described below according to the motion model, and some processes may be individually applied.

The inter prediction unit may include a reference picture configuration unit, a motion estimation unit, a motion compensation unit, a motion information determination unit, and a motion information encoding unit. In the reference picture configuration unit, pictures that are encoded before or after the current picture may be included in the reference picture lists L0 and L1. A prediction block may be obtained from a reference picture included in the reference picture list, and the current picture may also be configured as a reference picture and included in at least one of the reference picture lists according to an encoding setting.

In the inter prediction unit, the reference picture configuration unit may include a reference picture interpolation unit, and may perform an interpolation process for a fractional pixel according to interpolation precision. For example, an 8-tap DCT based interpolation filter may be applied for a luminance component, and a 4-tap DCT based interpolation filter may be applied for a chrominance component.

In the inter prediction unit, the motion estimation unit searches a block having a high correlation with the current block through a reference picture, and various methods such as a full search-based block matching algorithm (FBMA) and a three step search (TSS) may be used. In addition, the motion compensation unit means a process of obtaining a prediction block through a motion estimation process.

In the inter prediction unit, the motion information determination unit may perform a process for selecting the optimal motion information of the current block, and the motion information may be encoded by a motion information encoding mode such as a skip mode, a merge mode, or a competition mode. The mode may be configured by combining supported modes according to a motion model. A skip mode (moving), a skip mode (non-moving), a merge mode (moving), a merge mode (non-moving), a competition mode (moving), and a competitive mode (non-moving) may be an example of that. Some of the modes may be included in the candidate group according to an encoding setting.

In the motion information encoding mode, a prediction value of motion information (motion vector, reference picture, prediction direction, etc.) of the current block may be obtained from at least one candidate block, and optimal candidate selection information may occur when two or more candidate blocks are supported. In the skip mode (no residual signal) and the merge mode (the residual signal present), the prediction value may be used as the motion information of the current block, and in the contention mode, difference information between the motion information of the current block and the prediction value may be generated.

A candidate group for a prediction value of the motion information of a current block may be adaptive and have various configurations according to a motion information encoding mode. Motion information of a block spatially adjacent to the current block (e.g., left, top, top left, top right, bottom left block, etc.) may be included in the candidate group. In addition, motion information of temporally adjacent blocks (e.g., left, right, top bottom, top right, left, bottom, bottom, and the like, including blocks in the other image corresponding to or corresponding to the current block <center>) may be included to the candidate group. In addition, mixed motion information of a spatial candidate and a temporal candidate (for example, information obtained by averaging, a median value, etc. through motion information of a spatially adjacent block and motion information of a temporally adjacent block, the motion information may be included on a current block or in a sub-block unit of the current block) may be included in the candidate group.

There may be a priority for constructing a prediction value candidate group of the motion information. The order of inclusion in the configuration of the prediction value candidate group may be determined according to a priority, and if the number of the prediction value candidates is determined according to the priority (determined according to an encoding mode of motion information), the configuration of the prediction value candidate group may be completed. In this case, the priority may be determined in order of motion information of spatially adjacent blocks, motion information of temporally adjacent blocks, and mixed motion information of spatial candidates and temporal candidates, but other modifications are possible.

For example, spatially adjacent blocks may be included in the candidate group in the order of left—top—top right—bottom left—top left block, and so on, and temporally adjacent blocks may be included in the order of bottom right—middle—right—bottom block.

Validation may be performed on the candidate group configuration, and if it is valid, it is included in the candidate group and if it is not valid, it goes to the next candidate. If a neighboring block is located outside of a picture or belongs to a different division unit from a current block, or if a coding mode of the corresponding block is inter prediction, it may not be valid. In addition, it may not be valid even if it is not possible to refer to it (described later in the present invention)

Adjacent blocks in terms of spatial or temporality among the candidates, may be composed of one block, or may be composed of several blocks (sub blocks). Therefore, in the same order as (left-top) of a configuration of a spatial candidate group, the left block is validated at any one position (for example, the bottom block among the left blocks), and then the order is shifted to the top block, or the left block is validated at several positions (e.g., one or more sub-blocks located in the downward direction starting from the top block among the left blocks) and then the order may be shifted to top block. In addition, in the same order as (middle-right) of a configuration of a temporal candidate group, the middle block may be validated at any one position and then the order may be shifted to the right block. Alternatively, the middle block may be validated at several positions (e.g., one or more sub-blocks starting from a predetermined position block <2,2> and located in a predetermined order such as <3,3>, <2,3>, etc.) and then the order may be shifted to the bottom block, or may be decided depending on an encoding setting.

The subtractor 205 subtracts a prediction block from a current block to generate a residual block. That is, the subtractor 205 calculates a difference between a pixel value of each pixel of the current block to be encoded and a predicted pixel value of each pixel of a prediction block generated by the prediction unit to generate a residual block that is a residual signal in a form of a block.

The converter 210 converts a residual block into a frequency domain to convert each pixel value of the residual block into a frequency coefficient. Herein, in the transform unit 210, the residual signal may be transformed into the frequency domain using various transformation techniques for transforming an image signal of a spatial axis into a frequency axis such as a Hadamard transform, a discrete cosine transform based transform (DCT Based Transform), a discrete sine transform based transform (DST Based Transform), the Karunen Rube transform based transform (KLT Based), and the residual signal transformed into the frequency domain becomes a frequency coefficient. The transform can be transformed by a one-dimensional transform matrix. Each transformation matrix may be adaptively used in horizontal and vertical units. For example, in the case of intra prediction, when the prediction mode is horizontal, a DCT based transform matrix may be used in the vertical direction, and a DST based transform matrix may be used in the horizontal direction. When the prediction mode is vertical, a DCT based transformation matrix may be used in the horizontal direction, and a DST based transformation matrix may be used in the vertical direction.

The quantization unit 215 quantizes a residual block having the frequency coefficient transformed by the transformation unit 210 into a frequency domain. Herein, the quantization unit 215 may quantize the transformed residual block using dead zone uniform threshold quantization, a quantization weighted matrix, or an improved quantization technique. This may include one or more quantization techniques as candidates and may be determined by a coding mode, prediction mode information, and the like.

The entropy encoding 245 scans the generated quantization frequency coefficient sequence according to various scan methods to generate a quantization coefficient sequence, and outputs the encoded quantization coefficient sequence by using an entropy encoding technique, etc. The scan pattern may be set to one of various patterns such as zigzag, diagonal lines, and rasters. In addition, encoded data including encoded information transmitted from each component may be generated and output as a bitstream.

The inverse quantization unit 220 inversely quantizes the residual block quantized by the quantization unit 215. That is, the inverse quantization unit 220 inversely quantizes the quantized frequency coefficient sequence to generate a residual block having the frequency coefficient.

The inverse transform unit 225 inversely transforms the residual block inversely quantized by the inverse quantization unit 220. That is, the inverse transformation unit 225 inversely transforms frequency coefficients of the inversely quantized residual block to generate a residual block having a pixel value, that is, a reconstructed residual block. Here, the inverse transform unit 225 may perform inverse transform by using a transformation method used in the transform unit 210 as the inverse.

The adder 230 reconstructs the current block by adding the prediction block predicted by the prediction unit 200 and the residual block reconstructed by the inverse transform unit 225. The reconstructed current block may be stored in the decoded picture buffer 240 as a reference picture (or a reference block) and used as a reference picture when encoding the next block of the current block, another block in the future, or another picture.

The filter unit 235 may include one or more post-processing filter processes such as a deblocking filter, a sample adaptive offset (SAO), an adaptive loop filter (ALF), and the like. The deblocking filter may remove block distortion generated at the boundary between blocks in the reconstructed picture. The ALF may perform filtering based on a value obtained by comparing the reconstructed image with the original image after the block is filtered through the deblocking filter. The SAO restores an offset difference from the original image on the basis of a pixel with respect to the residual block to which the deblocking filter is applied, and may be applied in the form of a band offset or an edge offset. Such a post-processing filter may be applied to the reconstructed picture or block.

The deblocking filter in the filter unit may be applied based on a pixel included in several columns or rows included in both blocks based on a block boundary. The block may be applied to a boundary of an encoding block, a prediction block, and a transform block, and may be limited to blocks having a predetermined minimum size (for example, 8×8).

In filtering, whether or not filtering is applied and filtering strength may be determined in consideration of characteristics of the block boundary, and may be determined as one of candidates such as strong filtering, intermediate filtering, and weak filtering. In addition, when a block boundary corresponds to a boundary of a division unit, it is determined whether to apply an in-loop filter at the boundary of the division unit.

In the filter unit, SAO may be applied based on a difference between the reconstructed image and the original image. An edge offset and a band offset may be supported as the type of offset, and one of the offsets may be selected according to an image characteristic to perform filtering. In addition, the offset-related information may be encoded on the basis of a block and may be encoded through a prediction value thereof. In this case, relevant information may be adaptively encoded according to the case where the prediction value is correct or the case where the prediction value is not correct. The prediction value may be offset information of an adjacent block (e.g., left, top, top left, top right block, etc.), and selection information on which block to obtain offset information may be generated.

Validation may be performed on the candidate group configuration, and if it is valid, it is included in the candidate group and if it is not valid, it goes to the next candidate. If a neighboring block is located outside of a picture or belongs to a different division unit from a current block, it may not be valid. In addition, it may not be valid even if it is not possible to refer to it (described later in the present invention)

The decoded picture buffer 240 may store a reconstructed block or picture by the filter unit 235. The reconstructed block or picture stored in the decoded picture buffer 240 may be provided to the prediction unit 200 that performs intra prediction or inter prediction.

Figure 3:
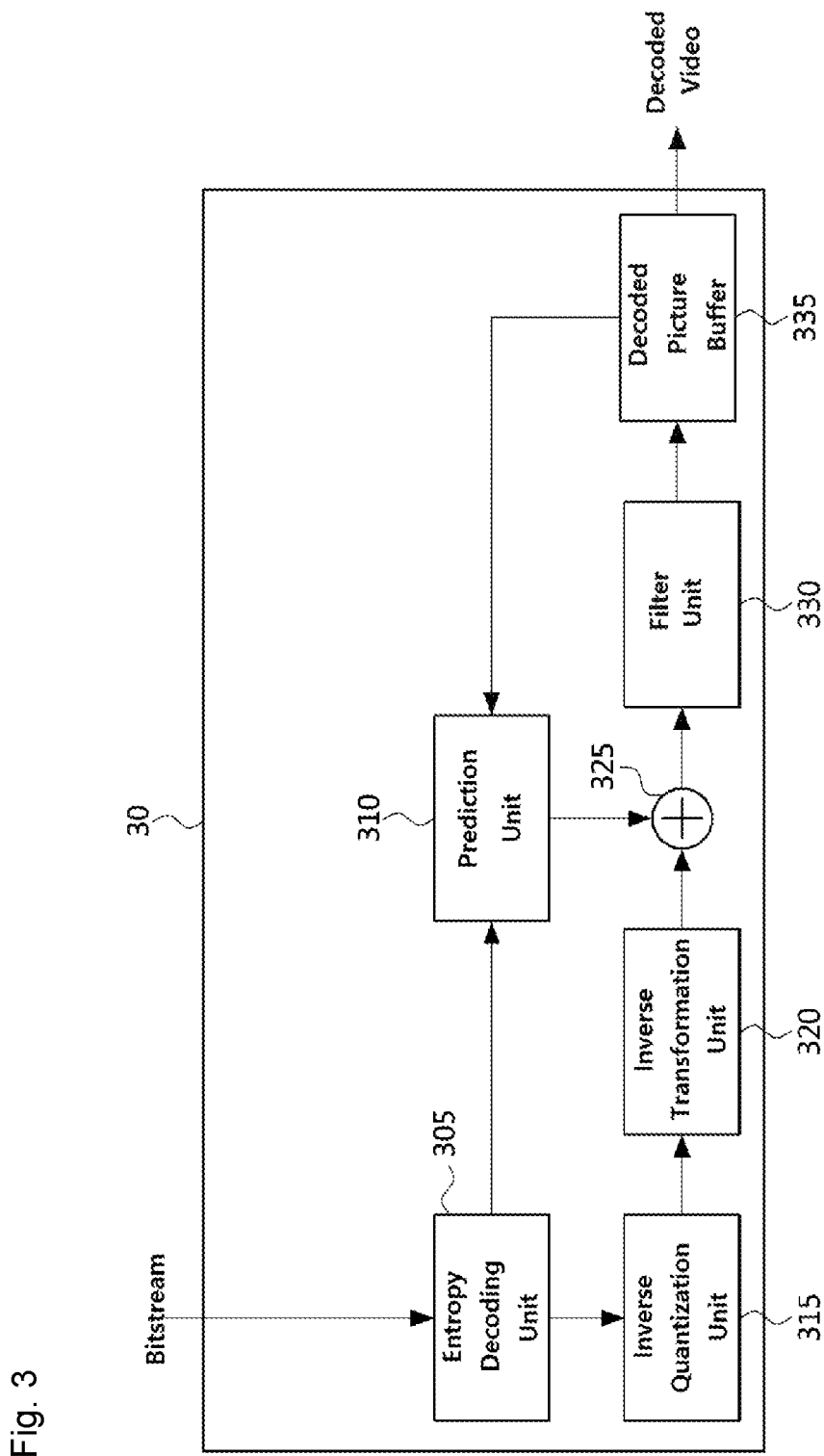
FIG. 3 is a block diagram of an image decoding apparatus according to an embodiment of the present invention.

FIG. 3 is a block diagram of an image decoding apparatus according to an embodiment of the present invention.

Referring to FIG. 3, the image decoding apparatus 30 may include an encoded picture buffer 300, an entropy decoding unit 305, a prediction unit 310, an inverse quantization unit 315, an inverse transformation unit 320, and an adder/subtractor 325, a filter 330, and a decoded picture buffer 335.

In addition, the prediction unit 310 may be configured to include an intra prediction module and an inter prediction module.

First, when an image bitstream transmitted from the image encoding apparatus 20 is received, the image bitstream may be stored in the encoded picture buffer 300.

The entropy decoding unit 305 may decode the bitstream to generate quantized coefficients, motion vectors, and other syntax. The generated data may be transferred to the prediction unit 310.

The prediction unit 310 may generate a prediction block based on the data transferred from the entropy decoding unit 305. In this case, the reference picture list using a default construction technique may be constructed based on the reference picture stored in the decoded picture buffer 335.

The intra prediction unit may include a reference pixel configuration unit, a reference pixel filter unit, a reference pixel interpolation unit, a prediction block generation unit, and a prediction mode decoding unit. In addition, the inter prediction unit may include a reference picture configuration unit, a motion compensation unit, and a motion information decoding unit, and some of the processes may be performed in the same manner as an encoder and some may be reversed.

The inverse quantization unit 315 may inversely quantize the quantized transform coefficients provided in the bitstream and decoded by the entropy decoding unit 305.

The inverse transform unit 320 may generate a residual block by applying inverse transform techniques of inverse DCT, inverse integer transforms, or the like to a transform coefficient.

In this case, the inverse quantization unit 315 and the inverse transform unit 320 may perform inversely the processes performed by the transform unit 210 and the quantization unit 215 of the image encoding apparatus 20 described above, and may be implemented in various ways. For example, the same process and inverse transform shared with the transform unit 210 and the quantization unit 215 may be used, and information about the transform and quantization process from the image encoding apparatus 20 (e.g., transform size, transform shape, quantization type, etc.) to reverse the transform and quantization processes.

The residual block that has undergone inverse quantization and inverse transformation may be added to the prediction block derived by the prediction unit 310 to generate an image block reconstructed. This addition can be made by the adder and subtractor 325.

The filter 330 may apply a deblocking filter to the reconstructed image block to remove blocking if necessary, and may further use other loop filters to improve video quality before and after the decoding process.

The image block that has been reconstructed and filtered may be stored in the decoded picture buffer 335.

Although not shown in the drawing, the image decoding apparatus 30 may further include a division unit. In this case, the division unit may include a picture division unit and a block division unit. The division unit may be easily understood by a person skilled in the art in the same or corresponding configuration as that of an image encoding apparatus of FIG. 2, and thus a detailed description thereof will be omitted.

FIGS. 4a to 4d are conceptual diagrams for illustrating a projection format according to an embodiment of the present invention.

Figure 4A:
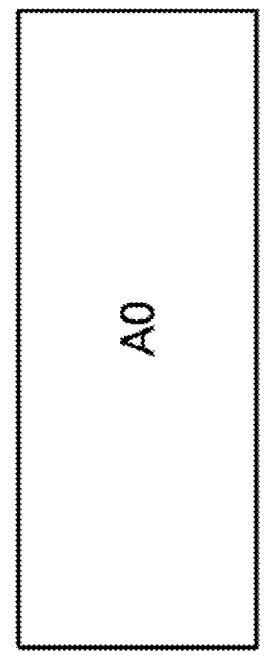
Figure 4A:
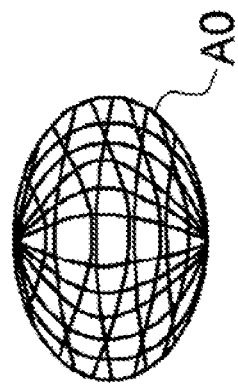
Figure 4B:
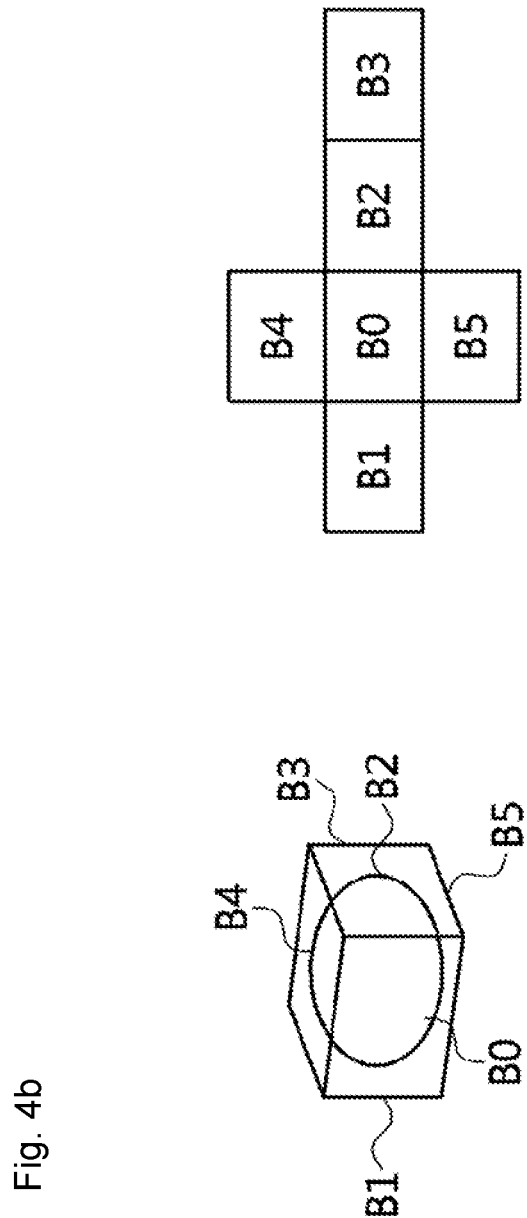
Figure 4C:
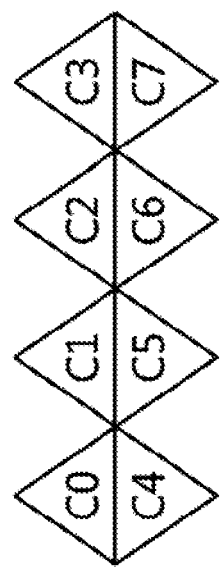
Figure 4C:
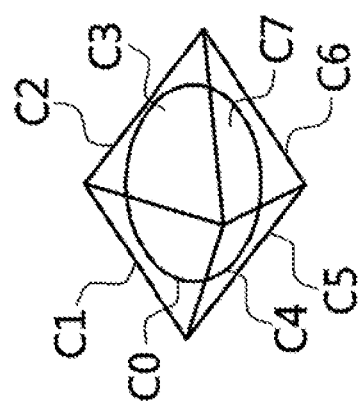

FIG. 4a illustrates an ERP (Equi-Rectangular Projection) format in which a 360-degree image is projected onto a two-dimensional plane. FIG. 4b illustrates a CMP (Cube-Map Projection) format in which a 360-degree image is projected onto a cube. FIG. 4c illustrates an OHP (OctaHedron Projection) format in which a 360-degree image is projected on an octahedron. FIG. 4d illustrates an ISP (IcoSahedral Projection) format in which a 360-degree image is projected on a polyhedron. However, the present invention is not limited thereto, and various projection formats may be used. For example, Trunked Square Pyramid Projection (TSP), Segmented Sphere Projection (SSP), and the like may also be used. FIGS. 4a to 4d illustrates an example in which a left side is converted into a 3D model and a right side is converted into a 2D space through a projection process. The figure projected in two dimensions may be composed of one or more surfaces, and each surface may have a shape of a circle, a triangle, a rectangle, or the like.

FIGS. 4a to 4d, the projection format may have one surface (e.g., ERP) or multiple surfaces (e.g., CMP, OHP, ISP, etc.). In addition, each surface may be divided into a square and a triangle. The division may be an example of the type, characteristic, and the like of the image in the present invention, which may be applied when the encoding/decoding setting according to the projection format is different. For example, the type of the image may be a 360-degree image, and a characteristic of the image may be one of the above classifications (e.g., each projection format, a projection format of one surface or multiple surfaces, a projection format in which the surface is rectangular or not), and the like.

The two-dimensional plane coordinate system (for example, (i, j)) may be defined on each surface of the two-dimensional projection image, and a characteristic of the coordinate system may vary depending on the projection format and the position of each surface. In the case of ERP, one two-dimensional planar coordinate system and other projection formats may have multiple two-dimensional planar coordinate systems according to the number of surfaces. In this case, the coordinate system may be represented by (k, i, j), where k may be index information of each surface.

In the present invention, for convenience of description, a description will be given focusing on the case where a surface is rectangular. The number of surfaces projected in two dimensions may be one (e.g., Equirectangular Projection, that is, the case of that the image is the same as one surface) to two or more (e.g., Cube Map Projection, etc.).

Figure 5A:
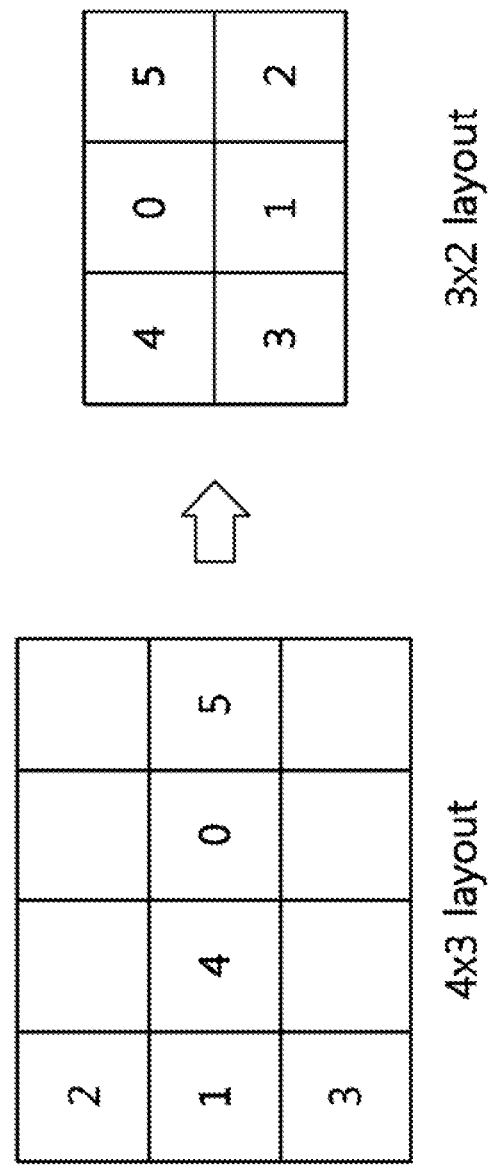
FIGS. 5a to 5c are conceptual diagrams for illustrating a surface arrangement according to an embodiment of the present invention.
Figure 5B:
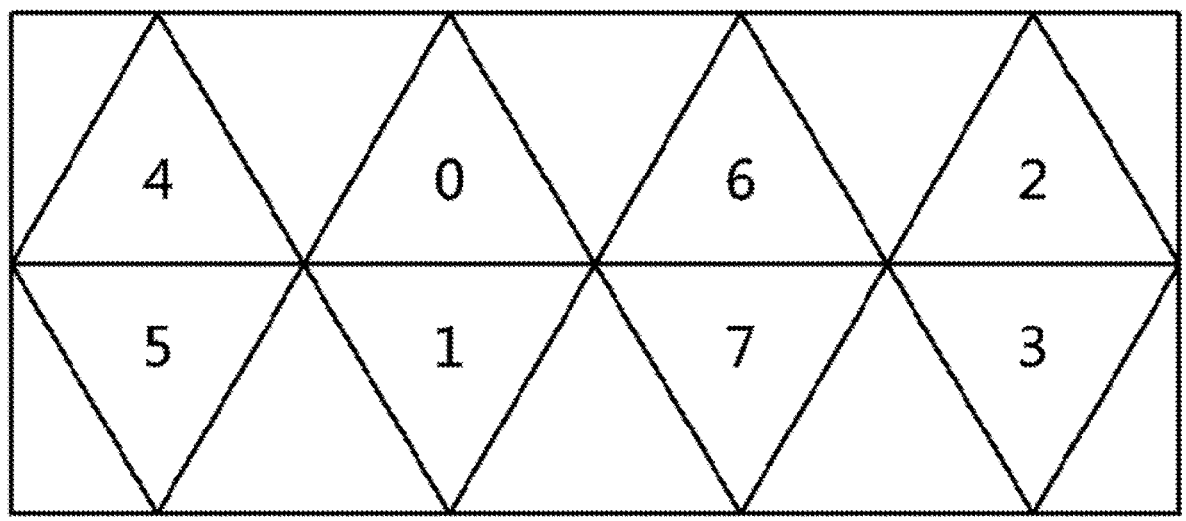
Figure 5B:
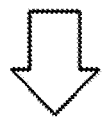
Figure 5B:
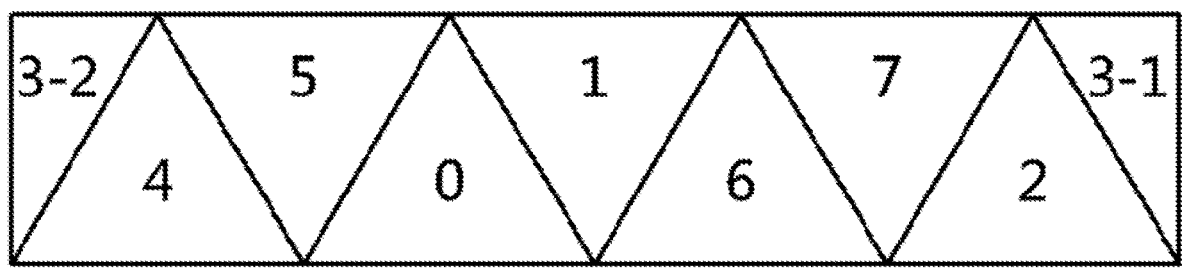
Figure 5C:
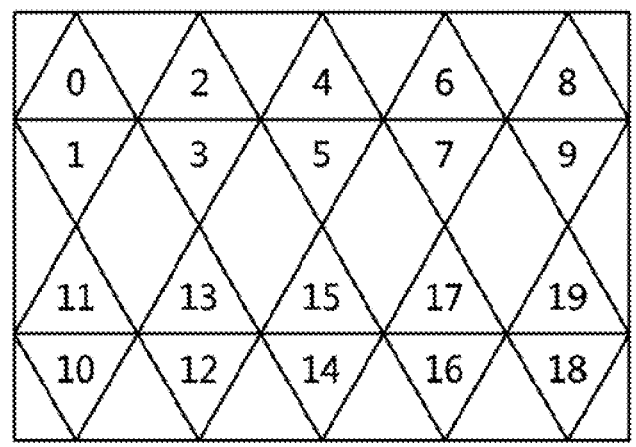
Figure 5C:
Figure 5C:
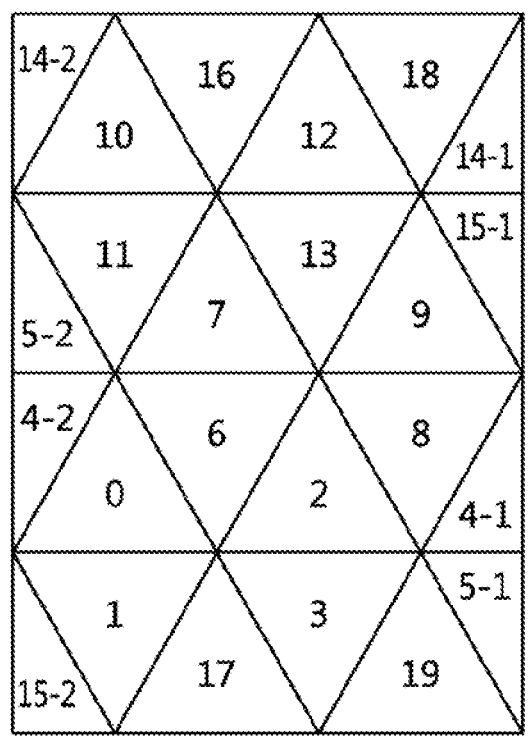

FIGS. 5a to 5c are conceptual diagrams for illustrating a surface arrangement according to an embodiment of the present invention.

In a projection format in which a three-dimensional image is projected in two dimensions, it is necessary to determine a surface arrangement. In this case, the surface arrangement may be arranged to maintain image continuity in three-dimensional space, and even if the image continuity between some adjacent surfaces is impaired, the surface may be arranged as closely as possible. In addition, when placing the surface, some of the surface may be arranged by rotating at a certain angle (0, 90, 180, 270 degrees, etc.).

Referring to FIG. 5a, an example of a surface arrangement for a CMP format may be seen. When arranged to maintain image continuity in three-dimensional space, a 4×3 layout may be used in which four surfaces are arranged horizontally and one surface is arranged up and down as shown in the left figure. In addition, as shown in the figure on the right, even if the image continuity between some adjacent surfaces is damaged, a 3×2 layout in which the surfaces are arranged so that there is no empty space in the two-dimensional plane may be used.

Referring to FIG. 5b, a surface arrangement of the OHP format may be confirmed. When arranged to maintain image continuity in the three-dimensional space, it may be as shown in the upper picture. In this case, even if the image continuity is partially impaired, the surface may be arranged as shown in the figure below so that there is no empty space in the projected two-dimensional space.

Referring to FIG. 5c, it may be seen that a surface arrangement for the ISP format. As shown in the figure above, it can be arranged to maintain image continuity in three-dimensional space, and as shown in the figure below, it can be arranged so that there is no empty space between the surfaces.

In this case, a process of arranging surfaces in close contact with each other so that there is no empty space may be referred to as frame packing. By rotating the surface, image continuity may be reduced as much as possible. In the following, changing the surface arrangement described above to another surface arrangement is referred to as surface relocation.

In the following description, the term continuity may be interpreted to refer to continuity of a scene that is visible in three-dimensional space, or continuity of an actual image or scene in a two-dimensional projected space. The existence of continuity may be expressed as a high correlation between areas. In a typical two-dimensional image, a correlation between areas may be high or low, but a 360-degree image may have a area where continuity does not exist even though it is spatially adjacent. In addition, there may be areas where continuity is present but not spatially adjacent, depending on the preceding surface arrangement or relocation.

Surface relocation may be performed for the purpose of improving encoding performance. For example, a surface may be rearranged such that surfaces with image continuity are disposed adjacent to each other.

In this case, a surface relocation does not necessarily mean reconstruction after the surface arrangement, but may be understood as a process of setting a specific surface arrangement from the beginning. (may be done in area-wise packing of a 360-degree image encoding/decoding process)

In addition, a surface arrangement or relocation may include rotation of the surface as well as changing a position of each surface (simple movement of the surface in this example, such as moving from the top left to the bottom left or the bottom right of the image). Herein, the rotation of the surface may be expressed as 0 degrees, 45 degrees to the right, 90 degrees to the left, etc., if there is no surface rotation, and the angle of rotation may be referred to by dividing 360-degrees into k (or 2k) sections (even or unequal) and selecting the divided sections.

An encoder/decoder, according to preset surface arrangement information (surface shape, number of surfaces, position of the surface, angle of rotation of the surface, etc.) and/or surface relocation information (position of each surface or angle to be moved, direction of movement, etc.), may perform a surface arrangement or relocation. In addition, the encoder may generate surface arrangement information and/or surface relocation information according to the input image, and the decoder may perform surface arrangement (or relocation) by receiving and decoding the information from the encoder.

In the following, when referring to a surface without a separate description, it is assumed on the basis of the 3λ2 layout (layout) according to FIG. 5a, the number indicating each surface may be from 0 to 5 in a raster scan order from the top left.

In the following description on the premise of continuity between surfaces according to FIG. 5a, unless otherwise stated, surfaces 0 through 2 may be assumed to have continuity with each other, surfaces 3 through 5 may be assumed to have continuity with each other, and surfaces 0 and 3, 1 and 4, and 2 and 5 may be assumed to have no continuity. The presence or absence of continuity between the above surfaces can be confirmed by setting of a characteristic, type, and format of an image, etc.

According to an encoding/decoding process of a 360-degree image, an encoding apparatus may acquire an input image, perform preprocessing on the acquired image, perform encoding on the preprocessed image, and transmit the encoded bitstream to the decoding apparatus. Herein, the preprocessing may include image stitching, projection of a three-dimensional image to a two-dimensional space, surface arrangement and relocation (or may be referred to as area-wise packing), and the like. In addition, the decoding apparatus may generate an output image by receiving the bitstream, decoding the received bitstream, and performing post-processing (image rendering, etc.) on the decoded image.

In this case, the bitstream may include information (SEI message or metadata) generated in the preprocessing process and information (image encoded data) generated in the encoding process.

Figure 6A:
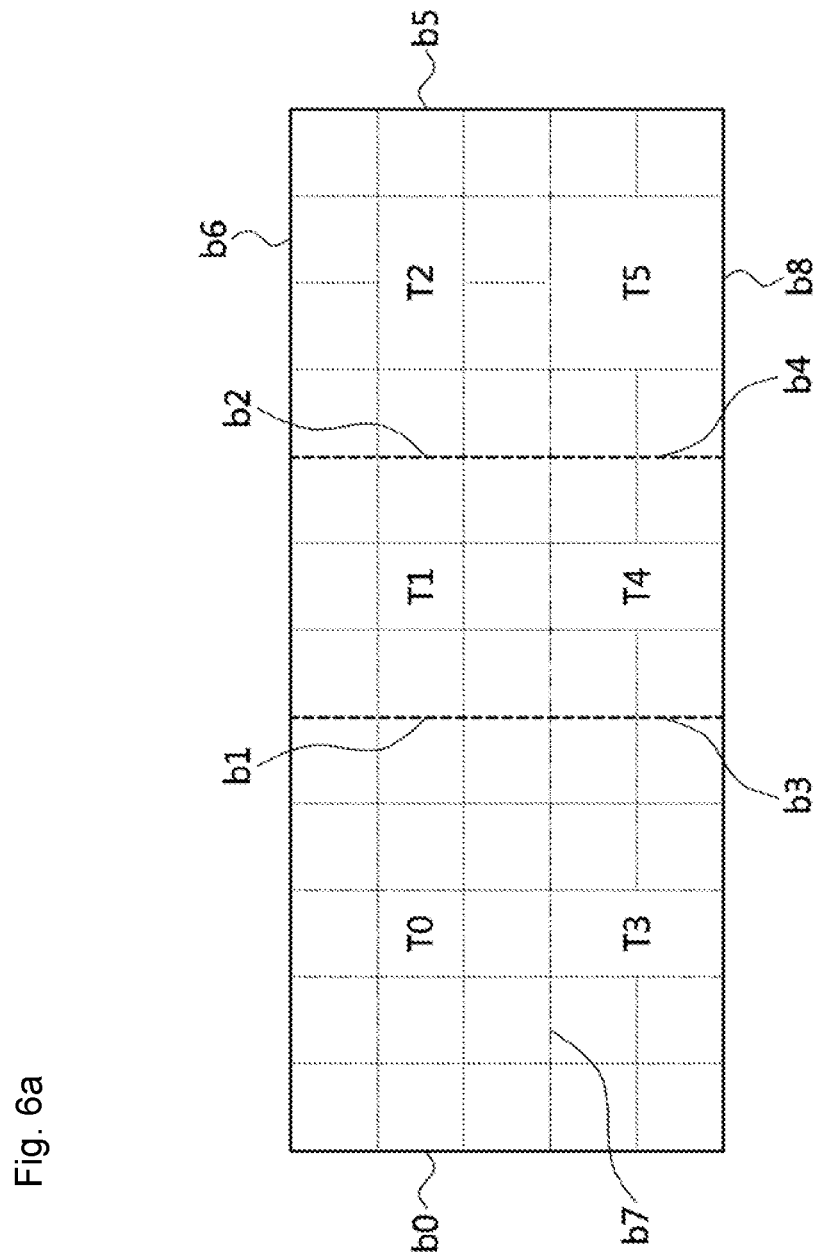
FIGS. 6a and 6b are exemplary diagrams for illustrating a division unit according to an exemplary embodiment of the present invention.
Figure 6B:
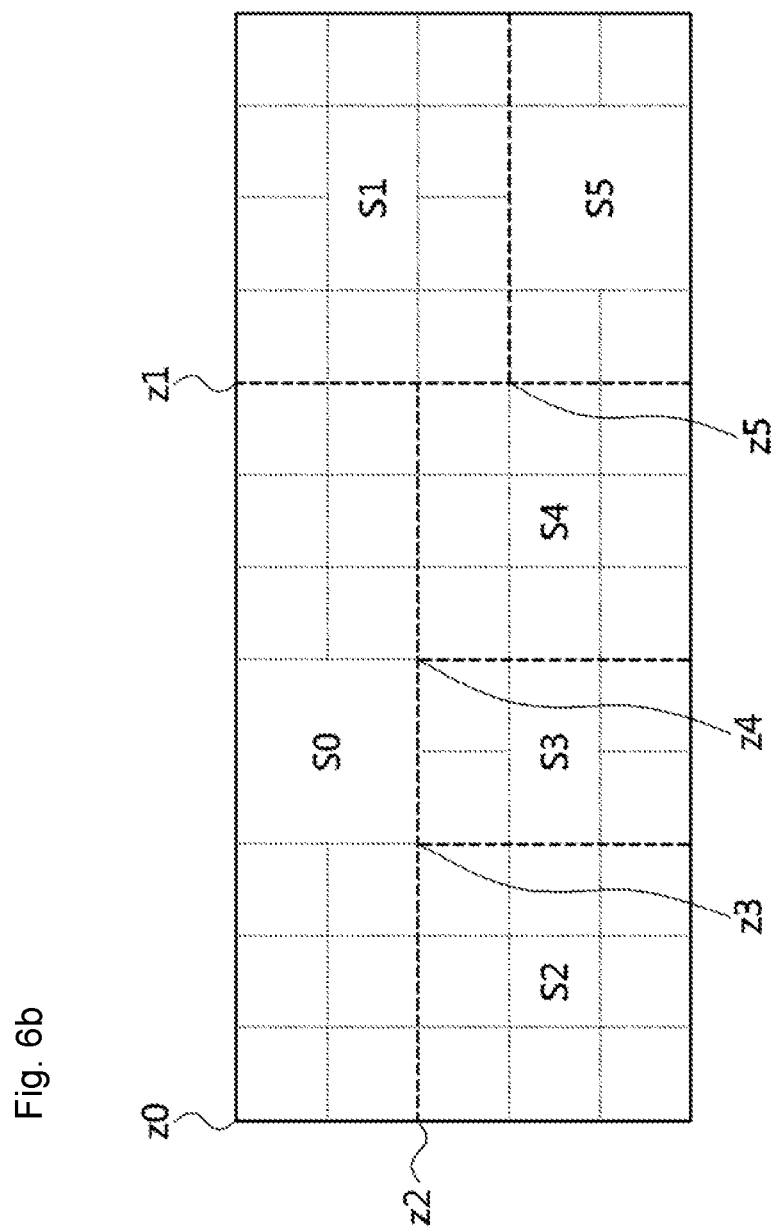

FIGS. 6a and 6b are exemplary diagrams for illustrating a division unit according to an exemplary embodiment of the present invention.

The image encoding/decoding apparatus according to FIG. 2 or FIG. 3 may further include a division unit, and the division unit may include a picture division unit and a block division unit. The picture division unit may partition a picture into at least one processing unit {for example, color space (YCbCr, RGB, XYZ, etc.), subpicture, slice, tile, basic coding unit (or maximum coding unit), etc.}, and the block division unit may partition the basic coding unit into at least one processing unit (e.g., encoding, prediction, transformation, quantization, entropy, in-loop filter unit, etc.).

The basic coding unit may be obtained by dividing a picture at regular intervals in a horizontal direction and a vertical direction, and may be a unit applied to a subpicture, a tile, a slice, a surface, and the like. That is, the unit may be configured as an integer multiple of the basic coding unit, but is not limited thereto.

For example, a size of a basic coding unit may be differently applied to some division units (tile, subpicture, etc.), and the corresponding division unit may have a size of an individual basic coding unit. That is, the basic coding unit of the division unit may be set to be the same as or different from the basic coding unit of the division unit different from a basic coding unit of a picture unit.

For convenience of description, in the present invention, a basic coding unit and other processing units (encoding, prediction, transformation, etc.) are referred to as a block. The size or shape of the block may be N×N square form in which a length and width are represented by an exponential power of 2n (2n×2n. 256×256, 128×128, 64×64, 32×32, 16×16, 8×8, 4×4, etc., n is an integer between 2 and 8), or M×N rectangular form (2m×2n). For example, in the case of a high resolution 8k UHD image, a 256×256 1080p HD image, or a 128×128 WVGA image, an input image may be divided into 16×16 sizes and the like.

A picture may be divided into at least one slice. In the case of a slice, the slice may consist of a bundle of at least one consecutive block according to a scan pattern. Each slice may be divided into at least one slice segment, and each slice segment may be divided into basic coding units.

A picture may be divided into at least one subpicture or tile. The subpicture or tile may have a division form of a rectangle (rectangular or square), and may be divided into basic coding units. The subpicture is similar to the tile in that they have the same division form (squares). However, the subpicture may be distinguished from the tile in that the subpicture has a separate encoding/decoding setting unlike the tile. That is, while the tile is assigned setting information for performing encoding/decoding in a higher unit (eg, a picture, etc.), the subpicture may directly obtain at least one setting information for performing encoding/decoding from header information of each subpicture. That is, unlike the subpicture, the tile is only a unit obtained according to division of an image and may not be a unit for transmitting data (for example, a basic unit of a video coding layer (VCL)).

In addition, the tile may be a division unit supported from a parallel processing point of view, and the subpicture may be a division unit supported from an individual encoding/decoding point of view. In detail, in the case of the subpicture, it may mean that not only the encoding/decoding setting may be set on the basis of a subpicture, but also whether or not the encoding/decoding is determined. Alternatively, it may mean that a display is possible by configuring the corresponding subpicture around an area of interest. Settings for this may be determined on the basis of a sequence, picture, and the like.

In the above example, it is also possible to change to include an encoding/decoding setting in a higher unit as a subpicture and to set an individual encoding/decoding setting in a tile unit. In the present invention, for convenience of description, it is assumed that the tile may be individually set or higher unit dependent setting.

Division information generated when a picture is divided into quadrangular forms may have various forms.

Referring to FIG. 6a, a quadrangular division unit may be obtained by dividing a picture into a horizontal line b7 and a vertical line (in this case, b1 and b3, b2 and b4 each become one dividing line). Number information of the rectangles may be generated based on the horizontal and vertical directions, respectively. In this case, if the rectangle is equally divided, the horizontal and vertical length of the divided rectangle by dividing the width and height of the picture by the number of horizontal and vertical lines may be checked, and if the rectangle is not evenly divided, information indicating the width and length of the rectangle may be additionally generated. In this case, the horizontal and vertical lengths may be expressed in one pixel unit or in multiple pixel units. For example, when expressed in multiple pixel units, if a basic coding unit is M×N and a rectangle is 8M×4N, the horizontal and vertical lengths may be expressed as 8 and 4 (when the basic coding unit of the corresponding division unit is M×N in this example), or 16 and 8 (when the basic coding unit of the corresponding division unit is M/2×N/2).

Meanwhile, referring to FIG. 6b, unlike FIG. 6a, a case where a picture division unit is obtained by separately dividing a picture may be confirmed. For example, the number of rectangles in an image, horizontal and vertical start position information of each rectangle (as indicated by the drawing symbols z0 to z5, may be represented by the x and y coordinates in the picture) and horizontal and vertical length information of each rectangle may be generated. In this case, the start position may be expressed in one pixel unit or multiple pixel units, and the horizontal and vertical lengths may also be expressed in one pixel unit or multiple pixel units.

FIG. 6a may be an example of division information of a tile or a sub picture, and FIG. 6b may be an example of division information of a sub picture, but is not limited thereto. Hereinafter, for convenience of description, a tile is assumed to be a rectangular division unit, but the tile-related description may be applied to the subpicture in the same or similar manner (also, it may be applied to a surface). That is, in the present invention, only the difference in terms is used, meaning that a description of a tile may be used as a definition of a subpicture or a description of a subpicture may be used as a definition of a tile.

Some of the above-mentioned division units may not necessarily be included, all or some of them may be selectively included depending on an encoding/decoding setting, and another additional unit (e.g., surfaces) may be supported.

Meanwhile, the block partition unit may be partitioned into coding units (or blocks) having various sizes. In this case, the coding unit may be configured of multiple coding blocks (e.g., one luminance coding block, two color difference coding blocks, etc.) according to a color format. For convenience of explanation, it is assumed that one color component unit is used. The coding block may have a variable size such as M×M (e.g., M is 4, 8, 16, 32, 64, 128, etc.). Alternatively, according to the division scheme (for example, tree-based division, quad tree division <Quad Tree. QT>, binary tree division <Binary Tree. BT>, ternary tree division <Ternary Tree. TT>, etc.), the coding block may have a variable size such as M×N (e.g., M and N are 4, 8, 16, 32, 64, 128, etc.). In this case, the coding block may be a unit that is the basis of intra prediction, inter prediction, transformation, quantization, entropy encoding, and the like.

In the present invention, the description will be made under the assumption that multiple sub-blocks (symmetry) having the same size and shape are obtained according to a division scheme, but application to a case having an asymmetric sub-block (e.g., For binary trees, the horizontal ratio between division blocks is equal to 1:3 or 3:1 <vertical is the same>, or the vertical ratio is equal to 1:3 or 3:1 <horizontal is the same>. For ternary trees, the horizontal ratio between division blocks is equal to 1:2:1<vertical is the same>, or the vertical ratio is equal to 1:2:1 <horizontal is the same>) may also be possible.

A division of a coding block M×N may have a recursive tree-based structure. In this case, whether to divide may be indicated by a division flag. For example, when the division flag of the coding block having the division depth k is 0, encoding of the coding block is performed in the coding block having the division depth k, and when the division flag of the coding block having the division depth k is 1, the encoding of the coding block is performed in four sub-coding blocks (quad tree division), two sub-coding blocks (binary tree division), or three sub-coding blocks (ternary tree division) having the division depth of k+1 according to the division scheme.

The sub-coding block may be set as a coding block k+1 again and divided into sub-coding blocks k+2 through the above process. In the case of quad-tree division, a division flag (for example, indicating whether to divide or not) may be supported.

In the case of binary tree division, a division flag and a division direction flag (horizontal or vertical) may be supported. If in binary tree division, one or more division ratios (e.g., additional division ratio with aspect ratio other than 1:1. I.e. asymmetric division is also supported) are supported, a division ratio flag (e.g., select a ratio of one of the aspect ratio candidates <1:1, 1:2, 2:1, 1:3, 3:1>) may be supported or another type of flag (e.g., whether to divide symmetrically. 1 means symmetric division, no additional information, and 0 means asymmetric division, additional information about ratio is required.) may be supported.

In the case of ternary tree division, a division flag and a division direction flag may be supported. If the ternary tree division supports more than one division ratio, additional division information such as the binary tree may be needed.

The above example is division information generated when only one tree division is valid, and when multiple tree divisions are valid, division information may be configured as follows.

For example, when multiple tree divisions are supported, when there is a preset division priority, division information corresponding to the priority may be configured first. In this case, when the division flag corresponding to the prior rank is true (performing division), additional division information of a division method may be continued, and when the division flag is false (performing division x), division information of the division method corresponding to a later rank may be configured.

Alternatively, when multiple tree divisions are supported, selection information on a division method may additionally occur, and may be configured as division information according to the selected division method.

The division flag may be omitted according to a preceding higher or previous division result.

A block division may start from the largest coding block and proceed to the minimum coding block. Alternatively, it may start from the minimum division depth 0 and proceed to the maximum division depth. That is, division may be performed recursively until a block size reaches the minimum coding block size or the division depth reaches the maximum division depth. In this case, a size of the maximum coding block, a size of the minimum coding block, and the maximum division depth may be adaptively set according to an encoding/decoding setting (e.g., image <slice, tile> type <I/P/B>, encoding mode <Intra/Inter>, color difference component <Y/Cb/Cr>, etc.)

For example, when the maximum coding block is 128× 128, quad tree division may be performed in a range of 32×32 to 128×128, binary tree division may be performed in a range of 16×16 to 64×64 and the maximum division depth of 3, and ternary tree division may be performed in a range of 8×8 to 32×32 and a maximum division depth of 3. Alternatively, quad tree division may be performed in a range of 8×8 to 128×128, and binary tree and ternary tree division may be performed in a range of 4×4 to 128×128 and a maximum division depth of 3. In the former case, it may be the setting in an I image type (for example, a slice), and in the latter case, it may be the setting in a P or B image type.

As described in the above example, division settings such as the maximum coding block size, the minimum coding block size, the maximum division depth, and the like may be commonly or separately supported according to the division method and the above-described encoding/decoding setting.

When multiple division schemes are supported, division is performed within a block support range of each division scheme, and when a block support range of each division scheme overlaps, priority of the division scheme may exist. For example, quad tree division may precede binary tree division.

Alternatively, division selection information that is performed when the division support ranges overlap. For example, selection information on a division method performed during binary tree and ternary tree division may occur.

In addition, when multiple division schemes are supported, it may be determined whether to perform a subsequent division according to a result of a preceding division. For example, when the result of the preceding division (quad tree in this example) indicates that division is performed, the subsequent division (binary tree or ternary tree in this example) is not performed, and the sub-coding block divided according to the preceding division may be set again as a coding block to perform division.

Alternatively, when the result of the preceding division indicates that the division is not performed, the division may be performed according to the result of the subsequent division. In this case, when the result of the subsequent division (binary tree or ternary tree in this example) indicates that the division is to be performed, the divided sub-coding block may be set again as a coding block to perform division, and when the result of the subsequent indicates that no division is to be performed, no further division is performed. In this case, when the subsequent division result indicates that the division is performed and the divided sub-coding block is set again as a coding block, when multiple division schemes are supported (for example, the block support range of each division scheme overlaps), only the subsequent division may be supported without performing the preceding division. That is, when multiple division schemes are supported, when the result of the preceding division indicates that the division is not performed, it means that the previous division is not performed any more.

For example, when an M×N coding block is capable of quad tree division and binary tree division, a quad tree division flag may be checked first. When the division flag is 1, division is performed into four sub-coding blocks having a size of (M>>1)×(N>>1), and the sub-coding block is set as a coding block to perform division (quad tree division or binary tree division). When the division flag is 0, the binary tree division flag may be checked, and when the binary tree division flag is 1, division is performed into two sub-coding blocks having a size of (M>>1)×N or M×(N>>1), and the sub-coding block may be set as a coding block again to perform division (binary tree division). When the binary tree division flag is 0, the division process is terminated and encoding is performed.

Although a case in which multiple division schemes are performed through the above example has been described, a combination of various division schemes may be possible without being limited thereto. For example, a division scheme such as quad tree/binary tree/ternary tree/quad tree+ binary tree/quad tree+binary tree+ternary tree may be used.

In this case, information on whether an additional division scheme is supported may be implicitly determined or explicitly included in a unit such as a sequence, a picture, a subpicture, a slice, a tile, and the like.

In the above example, information related to a division, such as size information of a coding block, a support range of the coding block, the maximum division depth, and the like, may be implicitly determined on the basis of a sequence, a picture, a subpicture, a slice, a tile, and the like. In summary, an allowable block range may be determined by a size of the largest coding block, a range of supported blocks, the maximum division depth, and the like.

The coding block obtained by performing the division through the above process may be set to the maximum size of intra prediction or inter prediction. That is, the coding block after block division may be a start size of division of a prediction block for intra prediction or inter prediction. For example, when the coding block is 2M×2N, the prediction block may have sizes of 2M×2N and M×N smaller than or equal to that. Alternatively, the size may be 2M×2N, 2M×N, M×2N, or M×N. Alternatively, the size may be 2M×2N with the same size as the coding block. In this case, when the coding block and the prediction block have the same size may mean that the prediction is performed by a size obtained through the division of the coding block without dividing the prediction block. In other words, it means that division information for the prediction block is not generated. Such a setting may also be applied to a transform block, and the transform may be performed on the basis of the divided coding block.

Various configurations may be possible according to the following encoding/decoding settings. For example, at least one prediction block and at least one transform block may be obtained based on a coding block (after the coding block is determined). Alternatively, one prediction block having the same size as the coding block may be obtained, and at least one transform block may be obtained based on the coding block. Alternatively, one prediction block and one transform block having the same size as the coding block may be obtained. In the above example, when at least one block is obtained, division information of each block may be generated (or occur). When one block is obtained, division information of each block does not occur.

A block of square or rectangular shape of various sizes obtained according to the result may be a block used for intra prediction and inter prediction, a block used for transforming or quantizing residual components, or a block used in a filter process.

The division unit obtained by dividing a picture through the picture division unit may perform independent encoding/decoding or dependent encoding/decoding according to an encoding/decoding setting.

Independent encoding/decoding may mean that data of other units cannot be referred to when performing encoding/decoding of some division units (or areas). In detail, information {e.g., pixel value or encoding/decoding information (intra-prediction related information, inter prediction related information, entropy encoding/decoding related information, etc.)} used or generated in a texture encoding and an entropy encoding in some units is independently encoded without reference to each other. In addition, in a decoder, parsing information and reconstruction information of other units may not be referred to each other for texture decoding and entropy decoding of some units.

In addition, dependent encoding/decoding may mean that data of other units may be referred to when performing encoding/decoding of some units. In detail, information used or generated in a texture encoding and an entropy encoding in some units are mutually referred to and encoded, and in a decoder, parsing information and reconstruction information in other units may be used for a texture decoding and an entropy decoding in some units may be referenced to each other.

In general, the above-mentioned division unit (e.g., subpicture, tile, slice, etc.) may follow an independent encoding/decoding setting. This can be set to be impossible to refer to for the purpose of parallelism. In addition, it may be set to be impossible to refer to for the purpose of improving an encoding/decoding performance. For example, when a 360-degree image is divided into multiple surfaces in three-dimensional space and arranged in two-dimensional space, a correlation (for example, image continuity) with an adjacent surface may be degraded according to the surface arrangement setting. In other words, if there is no correlation between the surfaces, since a need to refer to each other is low, an independent encoding/decoding setting can be followed.

In addition, a referenceable setting between division units may be provided for the purpose of improving encoding/decoding performance. For example, even if an image is divided on the basis of a surface in a 360-degree image, depending on the surface arrangement settings, there may be a case where there is a high correlation with adjacent surfaces, and in this case, a dependent encoding/decoding setting may be followed.

Meanwhile, in the present invention, independent or dependent encoding/decoding may be applied not only to a spatial domain but also extended to a temporal domain. That is, not only to perform independent or dependent encoding/decoding with other division units existing within the same time as a current division unit, but also to perform independent or dependent encoding/decoding with division units existing within the different time from a current division unit (In this example, it is assumed to be the different division unit even if the division unit of the same position exists in an image corresponding to a time different from the current division unit.) may be possible.

For example, when simultaneously transmitting a bitstream A containing data encoded with a 360-degree image and a bitstream B containing data encoded with a normal image quality, in a decoder, a area corresponding to a area of interest (e.g., an area where a user's eyes stay <viewport>, an area to display, or the like) may be parsed and decoded by the bitstream A transmitted with high image quality, and may be decoded by parsing a bitstream B transmitted with normal image quality other than the area of interest.

Specifically, when an image is divided into multiple units (for example, subpictures, tiles, slices, surfaces, etc., in this example, the surface is assumed to be data processed in the same way as a tile or subpicture), it is possible to decode data (bitstream A) of the division unit belonging to the area of interest (or the division unit overlapping one pixel with the viewport) and data of the division unit belonging to a area other than the area of interest (bitstream B).

Alternatively, the bitstream including an encoded data of the entire image may be transmitted, and the decoder may parse and decode the area of interest from the bitstream. In detail, only data of a division unit belonging to the area of interest may be decoded.

In summary, the encoder generates the bitstream divided by one or more image quality, and the decoder may decode only a specific bitstream to obtain all or part of the images, or selectively decode each bitstream for each part of the image to obtain all or part of the images. In the above example, the case of a 360-degree image is taken as an example, but this may be a description applicable to a general image.

When performing encoding/decoding as in the above example, since a decoder does not know what data to restore (In this example, an encoder does not know where a area of interest is located. It is randomly accessed according to the area of interest), it is necessary to check a reference setting in a time domain as well as a spatial domain to perform the encoding/decoding.

For example, in a situation where it is determined which decoding is to be performed by a single division unit in a decoder, a current division unit may perform independent encoding in a spatial domain and limited dependent encoding (e.g., reference is allowed only in the same position division unit at a different time corresponding to the current division unit, other division units are limited in reference, and in the general case, there is no restriction in the time domain, so compared with the case of unrestricted dependent encoding) in a time domain.

Alternatively, in a situation where it is determined which decoding (e.g., if one of the division units belongs to a area of interest, multi-unit decoding) is to be performed in multiple division units (multiple division units can be obtained by grouping horizontally adjacent split units or by grouping vertically adjacent division units, or multiple division units can be obtained by grouping horizontally and vertically adjacent division units) in a decoder, the current division unit may perform independent or dependent encoding in the spatial domain and limited dependent encoding (e.g., allow referencing some other division units as well as the same position division unit at a different time corresponding to the current division unit) in the time domain.

In the present invention, a surface is generally a dividing unit having a different arrangement and shape according to a projection format, and having different characteristics from the other dividing units described above, such as not having a separate encoding/decoding setting. However, it may also be viewed as a unit obtained by a picture division unit in terms of dividing an image into multiple areas (and having a rectangular shape, etc.).

In the case of a spatial domain, it has been described above that independent encoding/decoding can be performed for each division unit for the purpose of parallelization or the like. However, independent encoding/decoding has a problem in that the encoding/decoding efficiency can be reduced because other division units cannot be referred to. Therefore, as a step before the encoding/decoding is performed, the division unit in which the independent encoding/decoding is performed may be extended by using (or adding) data of an adjacent division unit. Herein, since reference data is increased in the division unit to which data of the adjacent division unit is added, encoding/decoding efficiency may increase. In this case, encoding/decoding of the extended division unit may also be regarded as dependent encoding/decoding in terms of referencing the data of the adjacent division unit.

Information about a reference setting between division units may be stored in a bitstream on the basis of a video, a sequence, a picture, a subpicture, a slice, a tile, and the like and in the decoder, the setting information transmitted from an encoder by parsing on the basis of the same level may be restored. In addition, related information may be transmitted in a bitstream, and used by parsing in the form of Supplement Enhancement Information (SEI) or Metadata. In addition, according to a pre-defined definition of the encoder/decoder, the encoder/decoder may be performed according to a reference setting without transmitting the information.

Figure 7:
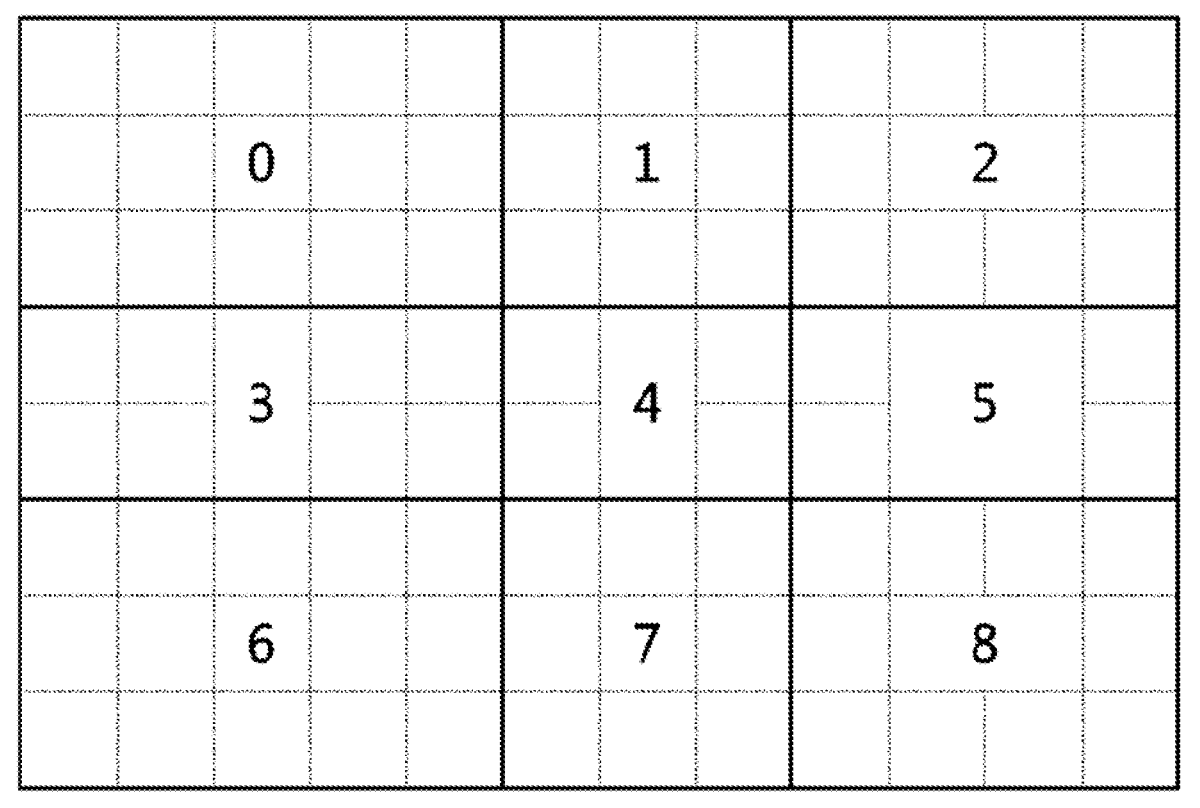

FIG. 7 is an exemplary diagram in which one picture is partitioned into multiple tiles. FIGS. 8a to 8i are first exemplary diagrams for setting an additional area for each tile according to FIG. 7. FIGS. 9a to 9i are second exemplary diagrams for setting an additional area for each tile according to FIG. 7.

If an image is divided into two or more division units (or areas) through the picture division unit and encoding/decoding is independently performed for each division unit, while there are advantages such as parallelism, data that can be referred to by each division unit is reduced, which may cause a problem of deterioration in encoding performance. In order to solve this problem, it can be handled as a dependent encoding/decoding setting between the division units (This example is based on tiles. It can be applied to other units with the same or similar settings).

In general, independent encoding/decoding proceeds to prevent reference between division units. Thus, pre- or post-processing for dependent encoding/decoding can be performed. For example, before performing encoding/decoding, an extended area may be placed outside of each division unit, and the extended area may be filled with data of another division unit to be referred to.

This method does not differ in that it performs independent encoding/decoding except that each division unit is extended to perform encoding/decoding, it can be understood as an example of dependent encoding/decoding in that data obtained by an existing division unit is referred to in advance in another division unit.

In addition, after performing encoding/decoding, filtering may be applied using multiple division unit datum based on a boundary between division units. is, when the filtering is applied, different division unit data is used, and depending on the filtering, the filtering may be independent when the filtering is not applied.

In the following example, a case of performing dependent encoding/decoding by performing encoding/decoding pre-processing (expansion in this example) will be described. In addition, in the present invention, a boundary between the same division units may be referred to as an inner boundary, and an outline of the picture may be referred to as an outer boundary.

According to an embodiment of the present invention, an additional area for a current tile may be set. In detail, an additional area may be set based on at least one tile (In this example, including when a picture consists of one tile. That is, even when the picture is not divided into two or more division units. Exactly, the division unit means that the division is divided into two or more units, but the case is also recognized as one division unit even if it is not divided).

For example, an additional area may be set in at least one of up, down, left, and right directions of a current tile. Herein, the additional area can be filled using an arbitrary value. In addition, the additional area may be filled using some data of the current tile, and it is possible to pad the outer pixels of the current tile or to copy and fill the pixels in the current tile.

In addition, the additional area may be filled using image data of another tile than the current tile. Specifically, image data of a tile adjacent to the current tile may be used, and it is possible to copy and fill image data of adjacent tiles in a specific direction among up/down/left/right of the current tile.

A size (length) of the image data acquired here may have a value common to each direction or may have an individual value, and it may be determined according to an encoding/decoding setting.

For example, in FIG. 6a, all or some of the boundaries between b0 and b8 may be extended. In addition, it may be extended by m in all boundary directions of a division unit or may be extended by mi (i is each direction index) according to the boundary direction. The m or mi may be applied to all division units of an image or may be individually set according to a division unit.

Herein, setting information relating to the additional area may be generated. At this time, setting information of the additional area includes whether the additional area is supported, whether the additional area is supported for each division unit, a form of the additional area in an entire image (e.g., determined depend on which direction it extend among up, down, left, or right of the division unit. This example is setting information commonly applied to all division units in an image), a form of the additional area in each division unit (This example is setting information that is applied to individual division units in an image), a size of the additional area in the entire image (e.g., if the shape of the additional area is determined, it means how much to expand in the direction of expansion. This example is setting information commonly applied to all division units in an image), a size of the additional area in each division unit (This example is setting information that is applied to individual division units in the image), a method of filling the additional area in the entire image, and a method of filling the additional area in each division unit.

The additional area related setting may be proportionally determined according to a color format, or may have an independent setting. The setting information of the additional area in a luminance component can be generated, and the setting of the additional area in a chrominance component can be implicitly determined according to the color format. Alternatively, the setting information of the additional area in the chrominance component may be generated.

For example, when the size of the additional area of the luminance component is m, the size of the additional area of the chrominance component may be determined to be m/2 according to the color format (4:2:0 in this example). As another example, when the size of the additional area of the luminance component is m and the chrominance component has an independent setting, the size information of the additional area of the chrominance component (n. In this example, n is commonly used, or n1, n2, n3, etc. are possible depending on the direction or extension area) may be generated. As another example, the method of filling the additional area of the luminance component may be generated, and the method of filling an additional area of the chrominance component may use the method in the luminance component or related information may be generated.

Information related to the setting of the additional area may be recorded and transmitted in a bitstream on the basis of a video, a sequence, a picture, a subpicture, a slice, etc., and in decoding, the relevant information may be parsed and restored from the unit. The following embodiment will be described under the assumption that additional area support is activated.

Referring to FIG. 7, it may be seen that one picture is divided into respective tiles displayed from 0 to 8. At this time, when an additional area according to an embodiment of the present invention is set for each tile according to FIG. 7, it is the same as in FIGS. 8a to 8i In FIGS. 7 and 8a, tile 0 (the size of T0_W×T0_H) may be extended to further have an area of EOR to the right and E0_D to the bottom. In this case, an additional area may be obtained from an adjacent tile. In more detail, the right extended area may be obtained from tile 1, and the bottom extended area may be obtained from tile 3. In addition, tile 0 may set an additional area by using a tile adjacent to the bottom right side (tile 4). That is, the additional area may be set in the direction of the inner boundary (or the boundary between the same division units) except for the outer boundary (or the picture boundary) of the tile.

Figure 8A:
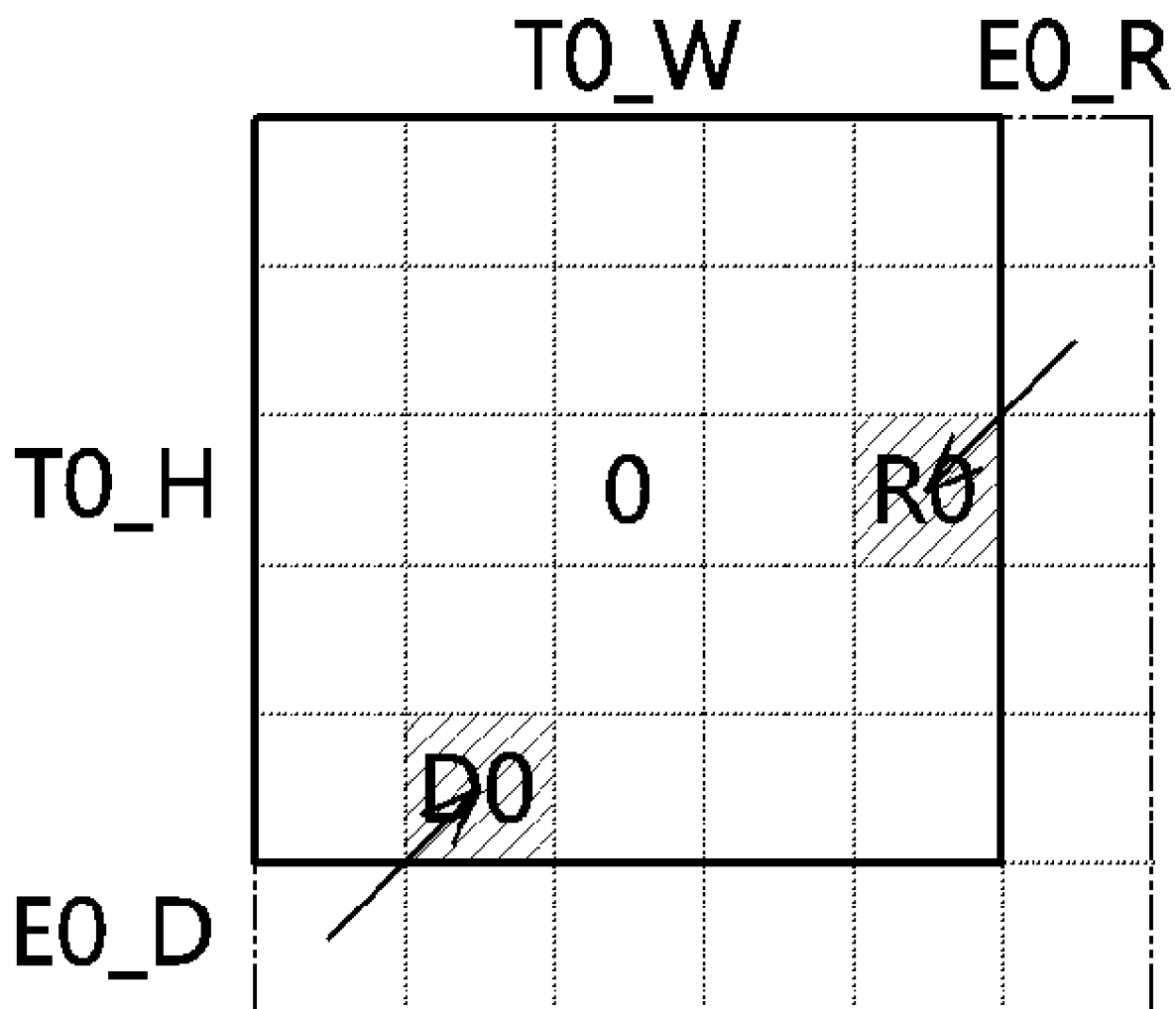
FIGS. 8a to 8i are first exemplary diagrams for setting an additional area for each tile according to FIG. 7.
Figure 8B:
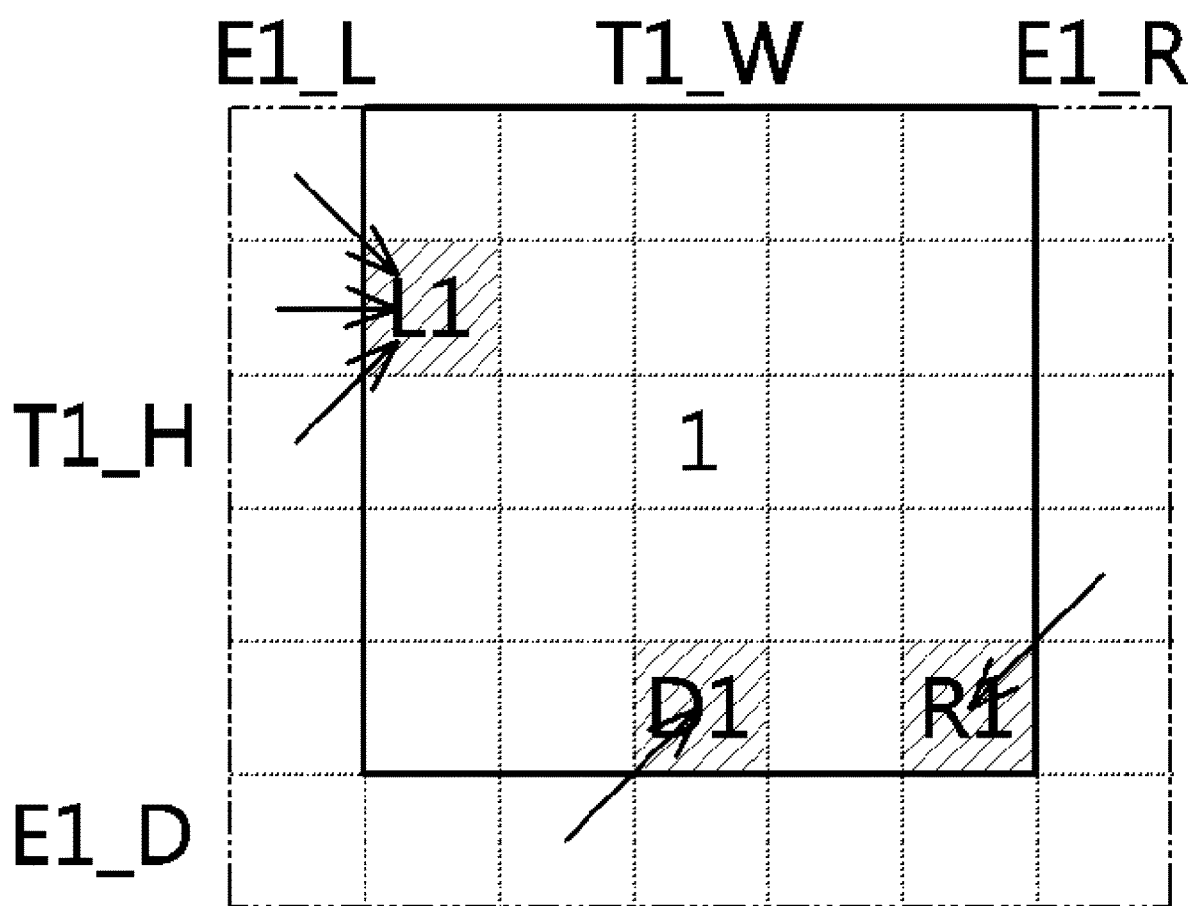
Figure 8C:
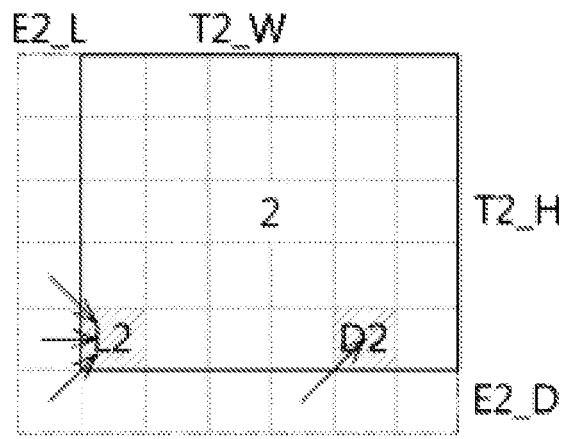
Figure 8D:
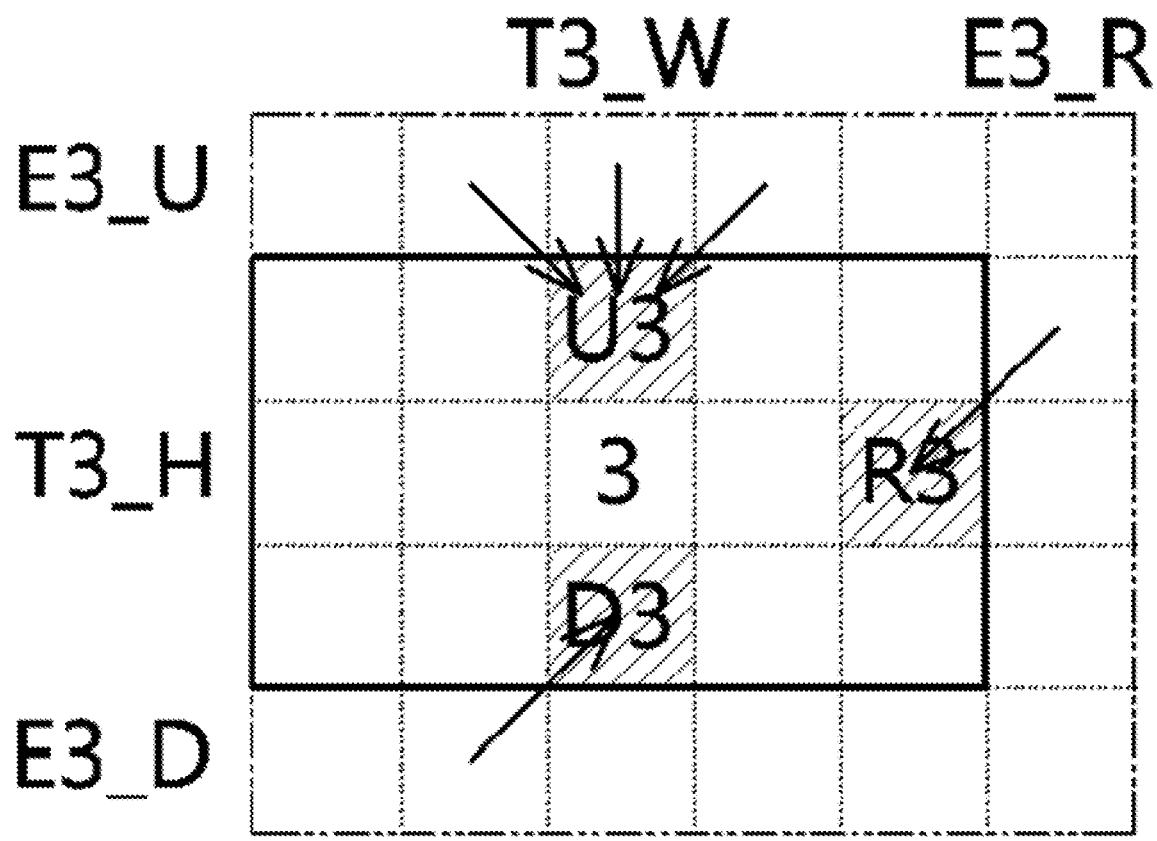
Figure 8E:
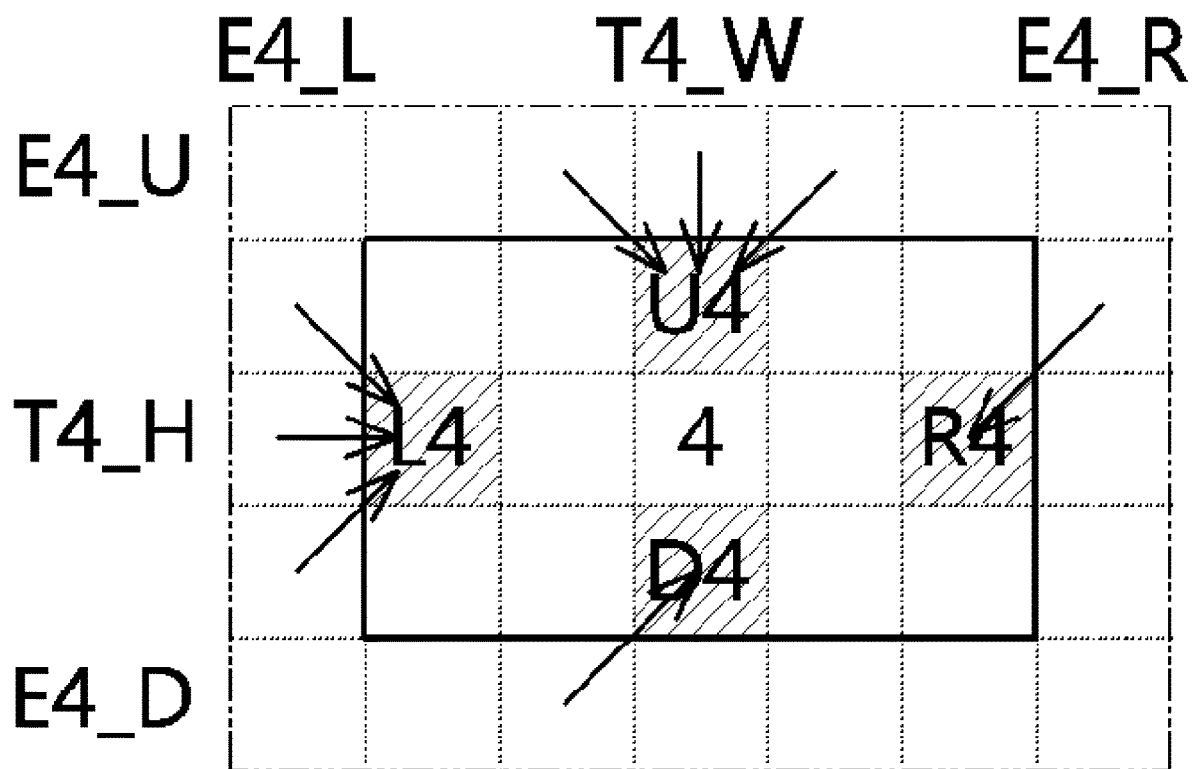
Figure 8F:
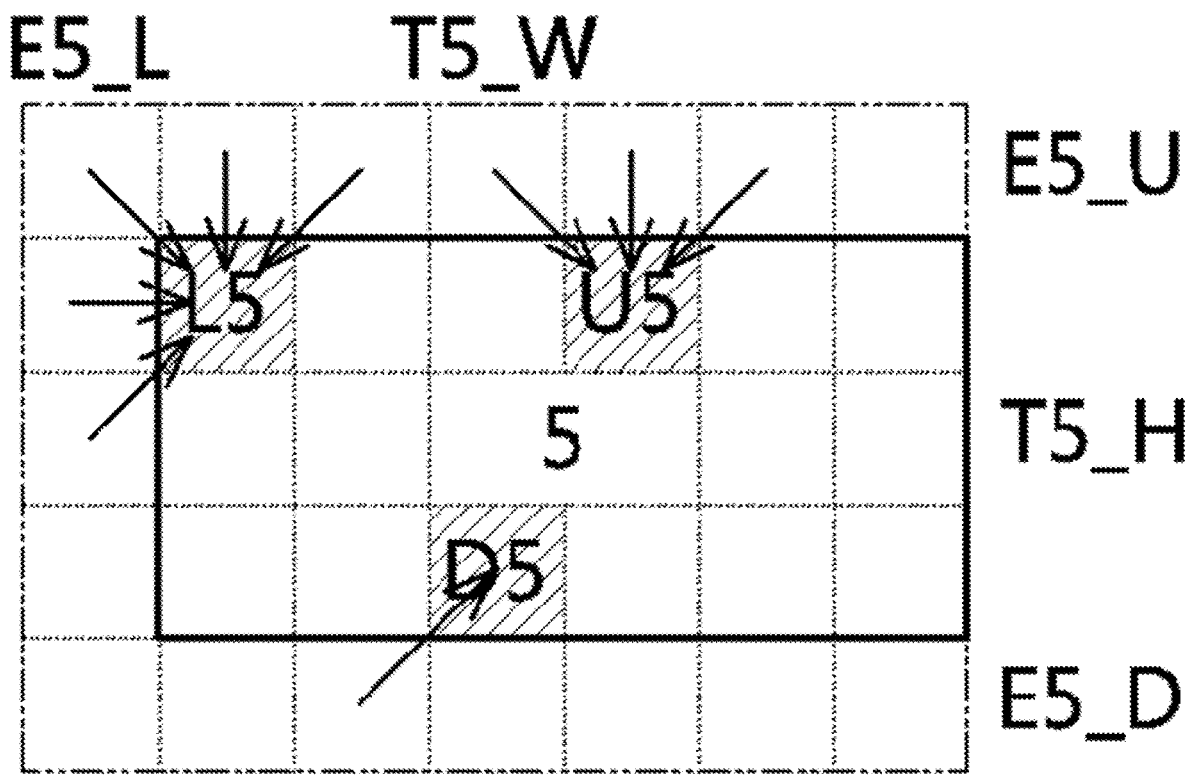
Figure 8G:
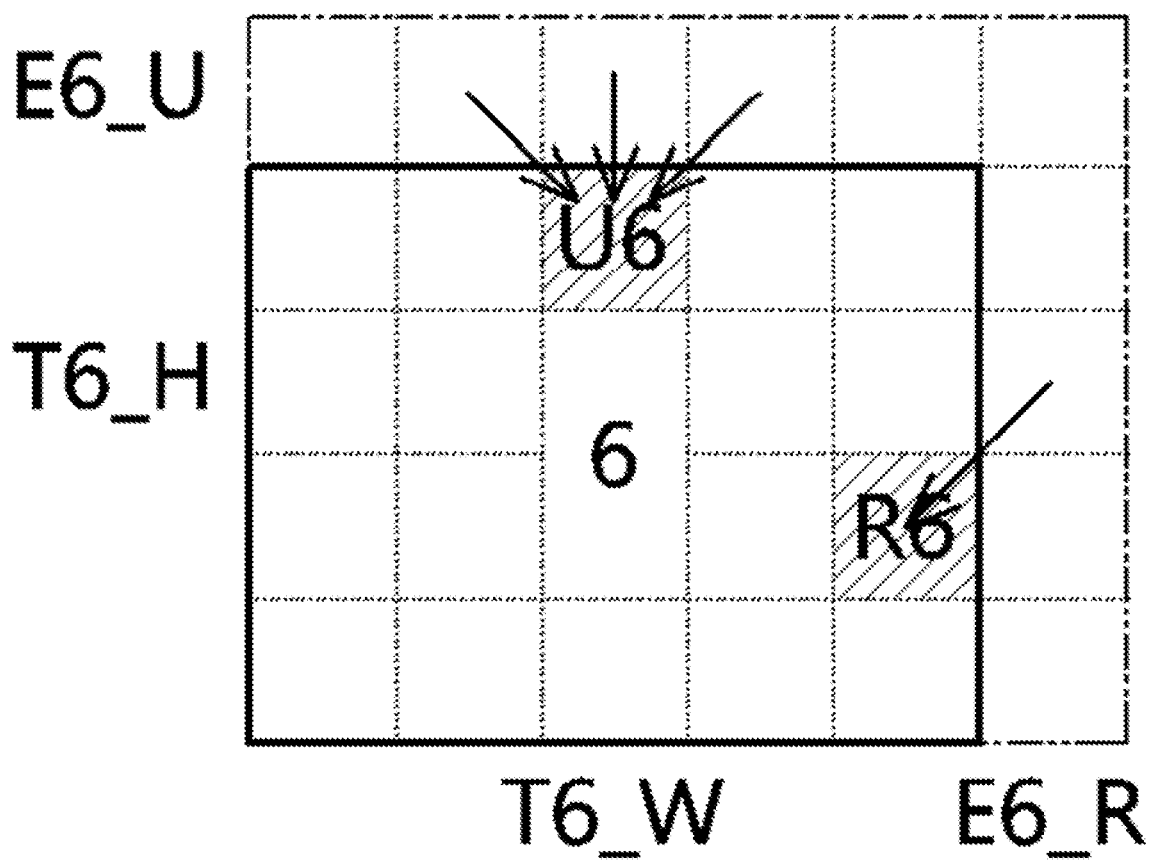
Figure 8H:
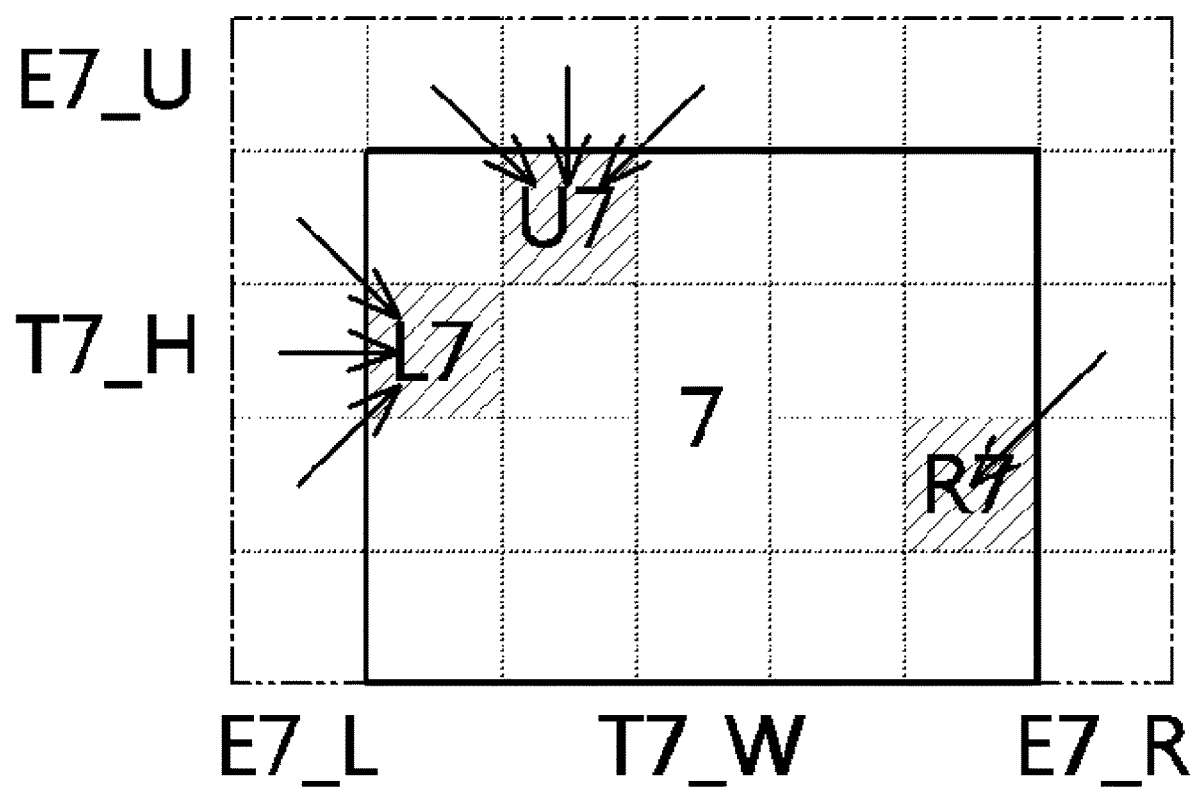
Figure 8I:
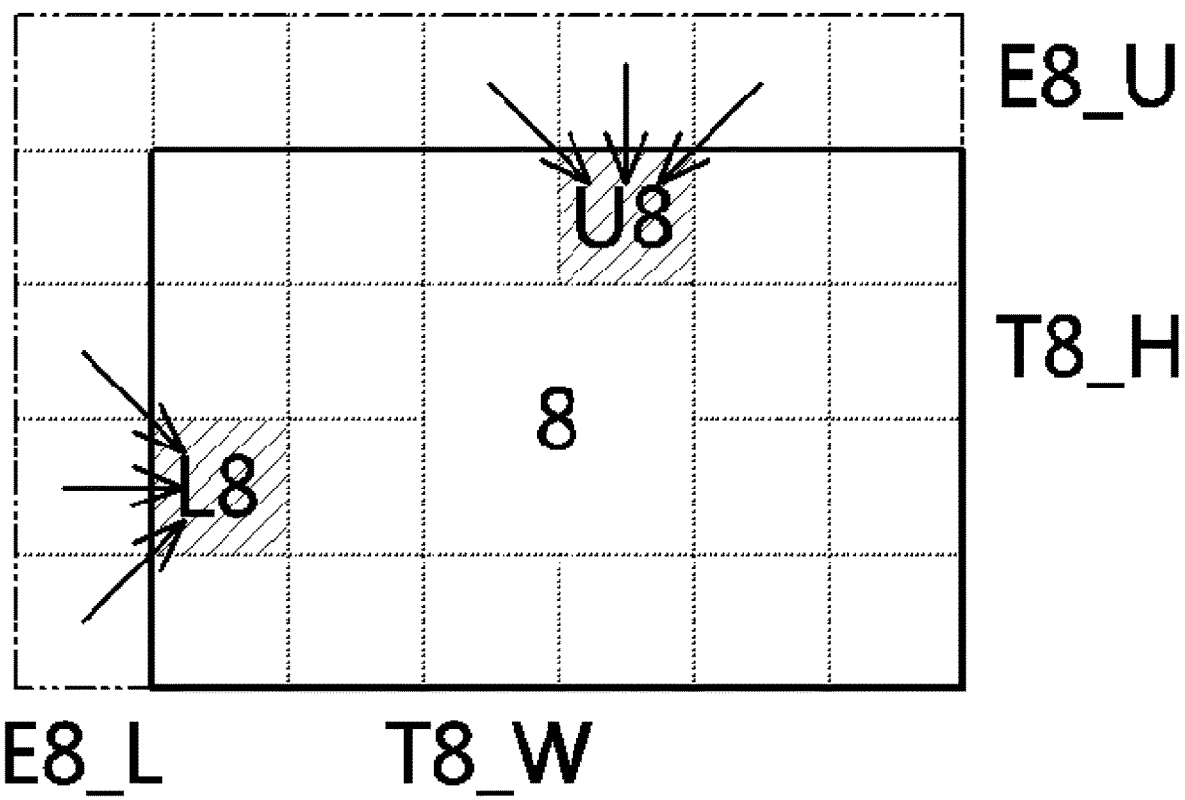

In FIGS. 7 and 8e, tile 4 (the size of T4 W×T4 H) may be extended to further include areas of left, right, top, and bottom since there is no outer boundary. In this case, the left extended area may be obtained from tile 3, the right extended area of 5 tiles, the top extended area of 1 tile, and the bottom extended area of 7 tile. In addition, tile 4 can set an additional area such as top left, bottom left, top right, and bottom right. In this case, the top left extended area may be obtained from tile 0, the bottom left extended area to tile 6, the top right extended area to tile 2, and the bottom right extended area to be obtained from tile 8.

In FIG. 8c, since the L2 block is a block adjacent to the tile boundary in principle, there is no data that can be referenced from the left, top left, and bottom left blocks. However, when an additional area for tile 2 is set according to an embodiment of the present invention, the L2 block may be encoded/decoded with reference to the additional area. That is, the L2 block may refer to the data of the blocks located at the top left and the left as an additional area (which may be the area obtained from tile 1), and may refer to the data of the block located at the bottom left as an additional area (which may be the area obtained from tile 4).

According to the above embodiment, data included in an additional area may be included in a current tile to perform encoding/decoding. In this case, since the data of the additional area is located at a tile boundary (in this example, the tile is updated or expanded due to the additional area), there is no data to refer to during an encoding process, so that encoding performance may be degraded, but since this is a portion added for a reference of an existing tile boundary area, It can be understood as a temporary memory format for improving encoding performance. That is, since a area is helpful to improve the quality of the final output image and is eventually removed, the encoding performance of the area is not deteriorated. This may be applied to similar or the same purpose in the embodiments described below.

Meanwhile, referring to FIGS. 9a to 9i, a 360-degree image is changed into a 2D image through a surface arrangement (or rearrangement) process according to a projection format, and each tile (or may be a surface) obtained by dividing the 2D image may be checked. In this case, if the 360-degree image is an Equirectangular, since the 2D image is composed of one surface, it may be an example of dividing one surface into tiles. In addition, for convenience of description, it is assumed that the tile division for the 2D image is the same as the tile division according to FIG. 7.

Herein, the divided tile may be divided into a tile consisting only of an inner boundary and a tile including at least one outer boundary. As in FIGS. 8a to 8i, an additional area may be set for each tile. However, the 360-degree image converted into the 2D image may not have continuity of an actual image even if adjacent to each other in the 2D image, or may have a continuity of the actual image even if not adjacent (referring to the description of FIGS. 5a to 5c). Thus, even if some boundary of the tile is an outer boundary, an area in which continuity exists with the outer boundary area of the tile may exist in the picture. Specifically, referring to FIG. 9b, the top part of tile 1 corresponds to an outer boundary of the picture, but since an area having continuity of the actual image may exist in the same picture, it may also be possible to set an additional area to the top of tile 1. That is, unlike FIGS. 8a to 8i, in FIGS. 9a to 9i, an additional area may be set for all or part of the outer boundary direction of the tile.

Figure 9A:
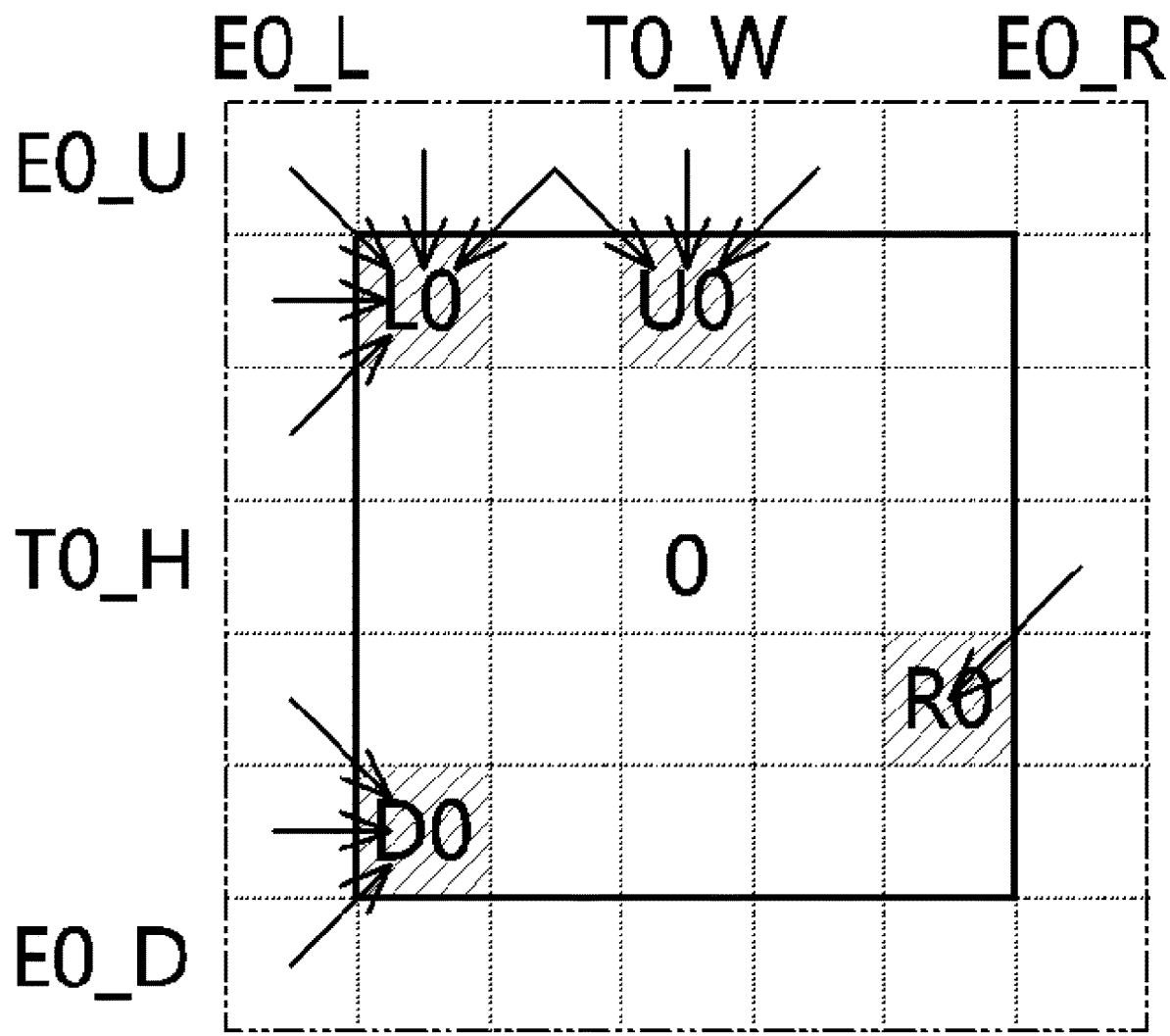
FIGS. 9a to 9i are second exemplary diagrams for setting an additional area for each tile according to FIG. 7.
Figure 9B:
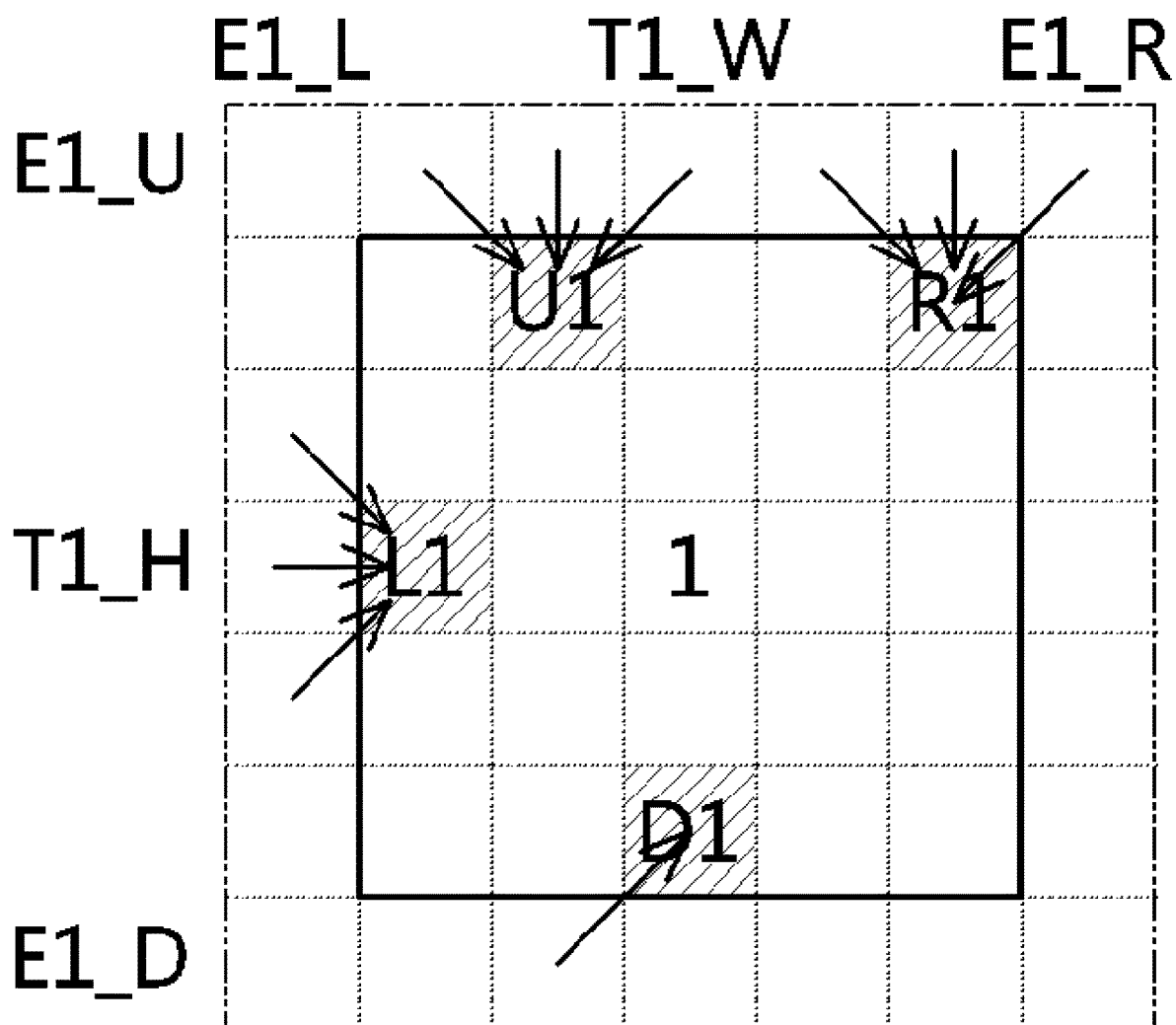
Figure 9C:
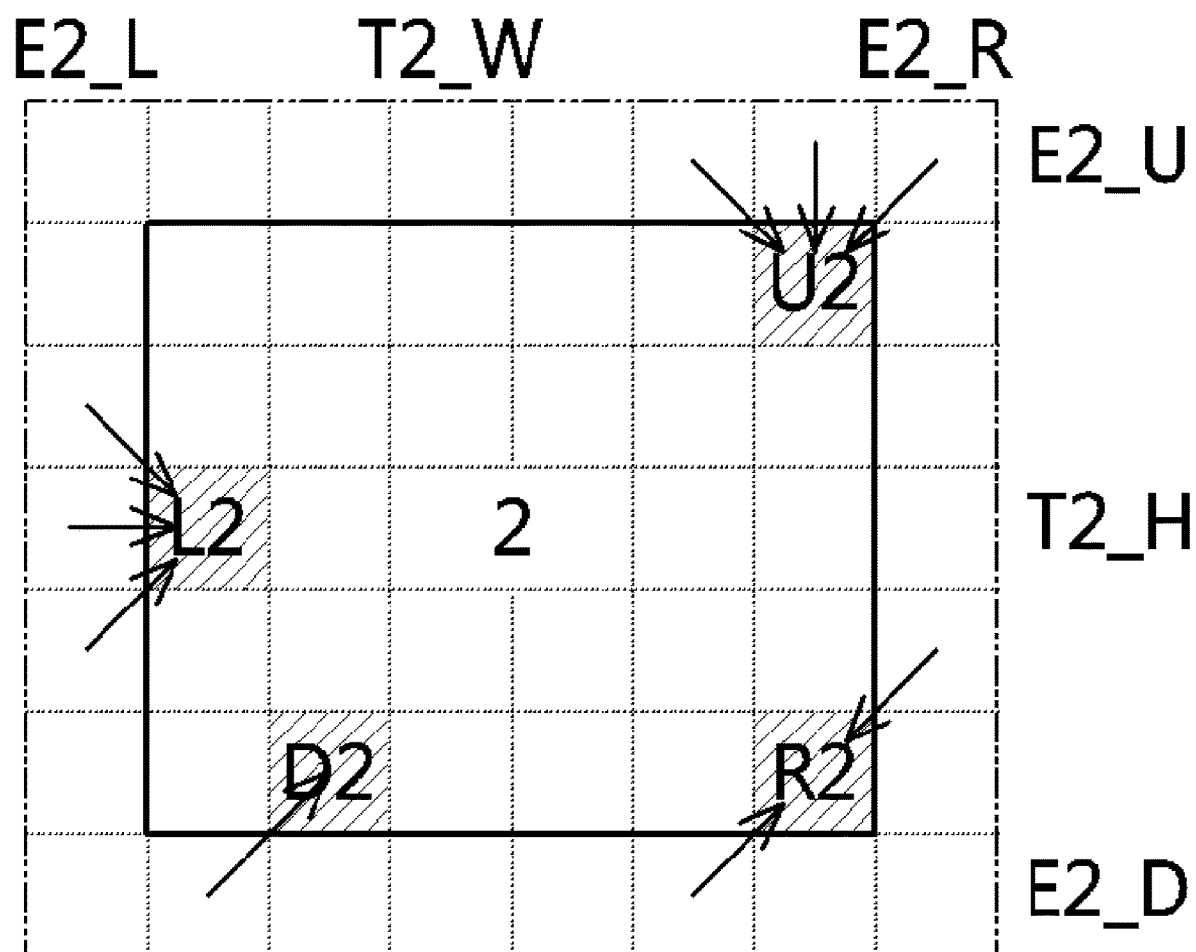
Figure 9D:
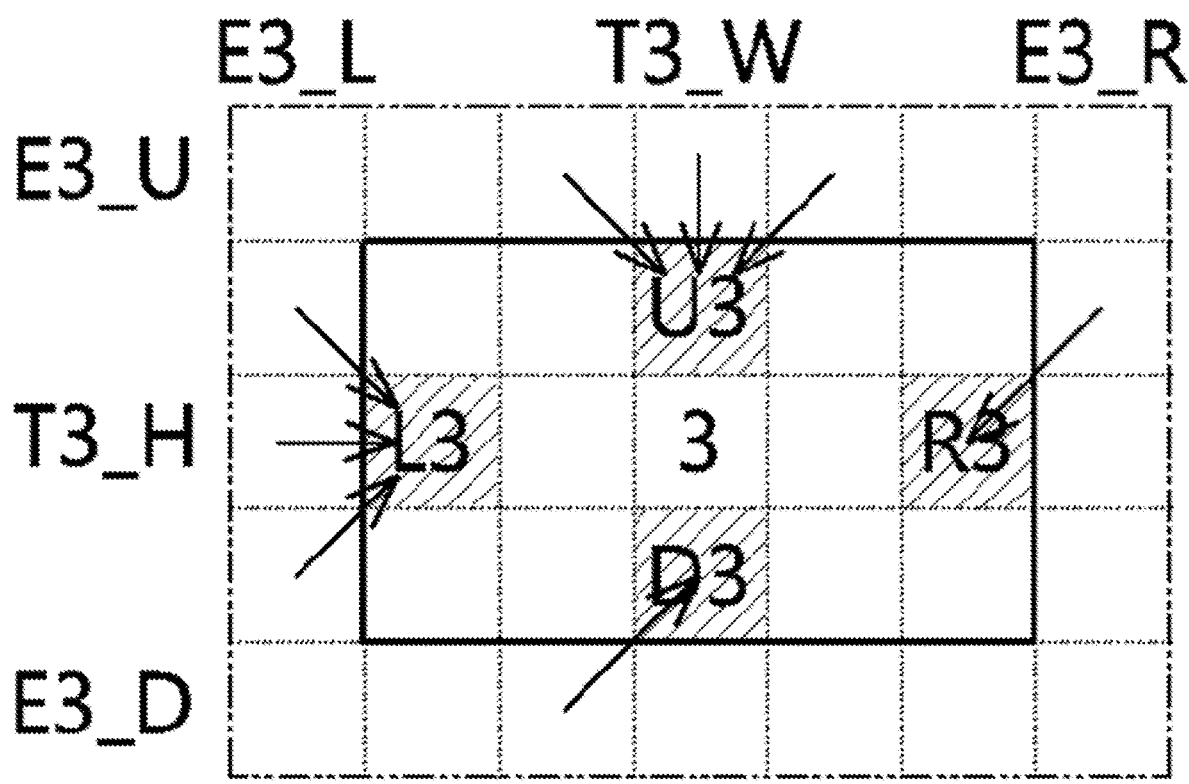
Figure 9E:
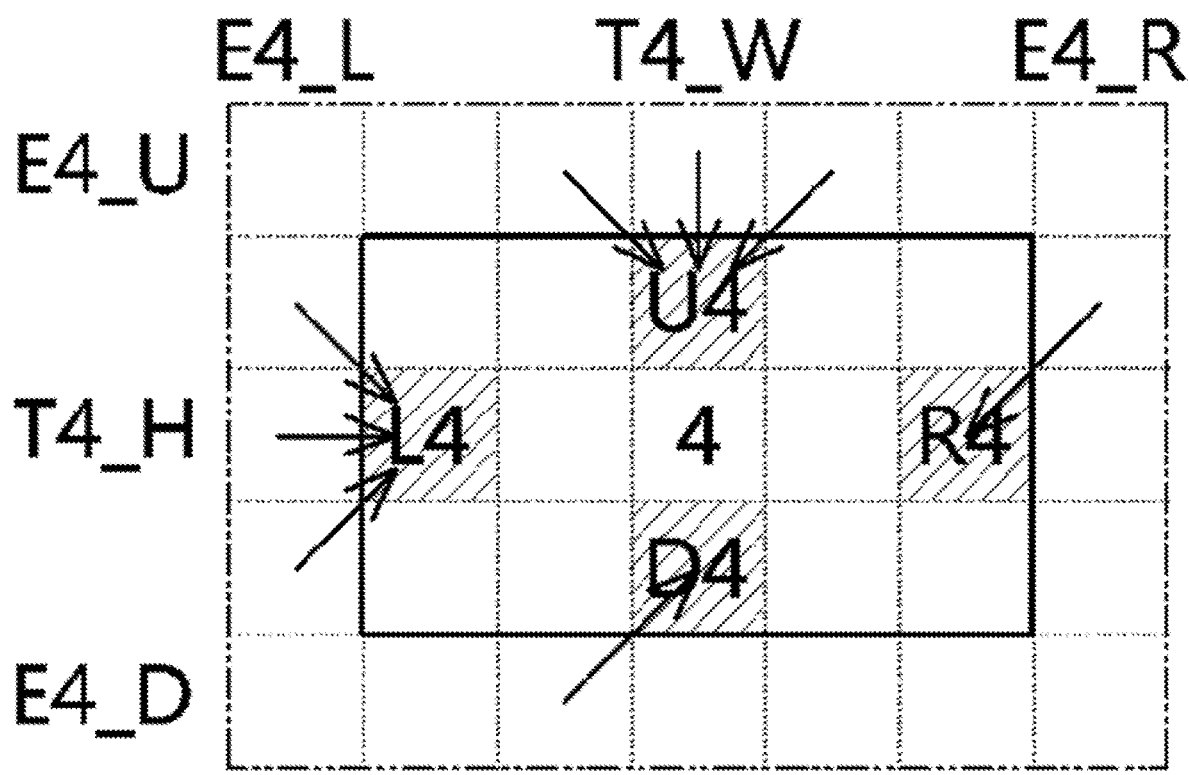
Figure 9F:
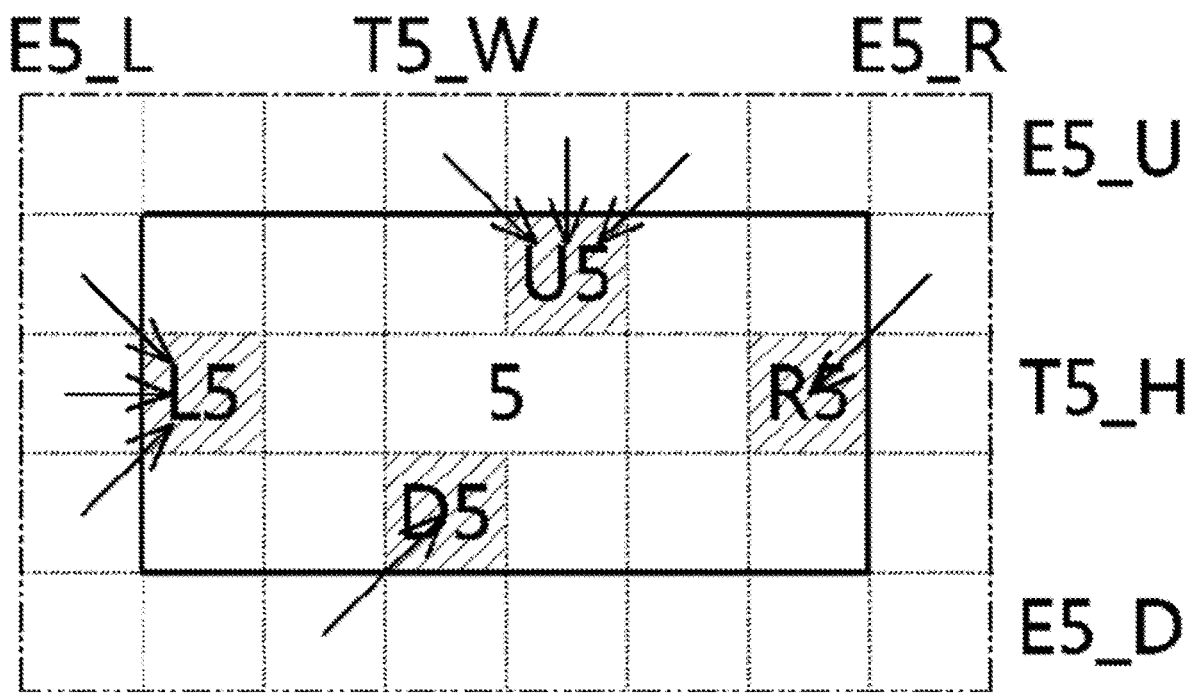
Figure 9G:
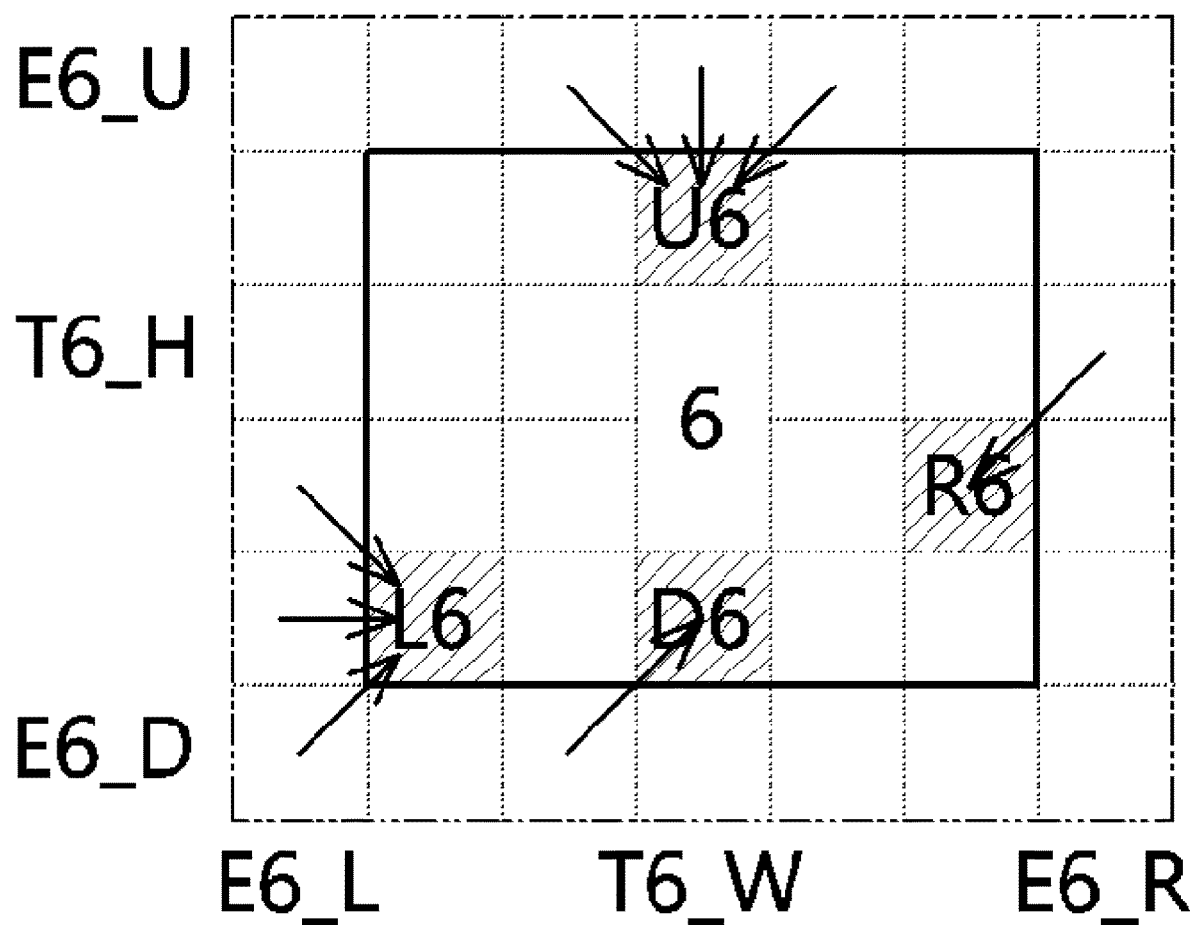
Figure 9H:
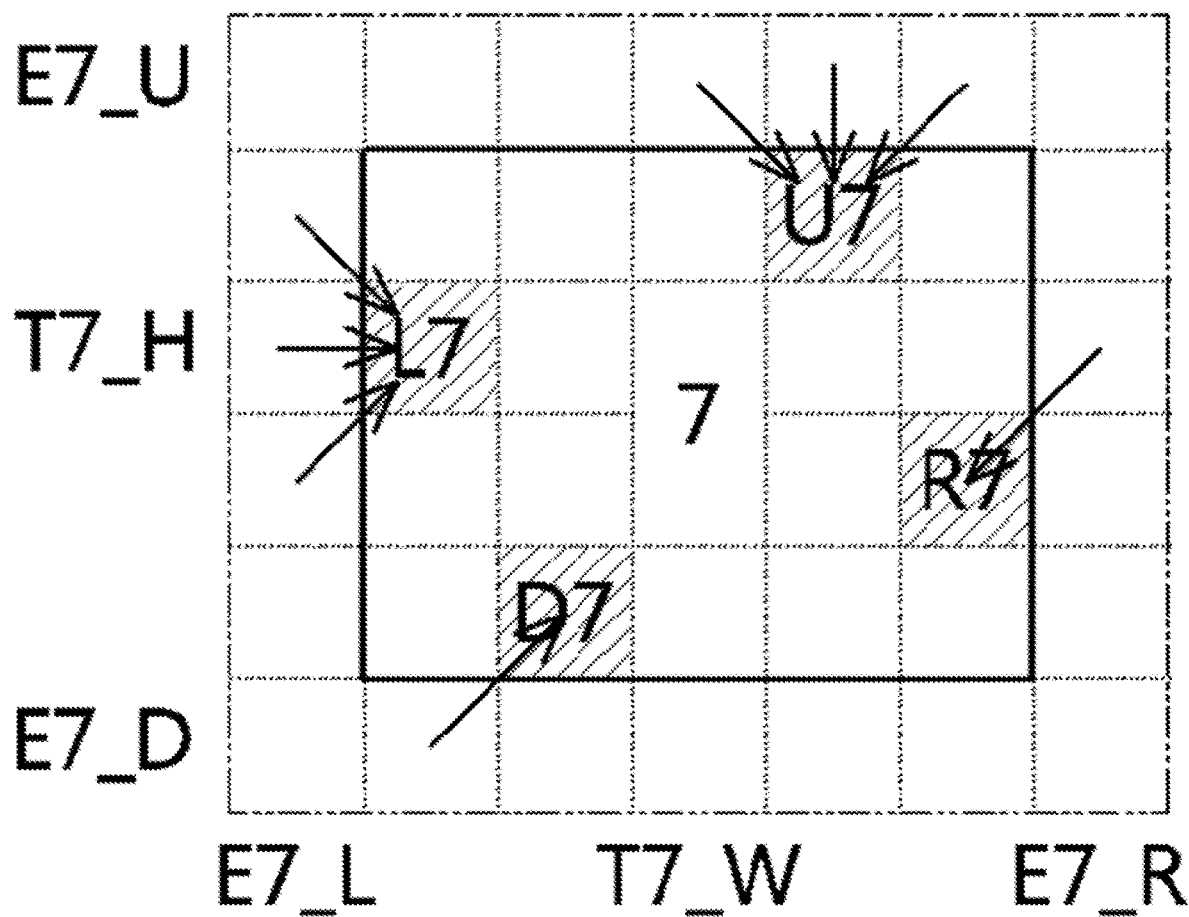
Figure 9I:
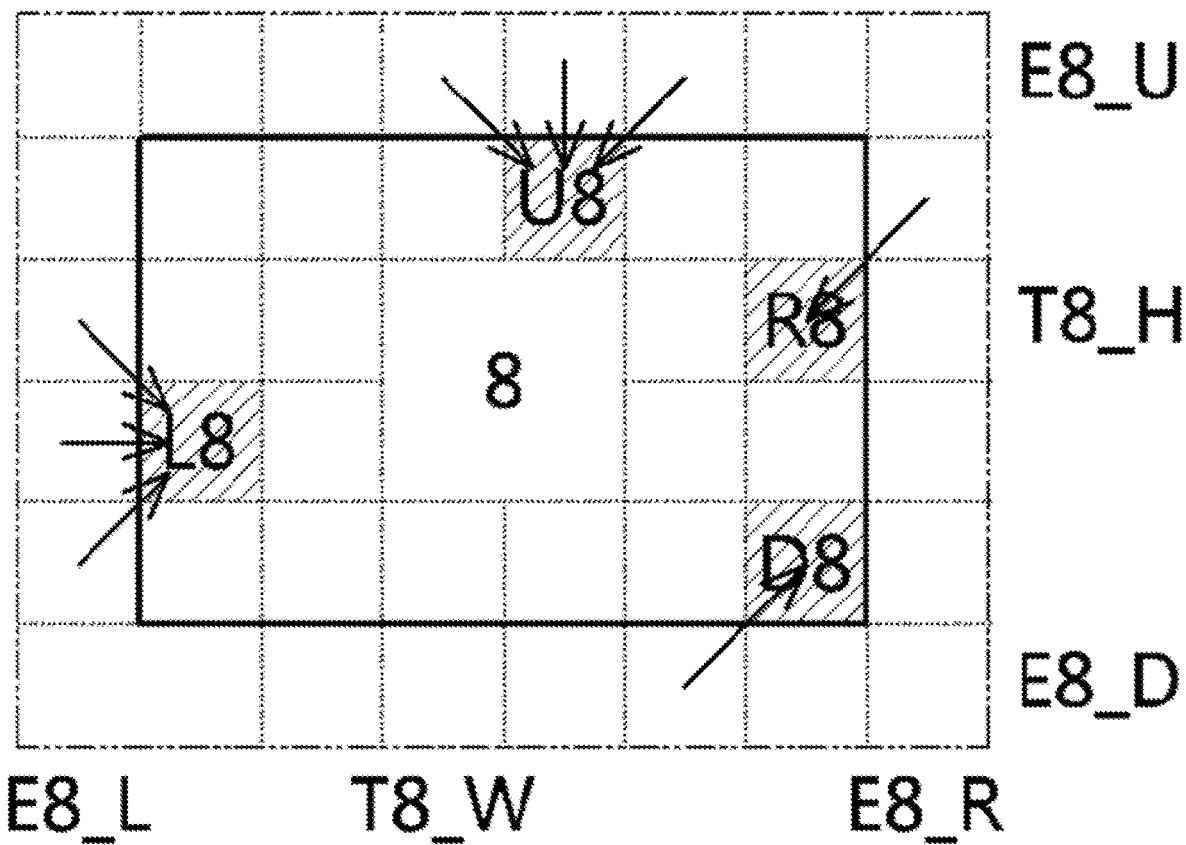

Referring to FIG. 9e, tile 4 is a tile whose tile boundary consists only of an inner boundary (tile 4 in this example). Therefore, an additional area for tile 4 may be set for all of the top, bottom, left and right directions and the top left, bottom left, top right and bottom right directions. Here, the left extended area may be image data obtained from tile 3, the right extended area may be image data obtained from tile 5, the top extended area may be image data obtained from tile 1, and the bottom extended area may be image data obtained from tile data, the top left extended area may be image data obtained from tile 0, the bottom left extended area may be image data obtained from tile 6, the top right extended area may be image data obtained from tile 2, and the bottom right extended area may be image data obtained from tile 8.

Referring to FIG. 9a, tile 0 corresponds to a tile having at least one outer boundary (left and top directions). Accordingly, tile 0 may have an additional area extending not only in spatially adjacent right, bottom, and bottom right directions, but also in outer boundary directions (left, top, and top left directions). Herein, an additional area may be set in spatially adjacent right, bottom, and bottom right directions using data of an adjacent tile, but an additional area with respect to the outer boundary direction are problematic. Herein, the additional area with respect to the outer boundary direction is not spatially adjacent in a picture, but may be set using data having continuity in an actual image. For example, if the projection format of a 360-degree image is Equirectangular, the left boundary of the picture has substantially an image continuity with the right boundary of the picture, and the top boundary of the picture has substantially the image continuity with the bottom boundary of the picture, the left boundary of tile 0 has a continuity with the right boundary of tile 2, and the top boundary of tile 0 has continuity with the bottom boundary of tile 6. Therefore, in tile 0, the left extended area may be obtained from tile 2, the right extended area may be obtained from tile 1, the top extended area may be obtained from tile 6, and the bottom extended area may be obtained from tile 3. In addition, in tile 0, the top left extended area may be obtained from tile 8, the bottom left extended area may be obtained from tile 5, the top right extended area may be obtained from tile 7, and the bottom right extended area may be obtained from tile 4.

Since the L0 block of FIG. 9a is a block located at a tile boundary, data (a situation similar to U0) that may be referred to from the left, top left, bottom left, top, and right blocks may not exist. In this case, although not spatially adjacent in a 2D image, a block having continuity in an actual image may exist in the 2D image (or picture). Therefore, if a projection format of a 360-degree image is Equirectangular as shown in the foregoing premise, and the left boundary of the picture has substantially the continuity of the image with the right boundary of the picture, and the top boundary of the picture has substantially the continuity of the image with the lower boundary of the picture, the left and lower left blocks of the L0 block may be obtained from tile 2, the top left block of the L0 block may be obtained from tile 8, and the top and top right blocks of the L0 block may be obtained from tile 6.

Table 1 below is a pseudo code for obtaining data corresponding to an additional area from another area having continuity.

```
i_pos' = overlap (i_pos, minI, maxI)
overlap (A, B, C)
{
if( A < B ) output = (A + C - B + 1) % (C - B + 1)
else if( A > C ) output = A % (C - B + 1)
else output = A
}
```

Referring to the pseudo code of Table 1, an overlap function parameter i_pos (corresponding to variable A) may mean an input pixel position, i_pos' may mean an output pixel position, minI (corresponding to variable B) may mean the minimum value of a pixel position range, and maxI (corresponding to variable C) may mean a maximum value of the pixel position range, i may mean a position component (horizontal, vertical, etc. in this example), and in this example, minI may be 0, and mail may be Pic_width (picture width)−1 or Pic_height (picture height)−1.

For example, it is assumed that a vertical length of a picture (general image) has a range of 0 to 47 and the picture is divided as shown in FIG. 7. When the additional area is set to m below the tile 4 and the additional area is filled using the data of the top part of the tile 7, the above equation may be used to determine where the data is obtained.

When the vertical length of the tile 4 ranges from 16 to 30 and has additional areas down by 4, the corresponding data of the positions 31, 32, 33, and 34 may be filled into the additional area of the tile 4. At this time, since min and max are 0 and 47, respectively, 31 to 34 are outputted as their own values of 31 to 34. That is, the data to be filled in the additional area is data of positions 31 to 34.

Alternatively, it is assumed that the horizontal length of a picture (360-degree image. Equirectangular. Both ends of the image have continuity) has a range of 0 to 95 and the picture is divided as shown in FIG. 7. When the additional area is set to m left the tile 3 and the additional area is filled using the data of the right part of the tile 5, the above equation can be used to determine where to obtain data.

When the width range of the tile 3 is 0 to 31 and has additional areas left by 4, corresponding data of positions −4, −3, −2, and −1 may be filled into the additional area of the tile 3. Since the above position does not exist in the horizontal length range of the picture, the above equation calculates where to obtain. At this time, since min and max are 0 and 95, respectively, −4 to −1 are output as 92 to 95. That is, the data to be filled in the additional area is data of positions 92 to 95.

In detail, when the area of m is data between 360 degrees and 380 degrees (In this example, the pixel value position range is from 0 to 360 degrees), it can be understood similarly to the case where the data is obtained in an area called 0 to 20 degrees by adjusting the internal range of the image. That is, it can be obtained based on the pixel value position range of 0 to Pic_width−1.

In summary, in order to obtain data of an additional area, the position of data to be acquired may be checked through an overlapping process.

In the above example, in the case of a 360-degree image in which one surface is acquired, it is assumed that spatially adjacent areas within a picture have continuity with each other (except that a picture boundary has continuity at both ends). However, if there are two or more surfaces according to a projection format (for example, cube map, etc.), and each surface is arranged or rearranged, there may be a case where there is no continuity even though it is spatially adjacent in the picture. In this case, the additional area may be generated by checking the data of the position having the continuity of an actual image through the surface arrangement or relocation information.

Table 2 below is a pseudo code for generating an additional area for a specific division unit by using internal data of the specific division unit.

```
i_pos' = clip (i_pos, minI, maxI)
clip (A, B, C)
{
if( A < B ) output = B
else if( A > C ) output = C
else output = A
}
```

The meanings of the variables according to Table 2 are the same as in Table 1, and thus detailed descriptions are omitted. In this example, minI may be the left or top coordinate of a specific division unit, and maxI may be the right or bottom coordinate of each unit.

For example, when a picture is divided as shown in FIG. 7 and the horizontal length of tile 2 is in the range of 32 to 47, and the additional area is m to the right of tile 2, data corresponding to 48, 49, 50, and 51 positions may be filled with data of 47 positions (inside tile 2) output through the above equation. That is, according to Table 2, an additional area for a specific division unit may be generated by copying the outer pixels of the division unit.

In summary, in order to obtain data of an additional area, a position to be acquired may be checked through a clipping process.

The detailed configuration according to Table 1 or Table 2 is not fixed and can be changed. For example, in the case of a 360 degree image, overlapping may be changed and applied immediately in consideration of the arrangement (or relocation) of a surface and the coordinate system characteristics between surfaces.

Figure 10:
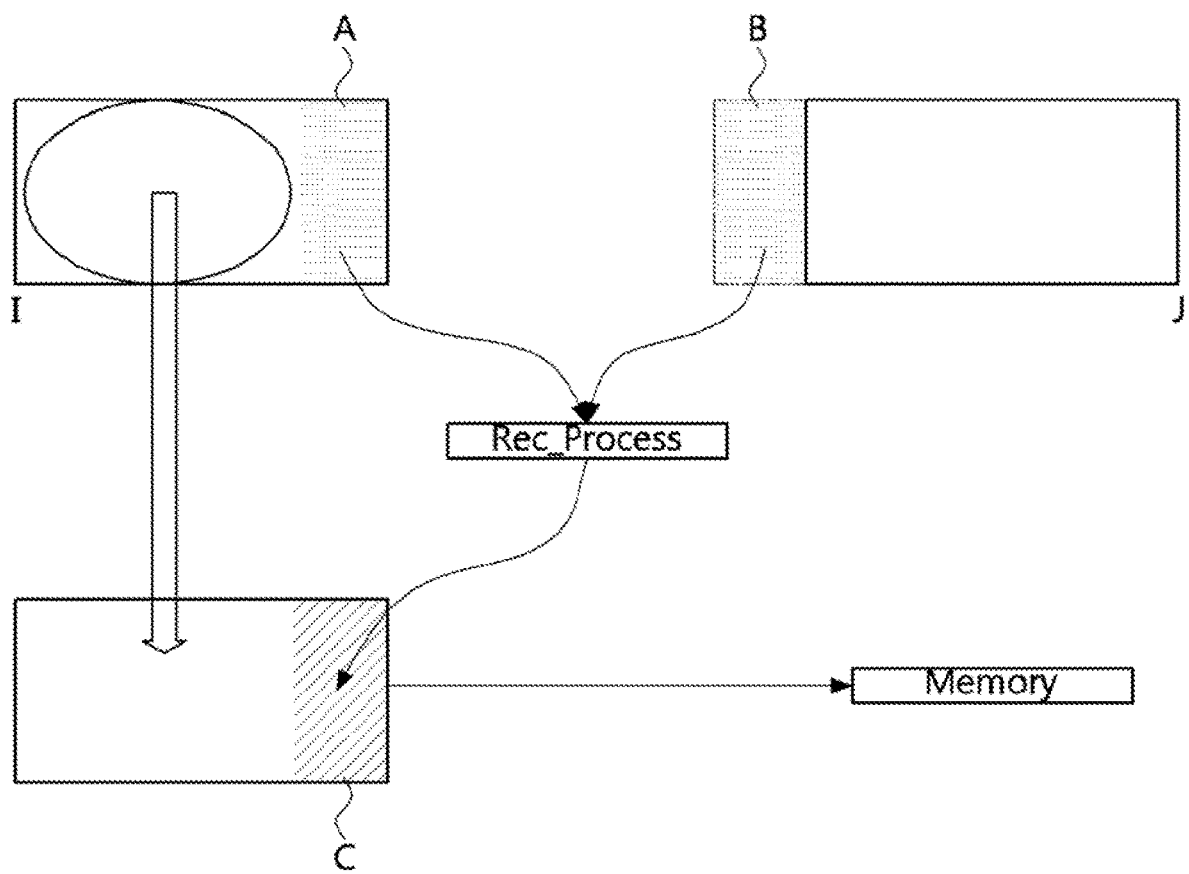
FIG. 10 is an exemplary diagram of using an additional area generated according to an embodiment of the present invention in an encoding/decoding process of another area.

FIG. 10 is an exemplary diagram of using an additional area generated according to an embodiment of the present invention in an encoding/decoding process of another area.

Meanwhile, since an additional area according to an exemplary embodiment of the present invention is generated using image data of another area, it may correspond to overlapped image data. Therefore, after the encoding/decoding is performed to prevent the maintenance of unnecessary redundant data, the additional area may be removed. However, before removing the additional area, it may be considered to remove the additional area after using it in encoding/decoding.

Referring to FIG. 10, it may be seen that B, which is an additional area of division unit J, is generated using area A of division unit I. In this case, before removing the generated area B, the area B may be used for encoding/decoding (in detail, a restoration or correction process) of the area A included in the division unit I.

Specifically, if the division unit I and the division unit J are assumed to be tiles 0 and 1 according to FIG. 7, the right part of the division unit I and the left part of the division unit J have image continuity with each other. Herein, the additional area B may be used for encoding/decoding the area A after referring to the image encoding/decoding of the division unit J. In particular, although the area A and the area B are data obtained from the area A when the additional area is created, the areas A and B may be restored to some different values (including quantization error) during encoding/decoding process. Therefore, when restoring the division unit I, the portion corresponding to the area A may be restored using the restored image data of the area A and the image data of the area B. For example, a partial area C of the division unit I may be replaced by an averages or weighted sum of the areas A and B. Since two or more pieces of data of the same area exist, a reconstructed image (area C. A of division unit I is replaced with C) may be obtained by using data of two areas (the process is named Rec_Process in the drawing).

In addition, the partial areas C belonging to the division unit I may be replaced using the areas A and B according to which division unit is close. Specifically, since image data belonging to a specific range (for example, M pixel intervals) to the left in the area C is adjacent to the division unit I, the image data may be restored by using (or copying) the data of the area A, and since the image data belonging to a specific range (for example, N pixel intervals) to the right in the area C is adjacent to the division unit J, the image data may be restored by using (or copying) the data of the area B. This is represented by the following equation 1.

$$C(x,y)=A(x,y),(x,y)\in M$$

$$B(x,y),(x,y)\in N$$

In addition, the partial area C belonging to the division unit I may be replaced by weighting the image data of the areas A and B according to which division unit is close. That is, the image data close to the division unit I in the area C may give high weight to the image data of the area A, and the image data close to the division unit J may give high weight to the image data in the area B. That is, the weight may be set based on a distance difference between the horizontal width of the area C and the x coordinate of the pixel value to be corrected.

Equation 2 below may be derived as a formula for setting adaptive weights for the areas A and B.

$$C(x,y)=A(x,y)\times w+B(x,y)\times(1-w)$$

$$w=f(x,y,k)$$

Referring to Equation 2, w means a weight given to the pixel coordinates (x, y) of the A area and the B area, In this case, in the sense of the weighted average of the areas A and B, the pixels of the area A are multiplied by the weight w, and the pixels of the area B are multiplied by 1-w. However, in addition to the weighted average, the weights of the different values may be given to the areas A and B, respectively.

As described above, when the additional area is used, the additional area B may be removed in a resizing process for the partition unit J and stored in the memory (DPB, which may be a decoded picture buffer) (In this example, it is assumed that an additional area positioning process is sizing. This process can be derived in some embodiments. <e.g., through the process of checking for additional area flags, then checking size information, and then checking how to fill them up, etc.>. Assume that while the process of getting smaller is performed in the sizing process, the process of getting smaller is performed in the resizing process).

In addition (In detail, immediately after image encoding/decoding), it may be stored in the memory without performing the resizing process, and may be removed by performing the resizing process in an output stage (assuming display phase in this example). This may be applied to all or some division units belonging to the corresponding image.

The relevant setting information may be implicitly or explicitly processed according to an encoding/decoding setting, and in the case of implicitly (in detail, depending on the characteristics, type, format, etc. of the image or based on other encoding/decoding settings (in this example, additional area related settings)), it may be determined without generating a related syntax element, and the unit thereof may include a video, a sequence, a picture, a subpicture, a slice, a tile, and the like.

On the other hand, the conventional coding method according to the division unit may include, 1) dividing a picture into one or more tiles (or generically referred to as division units), and generating division information, 2) performing encoding according to the divided tile unit, 3) performing filtering based on information indicating whether to allow in-loop filters of tile boundaries, and 4) storing the filtered tile in a memory.

In addition, the decoding method according to the conventional division unit may include 1) dividing a picture into one or more tiles based on tile division information, 2) performing decoding on a divided tile basis, 3) performing filtering based on information indicating whether to allow in-loop filters on tile boundaries, and 4) storing the filtered tile in memory.

Herein, the third step of the encoding/decoding method is a post-processing step of encoding/decoding, and may be dependent encoding/decoding if filtering is performed, and independent encoding/decoding if filtering is not performed.

The encoding method of the division unit according to an embodiment of the present invention may include, 1) dividing a picture into one or more tiles and generating division information, 2) setting an additional area for at least one divided tile unit, and filling the additional area using adjacent tile units, 3) performing encoding on a tile unit having an additional area, 4) removing the additional area on the tile unit, and performing filtering based on information indicating whether to allow an in-loop filter of a tile boundary, and 5) storing the filtered tile in memory.

In addition, a decoding method of a division unit of according to an embodiment of the present invention may include, 1) dividing a picture into one or more tiles based on tile division information, 2) setting an additional area with respect to the divided tile unit, and filling the additional area by using decoding information, preset information, or another (adjacent) tile unit that is restored in advance, 3) performing decoding on the tile unit in which the additional area is generated by using the decoding information received from an encoding apparatus, 4) removing the additional area for the tile unit and performing filtering based on information indicating whether to allow the in-loop filter for a tile boundary, and 5) storing the filtered tile in memory In the encoding/decoding method of a division unit according to an embodiment of the present invention, the second step may be an encoding/decoding preprocessing process (if an additional area is set, dependent encoding/decoding, and otherwise, independent encoding/decoding). In addition, the fourth step may be an encoding/decoding post-processing process (if an additional area is set, dependent encoding/decoding, and otherwise, independent encoding/decoding). In this example, an additional area is used in the encoding/decoding process, and the size adjustment is performed to the initial size of the tile before being stored in the memory.

First of all, when an encoder is described, a picture is divided into multiple tiles. Depending on an explicit or implicit setting, additional areas are put on the basis of a tile and relevant data is obtained from adjacent areas. The encoding is performed on the basis of the updated tile including existing tiles and additional areas. After the encoding is completed, the additional areas are removed and filtering is performed according to an in-loop filtering application setting.

In this case, a filtering setting may be changed according to a method of filling and removing an additional area. For example, in case of simple removal, the above in-loop filtering setting may be applied. In case of removing using an overlapping area, filtering may be not applied or other filtering setting may be applied. In other words, since overlapping data may be utilized to reduce distortion of a tile boundary area much, regardless of whether the in-loop filter of a tile boundary unit is applied, filtering may not be performed or a setting different from the filtering setting (e.g., applying a filter with weak filter strength to a tile boundary, etc.) in the tile may be applied depending on whether the above filtering is applied. After the above process, it is saved in a memory.

Referring to a decoder, first, a picture is divided into multiple tiles according to tile division information transmitted from an encoder. Additional area related information is explicitly or implicitly checked to parse encoding information of the updated tile transmitted from the encoder with the additional area. In addition, decoding is performed on the basis of the updated tile. After the decoding is completed, the additional area is removed and filtering is performed according to an in-loop filtering application setting similarly to the encoder. Various cases of this have been described in an encoder, and thus a detailed description thereof will be omitted. After the above process, it is saved in a memory.

On the other hand, the case where an additional area for a division unit is used in an encoding/decoding process and stored in a memory without being deleted may be considered. For example, in the case of a 360-degree image, an accuracy of prediction may be lowered in some prediction processes (e.g., inter prediction), depending on a surface arrangement setting (e.g., when searching and compensating for motion, it is hard to find where the surface arrangement is not continuous). Therefore, in order to increase the accuracy of prediction, additional areas may be stored in the memory and used in a prediction process. If utilized in inter prediction, the additional area (or a picture including the additional area) may be used as a reference picture for inter prediction.

The encoding method according to the case where the additional area is saved may include, 1) dividing a picture into one or more tiles and generating division information, 2) setting an additional area for at least one divided tile unit, and filling an additional area using adjacent tile units, 3) performing encoding on a tile unit having the additional area, 4) preserving additional areas for tile units (where applying in-loop filtering can be omitted), 5) storing the encoded tile in a memory.

The decoding method according to the case where the additional area is saved may include, 1) dividing a picture into one or more tiles based on tile division information, 2) setting an additional area with respect to the divided tile unit, and filling the additional area by using decoding information, preset information, or another (adjacent) tile unit that is restored in advance, 3) performing decoding on the tile unit in which the additional area is generated using decoding information received from the encoding apparatus, 4) preserving the additional area for tile units (in-loop filtering can be omitted), 5) storing the decoded tile in a memory Referring to an encoder according to the case of saving an additional area, a picture is divided into multiple tiles.

Depending on an explicit or implicit setting, additional areas are put on the basis of a tile and relevant data is obtained from preset areas. Since the preset area refers to another area that is correlated according to a surface arrangement setting in a 360-degree image, it may be an area adjacent to a current tile or an area not adjacent to the current tile. Encoding is performed on the basis of the updated tile. Since the additional area will be preserved after the encoding is completed, no filtering is performed regardless of an in-loop filtering setting. The reason is that boundaries of each updated tile do not share actual tile boundaries due to the additional area. After the above process, it is saved in a memory.

Referring to a decoder according to the case of preserving an additional area, a picture checks tile division information transmitted from an encoder, and the picture is divided into multiple tiles accordingly. The additional area related information is checked and encoding information of an updated tile transmitted from an encoder is parsed with the additional area. Decoding is performed on the basis of the updated tile. After the decoding is completed, an in-loop filter is not applied in the additional area and it is saved in a memory.

Hereinafter, an encoding/decoding method for a division unit according to an embodiment of the present invention will be described with reference to the drawings.

Figure 11:
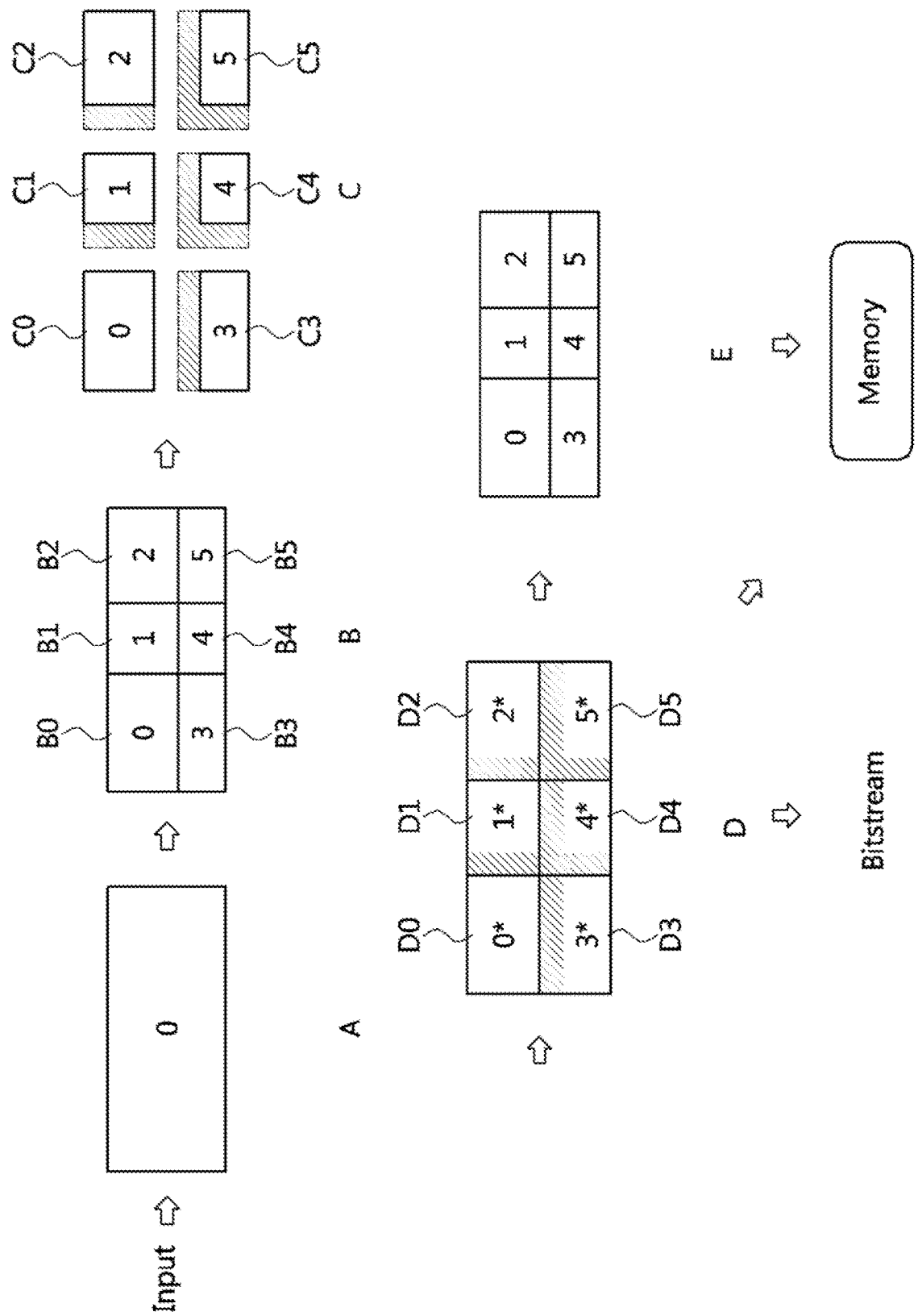
FIGS. 11 to 12 are exemplary diagrams for illustrating an encoding/decoding method for a division unit according to an embodiment of the present invention.
Figure 12:
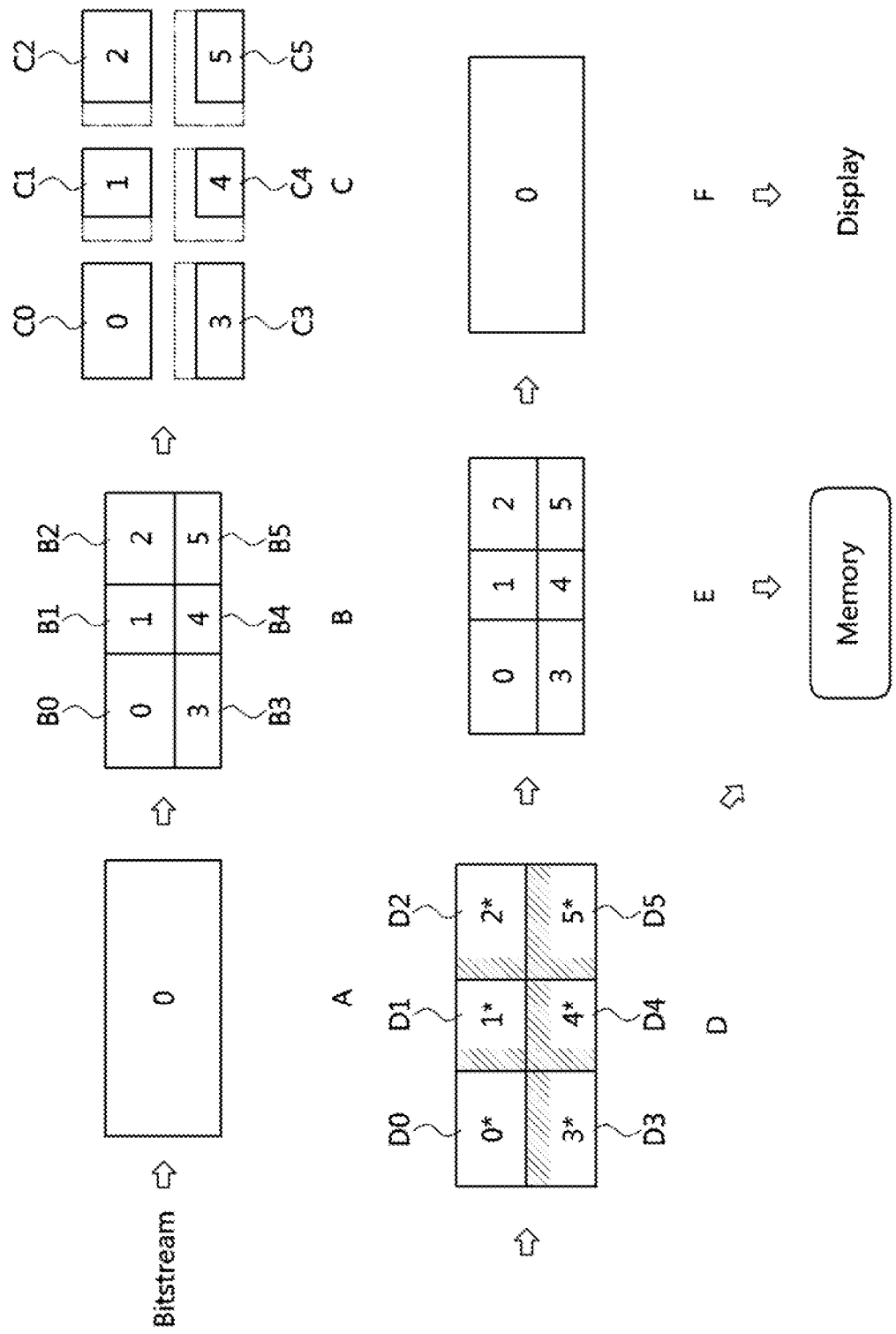

FIGS. 11 to 12 are exemplary diagrams for illustrating an encoding/decoding method for a division unit according to an embodiment of the present invention. Specifically, as an example in which an additional area is generated for each division unit to perform encoding/decoding, FIG. 11 illustrates an encoding method including an additional area, and FIG. 12 illustrates a decoding method for removing the additional area. In the case of a 360-degree image, a pre-processing process (stitching, projection, etc.) may be performed in the previous step of FIG. 11, and a post processing process (rendering, etc.) may be performed in the later step of FIG. 12.

First, referring to FIG. 11, in an encoder, when an input image is acquired (step A), an input image may be divided into two or more division units through a picture division unit (setting information about a division method may be generated at this time, indicated by step B), an additional area for the division unit may be generated according to an encoding setting or whether the additional area is supported (step C), and a bitstream may be generated by performing encoding on the division unit including the additional area (step D). In addition, after generating the bitstream, it may be determined whether to resize (or delete the additional area, step E) each division unit according to the encoding setting, the additional area may be included or the removed encoded data (picture according to D or E) may be stored in a memory (step E).

Referring to FIG. 12, in a decoder, an image to be decoded may be divided into two or more division units by referring to division related configuration information obtained by parsing a received bitstream (step B), a size of an additional area for each division unit may be set according to a decoding setting obtained in the received bitstream (step C), and image data having an additional area may be obtained by decoding image data included in the bitstream (step D). Next, a reconstructed picture may be generated by deleting the additional area (step E), and the reconstructed picture may be output to a display (step F). In this case, whether to delete the additional area may be determined according to a decoding setting, and the reconstructed picture or image data (data according to D or E) may be stored in the memory.

Meanwhile, in step F, a process of restoring a 360-degree image may be included through surface relocation of the reconstructed picture.

On the other hand, in-loop filtering (assuming a deblocking filter in this example. Other in-loop filters may be applicable), may be adaptively performed at the partition unit boundary according to whether additional areas of FIG. 11 or 12 are removed. In addition, in-loop filtering may be adaptively performed depending on whether to generate the additional area is allowed.

When removing the additional area and storing in a memory (for tiles in this example), the in-loop filter may or may not be explicitly applied, according to an in-loop filter application flag at a boundary of a division unit such as loop_filter_across_enabled_flag (In detail, of the initial state).

Alternatively, whether a flag for applying an in-loop filter is not supported at a boundary of a division unit, and whether filtering is applied and a filtering setting may be implicitly determined as in the following example.

In addition, though there is continuity of the image between each division unit, if an additional area is generated for each division unit, the continuity of the image with respect to a boundary between the division units in which the additional area is generated may be lost. In this case, when an in-loop filter is applied, unnecessary computation amount increases and encoding performance is deteriorated, so that the in-loop filter may not be applied implicitly.

In addition, there may be no image continuity between adjacent division units in two-dimensional space according to an arrangement of surfaces in a 360-degree image. As such, when in-loop filtering is performed on boundaries between division units having no image continuity, image quality degradation may occur. Therefore, the in-loop filtering may not be implicitly performed on the boundaries between the division units without the image continuity.

In addition, in the case of replacing some regions of a current division unit by weighting two regions as in the description of FIG. 10, a boundary of each division unit belongs to an inner boundary in an additional area, and in-loop filtering may be applied. In addition, it may not be necessary to perform in-loop filtering because encoding errors may be reduced by a method such as a weight sum with a part of a current region belonging to another region. Therefore, in this case, the in-loop filter may not be implicitly performed.

In addition, whether to apply the in-loop filter may be determined based on a flag indicating whether to apply the in-loop filter (In detail, additional to that boundary). When the flag is activated, filtering may be applied according to the in-loop filter setting, condition, etc. applied inside a division unit, or filtering whose in-loop filter setting, condition, etc. (in detail, additional unlike an in-loop filter setting, condition, etc., if not the boundary of the division unit) applied to a boundary of the division unit are differently defined may be applied.

In the above embodiment, though it is assumed that an additional area is removed and stored in a memory, some of them may be processes that may be performed at other output stages (In detail, it may belong to the in-loop filter unit and may also belong to the post filter unit, etc.).

The above example has been described under the assumption that additional areas are supported in each direction of each division unit, which may be applicable only to a part of the above contents when only some directions are supported according to a setting of the additional areas. For example, a boundary in which the additional area is not supported may be changed in various cases, such as following an existing configuration and the boundary in which the additional area is supported, following the case of the above example. That is, the application may be adaptively determined on all or part of the unit boundary according to the setting of the additional area.

The related setting information may be implicitly or explicitly processed according to an encoding/decoding setting. If implicitly (in detail, depending on the characteristics, type, format, etc. of an image or based on other encoding/decoding settings (in this example, additional area related settings)), the related setting information may be determined without generating a related syntax element, and if explicitly, the related setting information may be adjusted by generating the related syntax element. The unit thereof may include a video, a sequence, a picture, a subpicture, a slice, a tile, and the like.

The following describes a method of determining whether a division unit and an additional area can be referred to. At this time, if it can be referred to, it is dependent encoding/decoding, and if it cannot be referred to, it can be independent encoding/decoding.

The additional area according to an embodiment of the present invention may be referred to or limited in an encoding/decoding process of a current image or another image. In detail, the additional area removed before being stored in a memory may be referred to or limited in the encoding/decoding process of the current image. In addition, the additional area stored in the memory may be referred to or limited in the encoding/decoding process of another image in time as well as the current image.

In summary, a possibility of referencing and range of an additional area may be determined according to an encoding/decoding setting. According to some of the above settings, the additional area of the current image is encoded/decoded and stored in the memory, which means that the reference may be included in the reference image of another image or the reference may be limited. This may be applied to all or some division units belonging to the corresponding image. The case described in the examples to be described later may be changed and applied to the present example.

Setting information on a possibility of referencing an additional area may be implicitly or explicitly processed according to an encoding/decoding setting. If implicitly, it may be determined without generating relevant syntax elements (in detail, depending on the characteristics, type, format, etc. of the image or based on other encoding/decoding settings (in this example, additional area related settings)). If explicitly, setting on the possibility of referencing the additional area may be adjusted by creating relevant syntax elements. The unit thereof may include a video, a sequence, a picture, a subpicture, a slice, a tile, and the like.

In general, some units (assuming a division unit acquired through a picture division unit in this example) in a current image may refer to data of the corresponding unit, and may not refer to data of other units. In addition, some units in the current image may refer to data of all units existing in another image. The above description may be an example of general properties in units obtained through the picture division unit, and additional properties may be defined.

In addition, a flag indicating whether it is possible to refer to another division unit in the current image or whether a division unit belonging to another image may be referred to may be defined.

For example, a division unit belonging to another image and belonging to the same position as the current division unit may be referred to, and reference to a division unit having a different position from the current division unit may be limited. For example, when multiple bitstreams encoded with the same image in different encoding settings are transmitted, and a decoder selectively determines a bitstream for decoding each region (division unit) of the image (in this example, it is assumed that decoding on the basis of a tile is performed), since a possibility of referencing between each division unit must be limited not only in the same space but also in other spaces, encoding/decoding may be performed so as to be referred to only in the same area of another image.

For example, a reference may be allowed or restricted according to the identifier information on a division unit. For example, the identifier information allocated to the division unit may be referred to when they are the same, and may not be referred to when they are not the same. In this case, the identifier information may refer to information indicating that (dependent) encoding/decoding is performed in an environment that can be referred to each other.

The related setting information may be implicitly or explicitly processed according to an encoding/decoding setting. If implicitly, the related setting information may be determined without generating a related syntax element, and if explicitly, the related setting information may be handled by generating the related syntax element. The unit thereof may include a video, a sequence, a picture, a subpicture, a slice, a tile, and the like.

FIGS. 13a to 13g are exemplary diagrams for illustrating an area in which a specific division unit may be referred to. In FIGS. 13a to 13g, areas shown by thick lines may refer to areas that can be referred to.

Figure 13A:
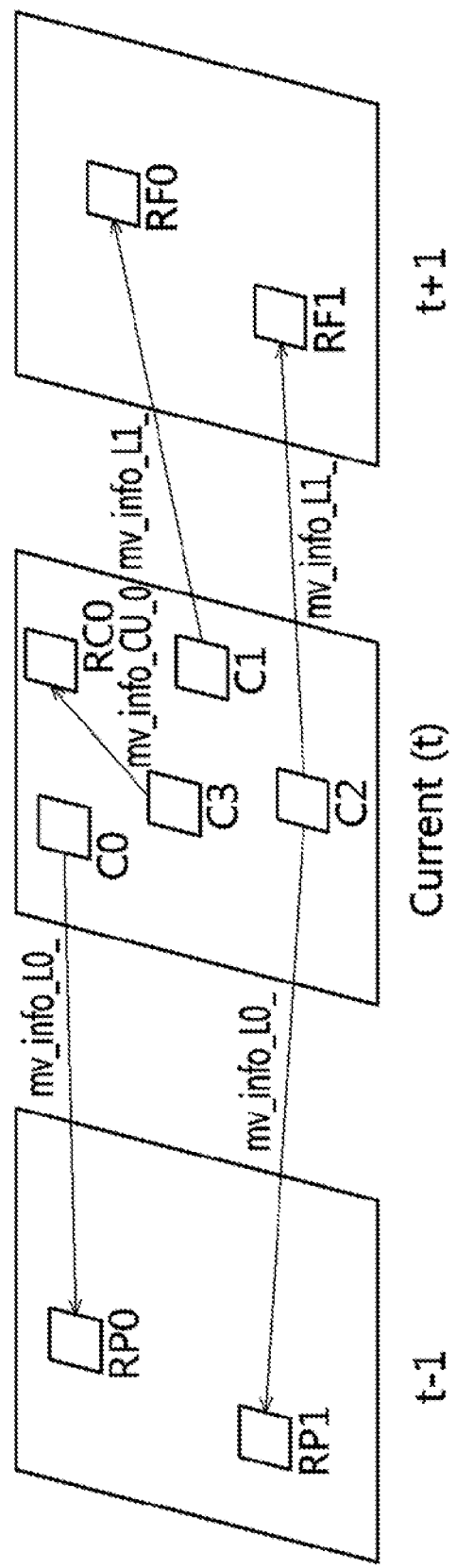

Referring to FIG. 13a, various reference arrows for performing inter prediction may be identified. In this case, in the case of the C0 and C1 blocks, the C0 and C1 blocks represent unidirectional inter prediction. The C0 block can obtain an RP0 reference block before the current picture and an RF0 reference block after the current picture. The C2 block represents bidirectional inter prediction, and the RP1 and RF1 reference blocks may be obtained from a previous picture of the current picture or a subsequent picture of the current picture. The figure illustrates an example of acquiring one reference block in the forward and backward directions, but it may also be possible to acquire the reference block only in the forward direction or only in the backward direction. The C3 block represents the non-directional inter picture prediction, and an RCO reference block can be obtained in the current picture. Although an example of obtaining one reference block is shown in the figure, it may also be possible when acquiring more than one reference block.

In the following example, a pixel value in inter prediction according to a division unit and a possibility of referencing prediction mode information will be mainly described, but other encoding/decoding information (e.g., intra prediction mode information, transform and quantization information, in-loop filter information, etc.) that can be referred to spatially or temporally can be understood.

Figure 13B:
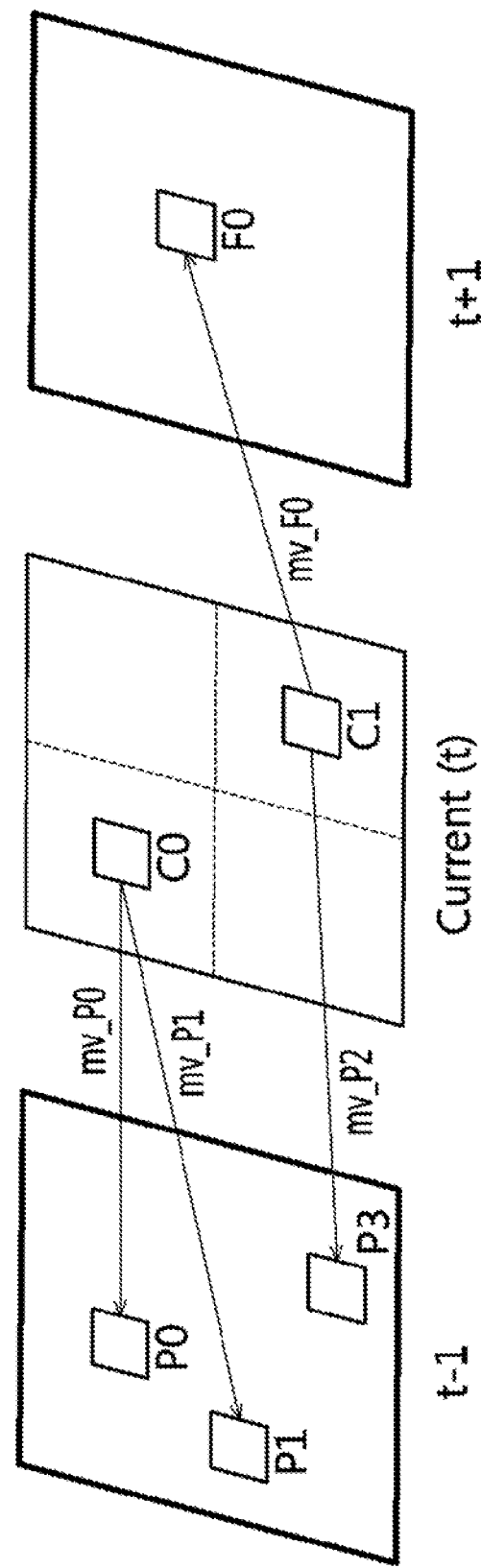

Referring to FIG. 13b, a current picture (Current (t)) is divided into two or more tiles, and blocks C0 of some tiles may obtain reference blocks P0 and P1 by performing inter prediction in one direction. Block C1 of some tiles may obtain reference blocks P3 and F0 by performing inter prediction in both directions. That is, it may be an example in which reference to a block belonging to another position of another image is allowed without a limitation such as a position limitation or a reference allowed only within the current picture.

Figure 13C:
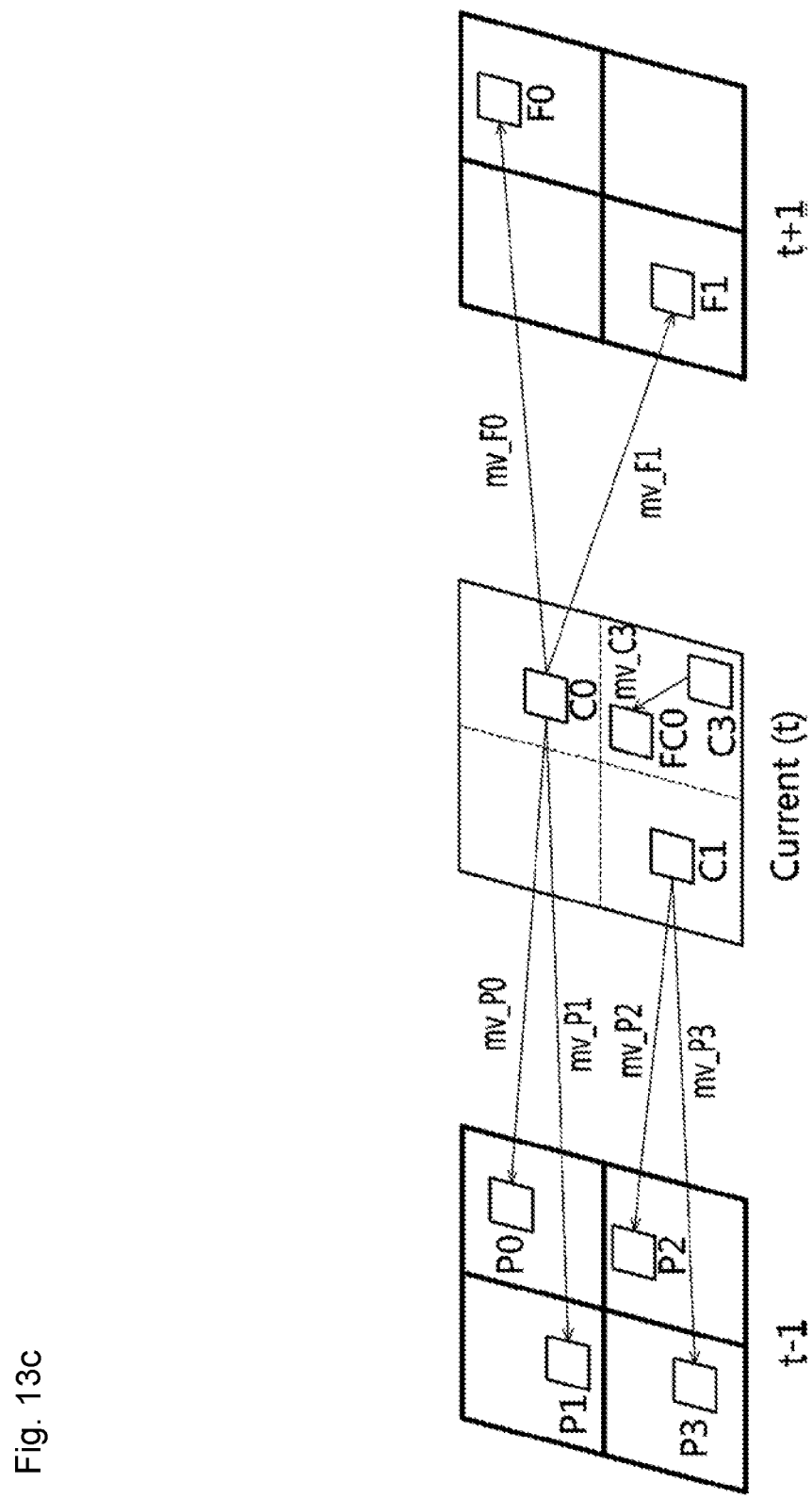

Referring to FIG. 13c, a picture is divided into two or more tile units, and some blocks C1 of some tiles may obtain reference blocks P2 and P3 by performing inter prediction in one direction. Some blocks C0 of some tiles may perform inter prediction in both directions to obtain reference blocks P0, P1, F0, and F1. Some blocks C3 of some tiles may perform inter prediction in a non-directional manner to obtain the reference block FC0.

That is, in FIGS. 13b and 13c, it may be an example in which reference to a block belonging to another position of another image is allowed without a limitation such as a position limitation or a reference allowed only within the current picture.

Figure 13D:
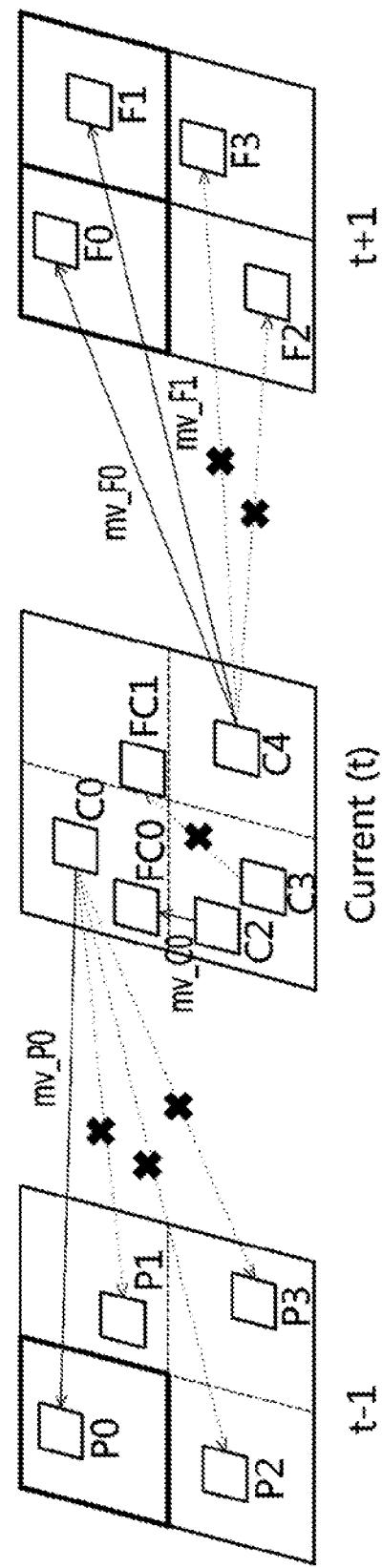

Referring to FIG. 13d, a current picture is divided into two or more tile units, and the block C0 of some tiles may acquire the reference block P0 by performing inter prediction in all directions, but may not obtain the reference blocks P1, P2, and P3 belonging to some tiles. The block C4 of some tiles may acquire reference blocks F0 and F1 by performing inter prediction in the backward direction, but may not obtain reference blocks F2 and F3. Some blocks C3 of some tiles may acquire the reference block FC0 by performing inter prediction in a non-directional manner or may not obtain the reference block FC1.

That is, in FIG. 13d, reference may be possible or limited depending on whether a picture (t−1, t, t+1 in this example) is divided, an encoding/decoding setting of a picture division unit. In detail, reference may be made only to a block belonging to a tile having the same identifier information as the current tile.

Figure 13E:
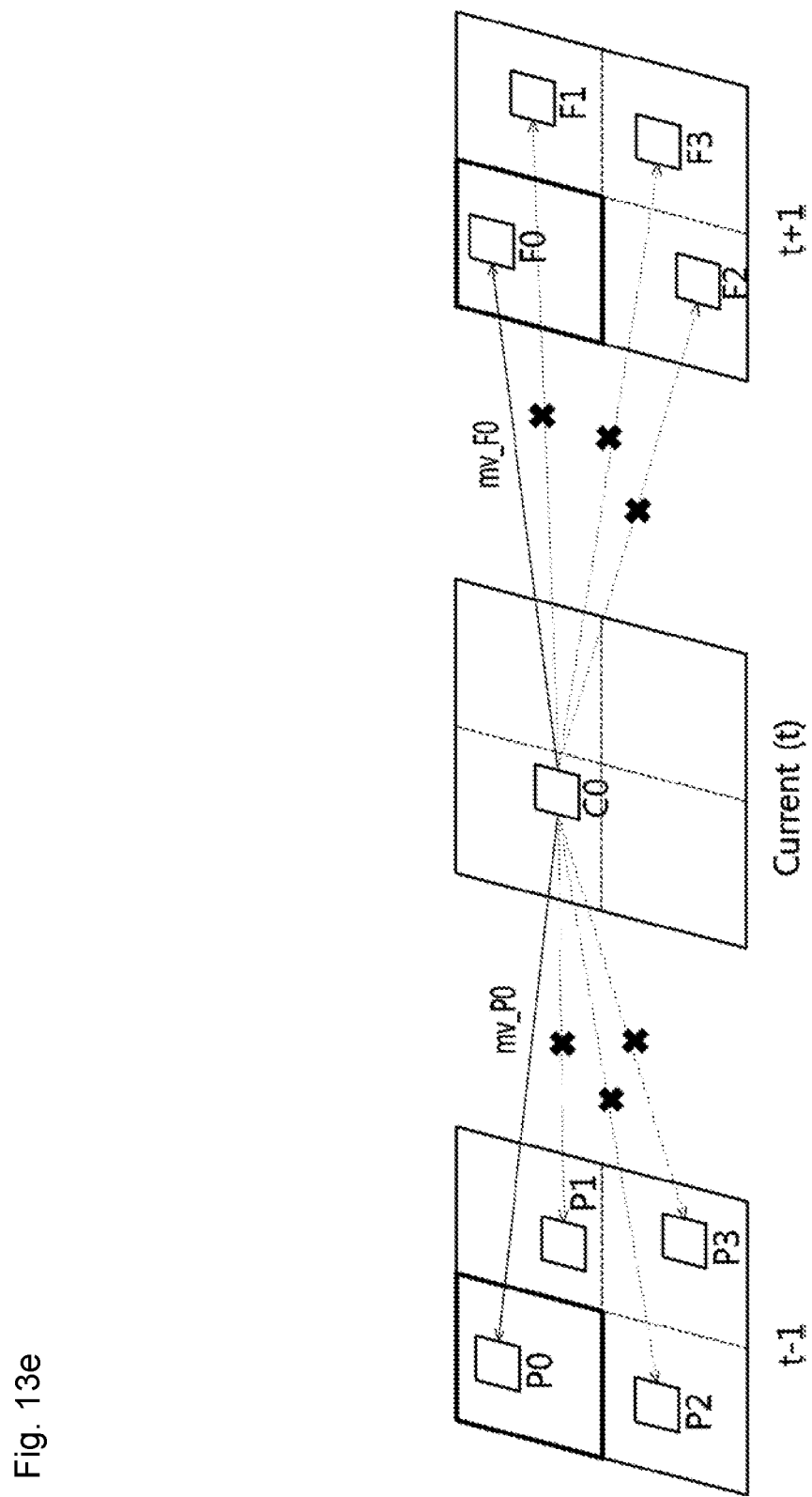

Referring to FIG. 13e, the picture is divided into two or more tile units, and some blocks C0 of some tiles may obtain reference blocks P0 and F0 by performing inter prediction in both directions, or may not obtain reference blocks P1, P2, P3, F1, F2, and F3. That is, in FIG. 13e, reference may be made only to a tile at the same position as a tile to which a current block belongs.

Figure 13F:
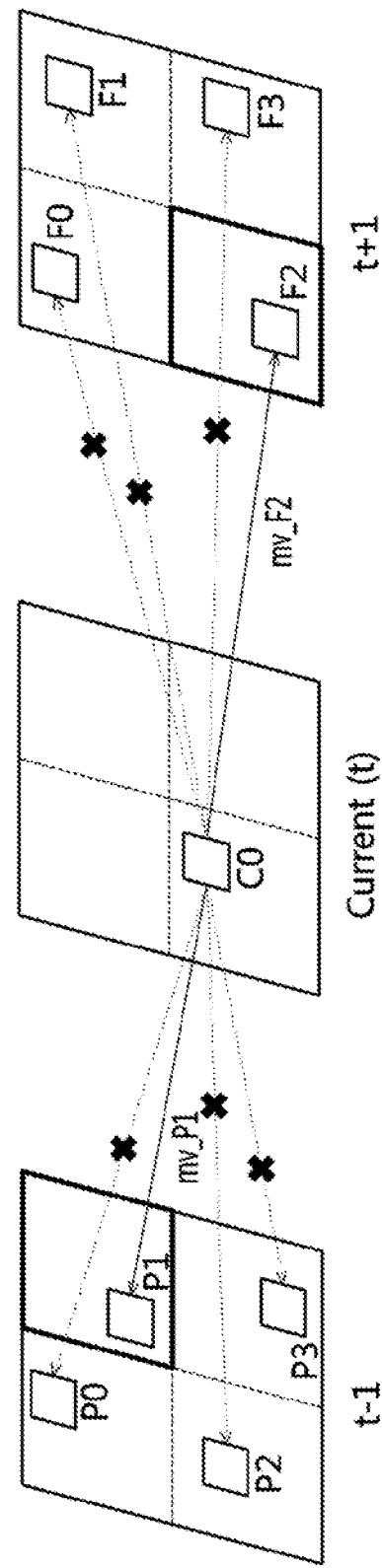

Referring to FIG. 13F, a picture is divided into two or more tile units, and some blocks C0 of some tiles may obtain reference blocks P1 and F2 by performing inter prediction in both directions, or may not obtain reference blocks P0, P2, P3, F0, F1, and F3. In FIG. 13f, a bitstream includes information indicating a tile that can be referred to with respect to a current division unit, and it may be an example of identifying a tile with reference to information.

Figure 13G:
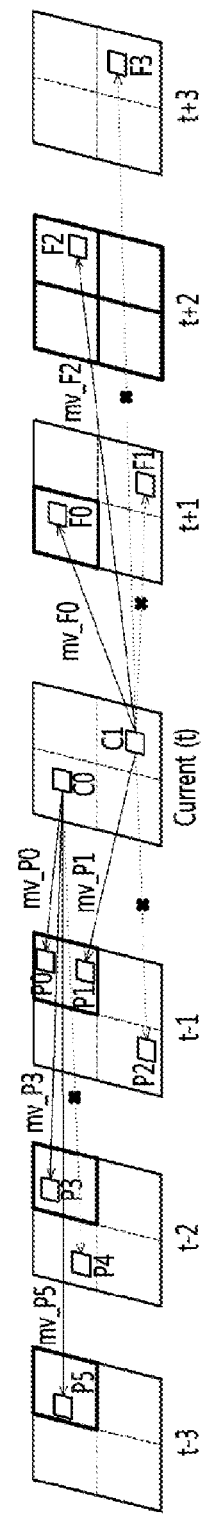

Referring to FIG. 13g, a picture is divided into two or more tiles, and some blocks C0 of some tiles may obtain reference blocks P0, P3, and P5 by performing inter prediction in one direction, or may not obtain reference blocks P4. Some blocks C1 of some tiles may acquire reference blocks P1, F0, and F2 by performing inter prediction in both directions, or may not obtain reference blocks P2 and F1.

FIG. 13g is an example that may be referred to or limited according to whether a picture (t−3, t−2, t−1, t, t+1, t+2, t+3 in this example) is divided, an encoding/decoding setting (in this example, it is assumed that information is determined by identifier information of a division unit, the identifier information of a picture unit, whether a partition area is the same area, whether a partition area is similar area, bitstream information of a division unit, etc.) of a division unit of a picture, and the like. Herein, a referenceable tile may have the same or similar position as a current tile in an image, have the same identifier information (in detail, in the picture unit or the division unit) as the current tile, and may be the same as the bitstream from which the current tile is obtained.

FIGS. 14a to 14e are exemplary diagrams for illustrating a possibility of referencing for an additional area in a division unit according to an embodiment of the present invention. In FIGS. 14a to 14e, the area indicated by the thick line means a referenceable area, and the area shown by the dotted line means an additional area for the division unit.

According to one embodiment of the present invention, reference possibilities for some pictures (other pictures located before or after time) may be limited or allowed. In addition, a possibility of referencing of an entire extended division unit including an additional area may be limited or allowed. In addition, the possibility of referencing may be allowed or limited only for an initial division unit except for the additional area. In addition, the possibility of referencing of a boundary between the additional area and the initial division unit may be allowed or restricted.

Figure 14A:
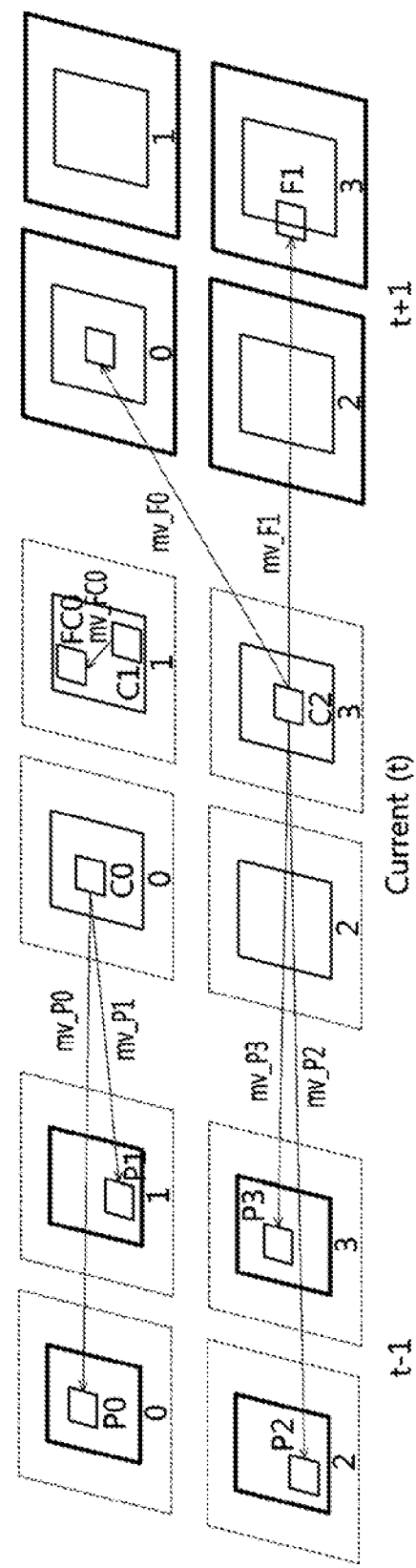
FIGS. 14a to 14e are exemplary diagrams for illustrating a possibility of referencing for an additional area in a division unit according to an embodiment of the present invention.

Referring to FIG. 14a, some blocks C0 of some tiles may perform inter prediction in one direction to obtain reference blocks P0 and P. Some blocks C2 of some tiles may perform inter prediction in both directions to obtain reference blocks P2, P3, F0, and F1. Some blocks C1 of some tiles may perform inter prediction in a non-directional manner to obtain reference block FC0. Herein, the block C0 may acquire the reference blocks P0, P1, P2, P3, and F0 in an initial tile area (a basic tile except an additional area) of some reference pictures t−1 and t+1, and the block C2 may obtain not only the reference blocks P2 and P3 in the initial tile area of the reference picture t−1, but also the reference block F1 in a tile area including the additional area in the reference picture t+1. In this case, as can be seen in the reference block F1, a reference block including a boundary between the additional area and the initial tile area may be obtained.

Figure 14B:
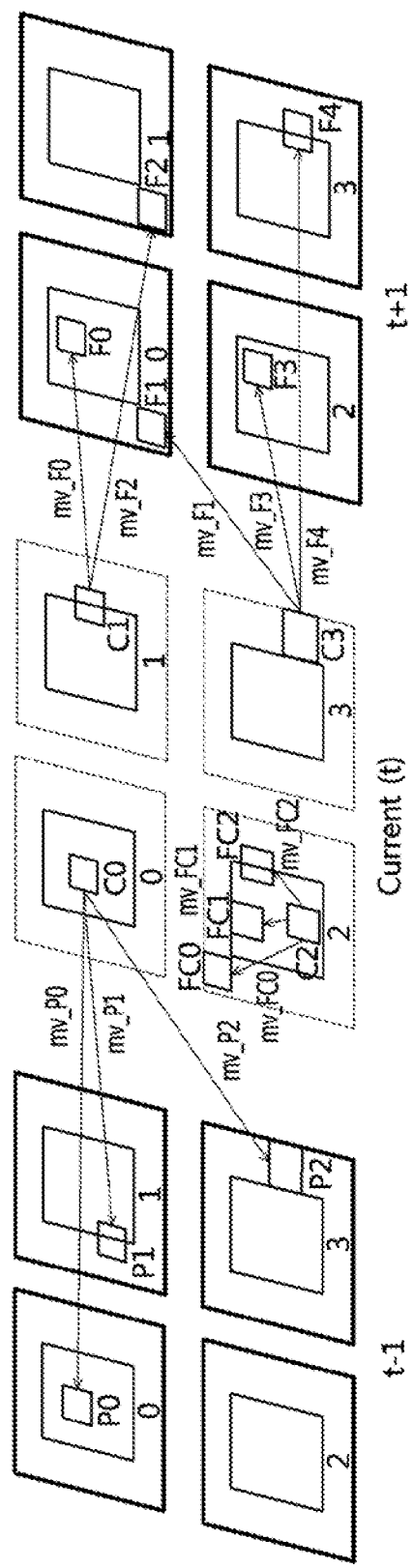

Referring to FIG. 14b, some blocks C0, C1, and C3 of some tiles may perform inter prediction in one direction to obtain reference blocks P0, P1, P2/F0, F2/F1, F3, and F4. Some blocks C2 of some tiles may perform inter prediction in a non-directional manner to obtain reference blocks FC0, FC1, and FC2.

Some blocks C0, C1, and C3 may obtain reference blocks P0, F0, and F3 in an initial tile area of some reference pictures (t−1, t+1 in this example), the reference blocks P1, x, F4 at an updated tile region boundary, and the reference blocks P2, F2, F1 outside the updated tile area boundary.

Some blocks C2 may acquire the reference block FC1 in an initial tile area of some reference picture (t in this example), the reference block FC2 at an updated tile area boundary, the reference block FC0 outside the updated tile area boundary.

Herein, some blocks C0 may be blocks located in an initial tile area, some blocks C1 may be blocks located at an updated tile area boundary, and some blocks C3 may be blocks located outside an updated tile boundary.

Figure 14C:
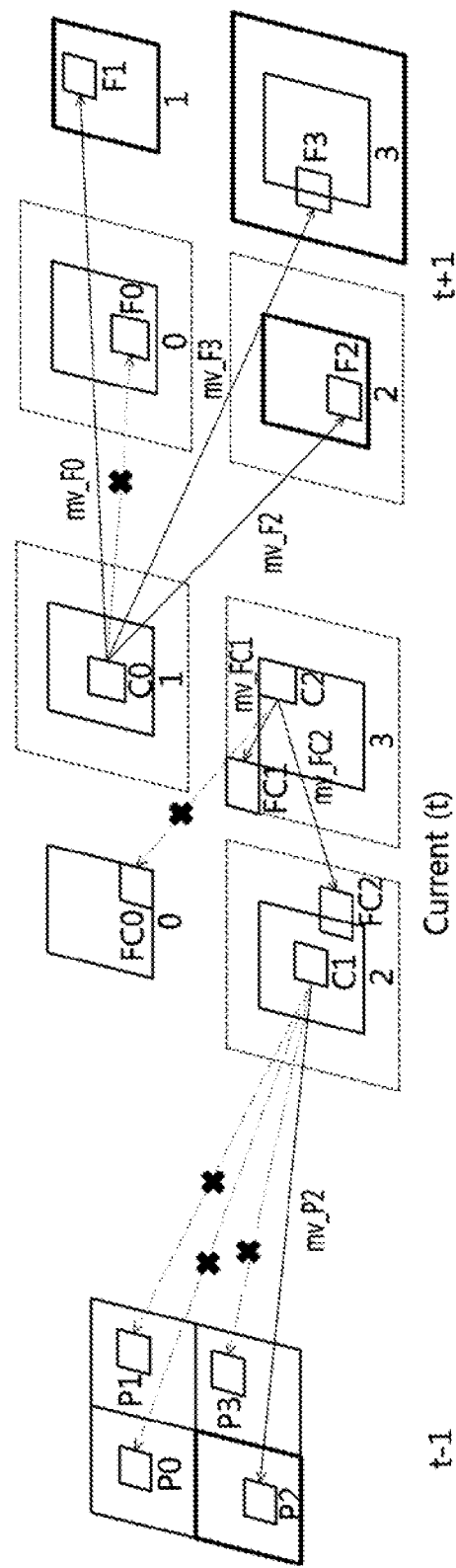

Referring to FIG. 14c, a picture is divided into two or more tile units, some pictures have additional areas in some tiles, some pictures do not have additional areas in some tiles, and some pictures do not have additional areas. Some blocks C0 and C1 of some tiles may obtain reference blocks P2, F1, F2, and F3 by performing inter prediction in one direction, or may not obtain reference blocks P0, P1, P3, and F0. Some blocks C2 of some tiles may obtain reference blocks FC1 and FC2 by performing inter prediction in a non-directional manner or may not obtain reference blocks FC0.

Some blocks C2 may not obtain the reference block FC0 in an initial tile area of some reference pictures (t in this example), and may obtain the reference block FC1 (FC0 and FC1 may be the same area in some additional area filling methods. FC0 may not be referenced in the initial tile division, but may be referenced when bringing the corresponding area to the current tile through additional areas) in an updated tile area.

Some blocks C2 may obtain the reference block FC2 (basically, it is not possible to refer to data of another tile of a current picture, but it is assumed that it can be referred to when a setting becomes referenceable according to an identifier information in the above embodiment) in some tile regions of some reference pictures (t in this example).

Figure 14D:
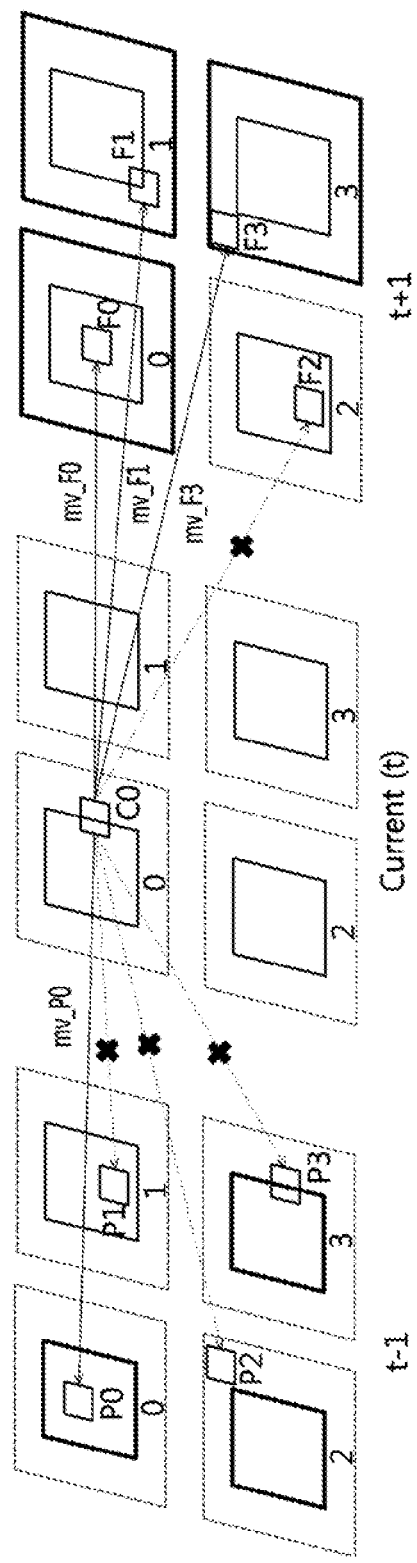

Referring to FIG. 14d, a picture is divided into two or more tile units and has an additional area. Some blocks C0 of some tiles may obtain reference blocks P0, F0, F1, and F3 by performing inter prediction in both directions, or may not obtain reference blocks P1, P2, P3, and F2.

In an initial tile area (tile 0) of some reference pictures t−1 of some blocks C0, the reference block P0 may be obtained, it is limited that the reference block P3 is obtained at an extended tile area boundary, and it is limited that the reference block P2 is obtained outside the boundary of the extended tile area (I.e., additional area).

In an initial tile area (tile 0) of some reference pictures t+1 of some blocks C0, the reference block F0 may be obtained, the reference block F1 may be obtained at an extended tile region boundary, and the reference block F3 may be obtained outside the extended tile region boundary.

Figure 14E:
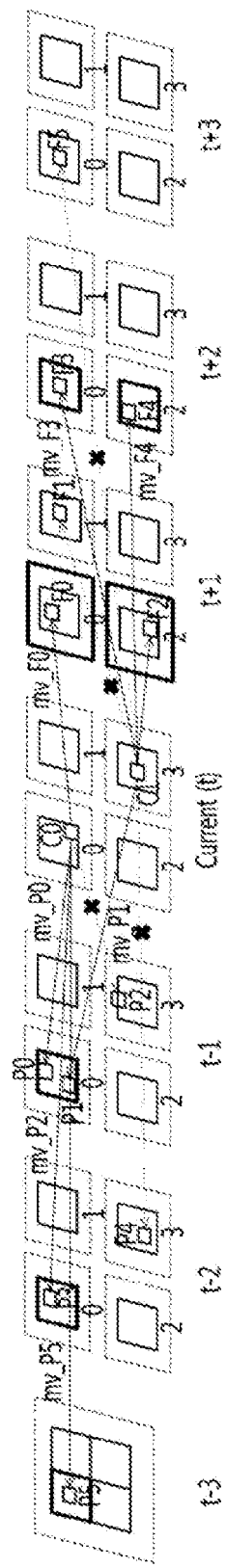

Referring to FIG. 14e, a picture is divided into two or more tiles and has an additional area having at least one size and shape. The block C0 of some tiles may acquire the reference blocks P0, P3, P5, and F0 by performing inter prediction in one direction, but may not obtain the reference block P2 located at a boundary between the additional area and the base tile. The block C1 of some tiles may obtain the reference blocks P1, F2, and F3 by performing inter prediction in both directions, but may not obtain the reference blocks P4, F1, and F5.

As in the above example, the pixel value may be a reference object, and reference restriction on other encoding/decoding information may be possible.

For example, when a prediction unit finds an intra prediction mode candidate group in intra prediction in a spatially adjacent block, whether a division unit to which a current block belongs may refer to a division unit to which an adjacent block belongs may be checked according to the method as illustrated in FIGS. 13a to 14e.

For example, when a prediction unit finds a motion information candidate group in inter prediction in a temporally and spatially adjacent block, whether a division unit to which a current block belongs may refer to a division unit to which a block adjacent to the current picture is spatially or temporally adjacent to the current picture may be checked according to the method of FIGS. 13a to 14e.

For example, when in-loop filter related setting information is found in an adjacent block, whether a division unit to which a current block belongs may refer to a division unit to which an adjacent block belongs may be checked according to the method as illustrated in FIGS. 13a to 14e.

Figure 15:
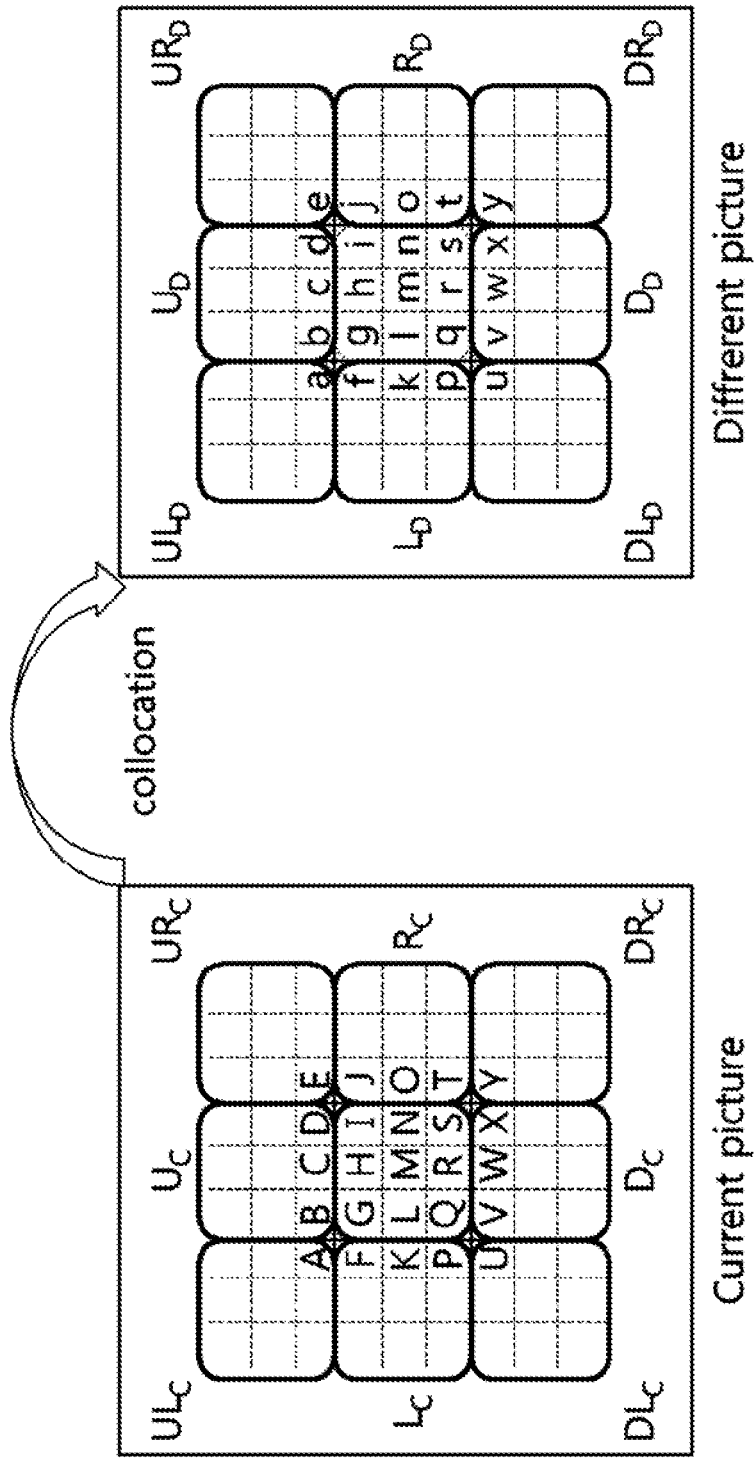
FIG. 15 is an exemplary diagram of a block belonging to a division unit of a different image from a block belonging to a division unit of a current image.

FIG. 15 is an exemplary diagram of a block belonging to a division unit of a different image from a block belonging to a division unit of a current image.

Referring to FIG. 15, blocks in the left, top left, bottom left, top, and top right of a current block may be spatially adjacent reference candidate blocks. In addition, the left, top left, bottom left, top, top right, right, bottom right, bottom, and center blocks of a block (Collocated block) at the same or corresponding position as the current block in an image (Different picture) temporally adjacent to the current image (Current picture) may be temporal reference candidate blocks. In FIG. 15, the thick outline is a boundary line which shows a division unit.

When the current block is M, all spatially adjacent blocks G, H, I, L, and Q may be referable.

When a current block is G, some of the spatially adjacent blocks A, B, C, F, and K may be referable, and the remaining blocks may be limited in reference. Whether reference is possible may be determined according to a reference related setting of a division unit (UC, ULC, LC) to which a spatially adjacent block belongs and a division unit to which a current block belongs.

When a current block is S, some of the blocks (s, r, m, w, n, x, t, o, y) around the same position as the current block in a temporally adjacent image may be referable, and the remaining blocks may be limited in reference. Whether the reference is possible may be determined according to a reference-related setting of a division unit (RD, DRD, DD) to which a block around the same position as the position of the current block in the temporally adjacent image and a unit to which the current block belongs.

If there is a candidate whose reference is restricted according to a position of a current block, a candidate of the next order among a candidate group configuration may be filled, or another candidate adjacent to the candidate whose reference is restricted may be replaced.

For example, in intra prediction, when a current block is G, the top left block is restricted in reference, and a MPM candidate group configuration follows the order of P-D-A-E-U, since A may not be referenced, validation may be made in the order of the remaining E-U to form a candidate group, or B or F spatially adjacent to A may be substituted for A.

Alternatively, in the inter prediction, when the current block is S, the temporally adjacent bottom left block is limited in reference, and a temporal candidate configuration of the skip mode candidate group is y, since y is impossible to refer to, validation may be made in the order of spatially adjacent candidates or mixed candidates of spatial candidates and temporal candidates to form the candidate group, or y may be replaced by t, x, and s adjacent to y.

Figure 16:
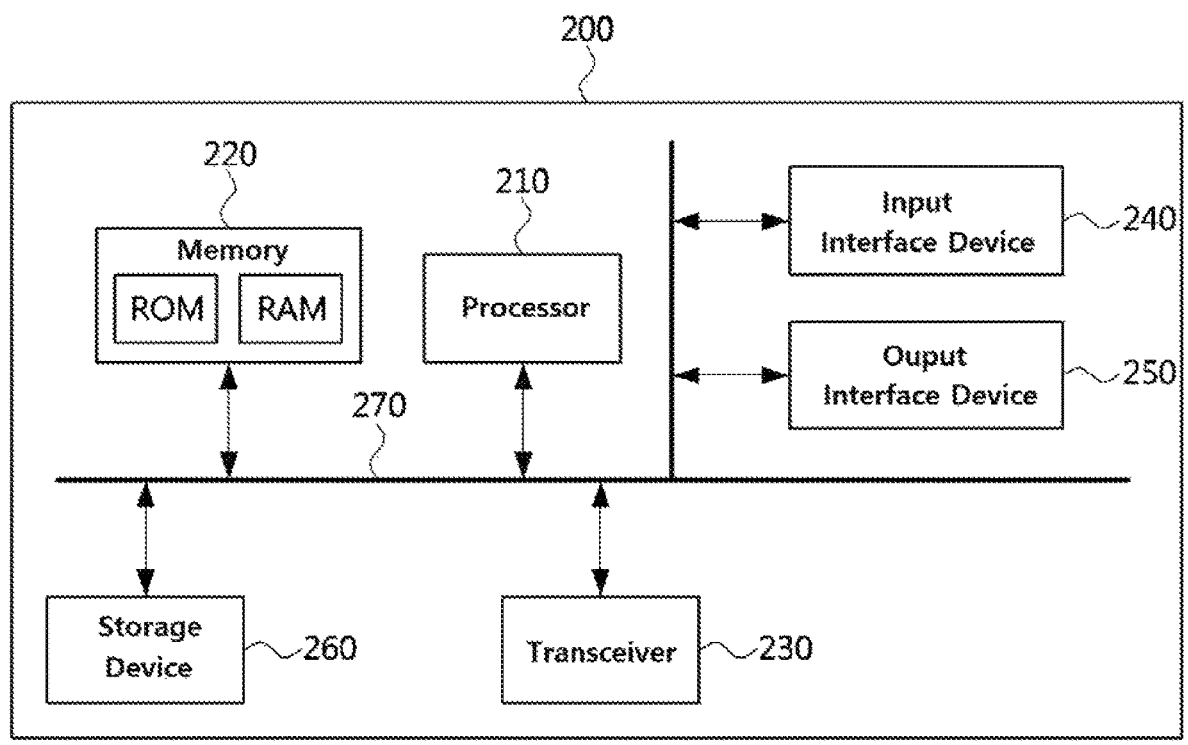
FIG. 16 is a hardware block diagram of an image encoding/decoding apparatus according to an embodiment of the present invention.

FIG. 16 is a hardware block diagram of an image encoding/decoding apparatus according to an embodiment of the present invention.

Referring to FIG. 16, the image encoding/decoding apparatus 200 according to an embodiment of the present invention may include at least one processor 210 and the memory 220 storing instructions instructing at least one processor 210 to perform at least one step.

Herein, the at least one processor 210 may mean a central processing unit (CPU), a graphics processing unit (GPU), or a dedicated processor on which methods according to embodiments of the present invention are performed. Each of the memory 120 and the storage device 260 may be configured as at least one of a volatile storage medium and a nonvolatile storage medium. For example, the memory 220 may be configured as at least one of a read only memory (ROM) and a random-access memory (RAM).

In addition, the image encoding/decoding apparatus 200 may include the transceiver 230 that performs communication through a wireless network. In addition, the image encoding/decoding device 200 may further include the input interface device 240, the output interface device 250, the storage device 260, and the like. Each component included in the image encoding/decoding apparatus 200 may be connected by the bus 270 to communicate with each other.

Herein, at least one step may include dividing an encoded image included in a bitstream into at least one division unit by referring to a syntax element obtained from a received bitstream, setting an additional area for the at least one division unit, and decoding the encoded image based on the division unit in which the additional area is set.

Herein, the decoding of the encoded image may include, according to information indicating a possibility of referencing included in the bitstream, determining a reference block for the current block to be decoded in the encoded image.

Herein, the reference block may be a block belonging to a position overlapping the additional area set in the division unit to which the reference block belongs.

Figure 17:
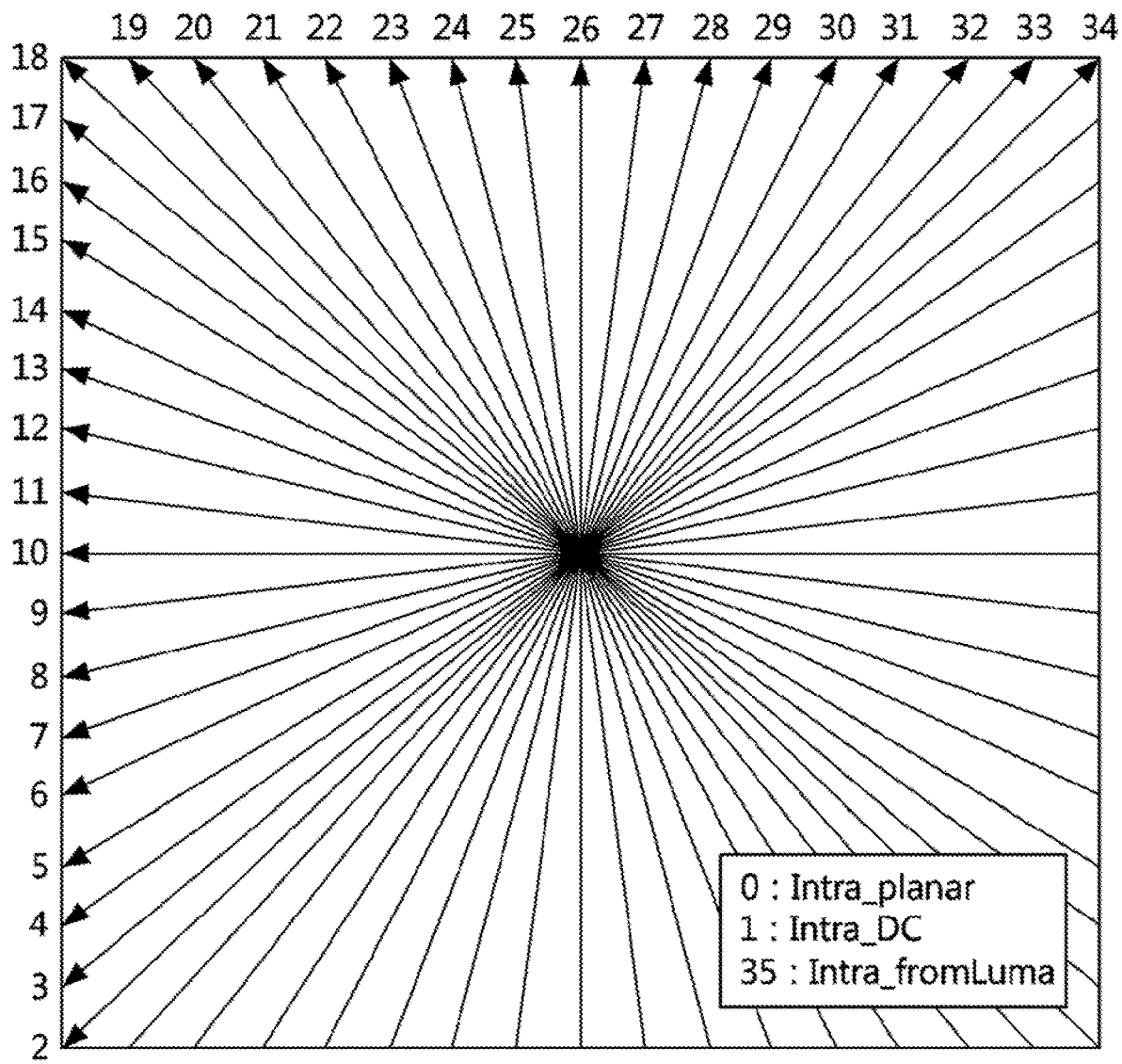
FIG. 17 is an exemplary diagram for illustrating an intra prediction mode according to an embodiment of the present invention.

FIG. 17 is an exemplary diagram for illustrating an intra prediction mode according to an embodiment of the present invention.

Referring to FIG. 17, 35 prediction modes may be identified, and 35 prediction modes may be classified into 33 directional modes and two non-directional modes (DC, planar). In this case, the directional mode may be identified by inclination (for example, dy/dx) or angle information. The above example may mean a prediction mode candidate group for a luminance component or a chrominance component. Alternatively, some prediction modes (e.g., DC, planar, vertical, horizontal, diagonal modes, etc.) may be supported for the color difference component. In addition, when the prediction mode of the luminance component is determined, the corresponding mode may be included as the prediction mode of the chrominance component, or a mode derived from the corresponding mode may be included as the prediction mode.

In addition, a reconstruction block of another color space in which encoding/decoding is completed may be used for prediction of the current block by using the correlation between color spaces, and may include a prediction mode supporting the same. For example, in the case of a chrominance component, a reconstructed block of luminance components corresponding to the current block may be generated as a prediction block of the current block.

The prediction mode candidate group may be adaptively determined according to an encoding/decoding setting. The number of candidates in the group may be increased for the purpose of improving the accuracy of prediction, and the number of candidates in the group may be reduced for the purpose of reducing the amount of bits according to a prediction mode.

For example, one of candidate groups such as A candidate group (67.65 directional modes and two non-directional modes), B candidate group (35.33 directional modes and two non-directional modes), and C candidate group (19.17 directional modes and two non-directional modes) may be used. Unless otherwise described in the present invention, it is assumed that intra prediction is performed with one preset prediction mode candidate group (A candidate group).

Figure 18:
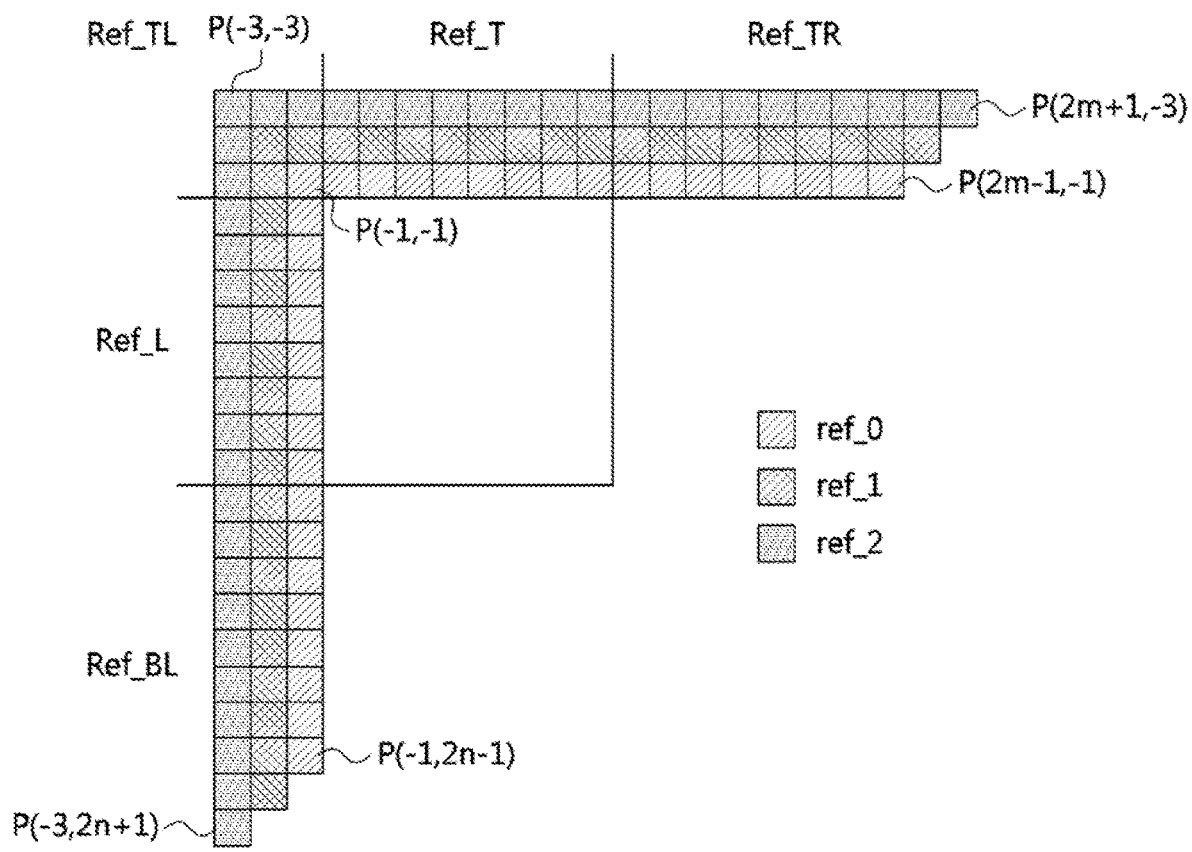
FIG. 18 is a first exemplary diagram of a reference pixel configuration used for intra prediction according to an embodiment of the present invention.

FIG. 18 is a first exemplary diagram of a reference pixel configuration used for intra prediction according to an embodiment of the present invention.

An intra prediction method in image encoding according to an embodiment of the present invention may include constructing a reference pixel, generating a prediction block using at least one prediction mode with reference to the constructed reference pixel, determining an optimal prediction mode, and encoding the determined prediction mode. In addition, the apparatus for encoding an image may be configured to include a reference pixel constructing unit for implementing a reference pixel constructing step, a prediction block generation unit for implementing a prediction block generating step, a prediction mode determiner for implementing a prediction mode determining step, and a prediction mode encoder for implementing a prediction mode encoding step. Some of the processes described above may be omitted or other processes may be added, and may be changed in an order other than the order described above.

Meanwhile, in an intra prediction method according to an embodiment of the present invention, a reference pixel may be configured and a prediction block for the current block may be generated according to a prediction mode obtained through syntax information received by an image encoding apparatus.

A size and shape (M×N) of a current block on which intra prediction is performed may be obtained from a block division unit and may have a size of 4×4 to 256×256. Intra prediction may be generally performed on the basis of a prediction block, but may be performed on the basis of a coding block (or a coding unit), a transform block (or a transformation unit), or the like, according to a setting of the block division unit. After checking block information, a reference pixel configuration unit may configure a reference pixel used for prediction of the current block. In this case, the reference pixel may be managed through a temporary memory (for example, an array. primary or secondary array, etc.), generated and removed for each intra prediction process of the block, and a size of the temporary memory may be determined according to the reference pixel configuration.

A reference pixel may be a pixel belonging to an adjacent block (may be referred to as a reference block) located at the left, top, top left, top right, and bottom left of a current block, but a block candidate group having another configuration may be used for prediction of the current block. Herein, adjacent blocks located at the left, top, top left, top right, and bottom left may be selected blocks according to the case where encoding/decoding is performed according to a raster or Z scan. It may be a reference pixel. If the scanning order is different, a pixel belonging to the adjacent block at different position may also be a reference pixel.

In addition, a reference block may be a block corresponding to the current block in a color space different from the color space to which the current block belongs. Herein, when Y/Cb/Cr format is taken as an example, the color space may mean one of Y, Cb, and Cr. In addition, the block corresponding to the current block may mean a block having the same position coordinates as the current block or having a position coordinate corresponding to the current block according to a composition ratio of color components.

In addition, for convenience of description, a reference block according to a preset position (left, top, top left, top right, bottom left) is described on the premise that one block is configured, but it may be composed of multiple sub blocks according to block division.

In summary, an adjacent region of a current block may be a position of a reference pixel for intra prediction of the current block, and an area corresponding to the current block of another color space may be further considered as a position of the reference pixel according to a prediction mode In addition to the above example, a position of a reference pixel defined according to a prediction mode, a prediction method, or the like may be determined. For example, when generating a prediction block through a method such as block matching, a region included in a search range in a region where encoding/decoding is completed or a region where encoding/decoding is completed before a current block of a current image may be considered as a position of the reference pixel.

Referring to FIG. 18, a reference pixel used for intra prediction of a current block (the size of M×N) may be compose of left, right, top left, top right, and bottom left adjacent pixels (Ref_L, Ref_T, Ref_TL, Ref_TR, Ref_BL) of the current block. In this case, what is represented in the form of P (x, y) in FIG. 18 may mean pixel coordinates.

Meanwhile, pixels adjacent to the current block may be classified into at least one reference pixel layer. The pixels closest to the current block may be classified into ref_0 {pixels having pixel value difference of 1 with a boundary pixel of the current block. p(−1, −1)~p(2M−1, −1), p(−1, 0) p(−1, 2N−1)}, the next adjacent pixel ref_1 {pixels having pixel value difference of 2 with a boundary pixel of the current block. p (−2, −2) to p(2M, −2), p (−2, −1) to p(−2, 2N)}, and the next adjacent pixel ref_2 {pixels having pixel value difference of 3 with a boundary pixel of the current block. p (−3, −3) to p(2M+1, −3), p (−3, −2) to p(−3, 2N+1)}. That is, reference pixels may be classified into multiple reference pixel layers according to pixel distances adjacent to boundary pixels of the current block.

In addition, a reference pixel layer may be set differently for each adjacent neighboring block. For example, when using a block neighboring the top of a current block as a reference block, a reference pixel according to layer ref_0 is used, and when a block adjacent to the top right of the current block is used as a reference block, a reference pixel according to layer ref_1 may be used.

Herein, in general, a reference pixel set referred to when performing intra prediction may belong to neighboring blocks adjacent to a current block in the bottom left, left, top left, top, and top right, and may be a pixel belonging to the layer ref_0 (a pixel closest to a boundary pixel). Unless otherwise described below, it is assumed that these pixels. However, only pixels belonging to some of the aforementioned neighboring blocks may be used as the reference pixel set, or pixels belonging to two or more layers may be used as the reference pixel set. Herein, the reference pixel set or the layer may be implicitly determined (preset in an encoding/decoding apparatus) or may be explicitly determined (determined by information received from the encoding apparatus).

Herein, although the supported reference pixel layer is described on the premise of a maximum of three, it may have more values. The number of reference pixel sets (or may be referred to as a reference pixel candidate group) according to the number of reference pixel layers and a position of referenceable neighboring blocks may be set differently according to a size, shape, prediction mode, image type <I/P/B. in this case, the image is a picture, slice, tile, etc.>, color component, etc. of the block. The related information may be included in a unit such as a sequence, a picture, a slice, a tile, and the like.

Although the present invention is described on a premise of allocating a low index (incremented by 1) from the reference pixel layer closest to a current block, the present invention is not limited thereto. In addition, information related to a reference pixel configuration to be described later may be generated under the above index setting (such as binarization, which assigns short bits to a small index when selecting one of multiple reference pixel sets).

In addition, when there are two or more supported reference pixel layers, a weighted average, etc. may be applied using each reference pixel included in the two or more reference pixel layers.

For example, a prediction block may be generated by using a reference pixel obtained by a weighted sum of pixels located in layers ref_0 and ref_1 of FIG. 18. In this case, the pixel to which the weighted sum is applied in each reference pixel layer may be a decimal unit pixel as well as an integer unit pixel according to a prediction mode (e.g., prediction mode directionality, etc.). In addition, one prediction block may be obtained by weighting a prediction block obtained by using a reference pixel according to the first reference pixel layer and a prediction block obtained by using the reference pixel according to the second reference pixel layer. In this case, the weight may have a higher weight as a prediction block according to a reference pixel layer adjacent to the current block.

Assuming that information is explicitly generated in relation to a reference pixel configuration, indication information (In this example, adaptive_intra_ref_sample_enabled_flag) allowing an adaptive reference pixel configuration may occur on the basis of a video, a sequence, a picture, a slice, a tile, and the like.

When the indication information means that an adaptive reference pixel configuration is allowed (in this example, adaptive_intra_ref_sample_enabled_flag=1), information (in this example, adaptive_intra_ref_sample_flag) of an adaptive reference pixel configuration may occur on the basis of a picture, a slice, a tile, a block, and the like.

When the configuration information means an adaptive reference pixel configuration (in this example, adaptive_intra_ref_sample_flag=1), information of a reference pixel configuration related (e.g., selection information about a reference pixel layer and a reference pixel set, etc. in this example intra_ref_idx) may be generated on the basis of a picture, a slice, a tile, a block, and the like.

In this case, when an adaptive reference pixel configuration is not allowed or a reference pixel configuration is not adaptive, the reference pixel may be configured according to a predetermined setting. In general, to configure the most adjacent pixel of a neighboring block as the reference pixel is an example of that, but the present invention is not limited thereto, and a variety of cases (e.g., when ref_0 and ref_1 are selected as reference pixel layers and prediction pixel values are generated through a method such as weighted sum through ref_0 and ref_1, i.e., if implicitly) may be possible.

In addition, information related to a reference pixel configuration (e.g., selection information about a reference pixel layer or set, etc.) may be configured (e.g. ref_1, ref_2, ref_3, etc.) except for preset information (e.g., if the reference pixel layer is preset to ref_0), but is not limited thereto.

Some examples of the reference pixel configuration have been described through the above example, which may be combined with various encoding/decoding information and the like to determine an intra prediction setting. In this case, encoding/decoding information may correspond to an image type, a color component, a size, a shape of a current block, a prediction mode {type of prediction mode (directional, non-directional), direction of prediction mode (vertical, horizontal, diagonal 1, diagonal 2, etc.)}, and the like. An intra prediction setting (in this example, a setting of reference pixel configuration) may be determined according to encoding/decoding information of a neighboring block and a combination of encoding/decoding information of a current block and a neighboring block FIGS. 19*a* to 19*c* are second exemplary diagrams of reference pixel configurations according to an exemplary embodiment of the present invention.

Figure 19A:
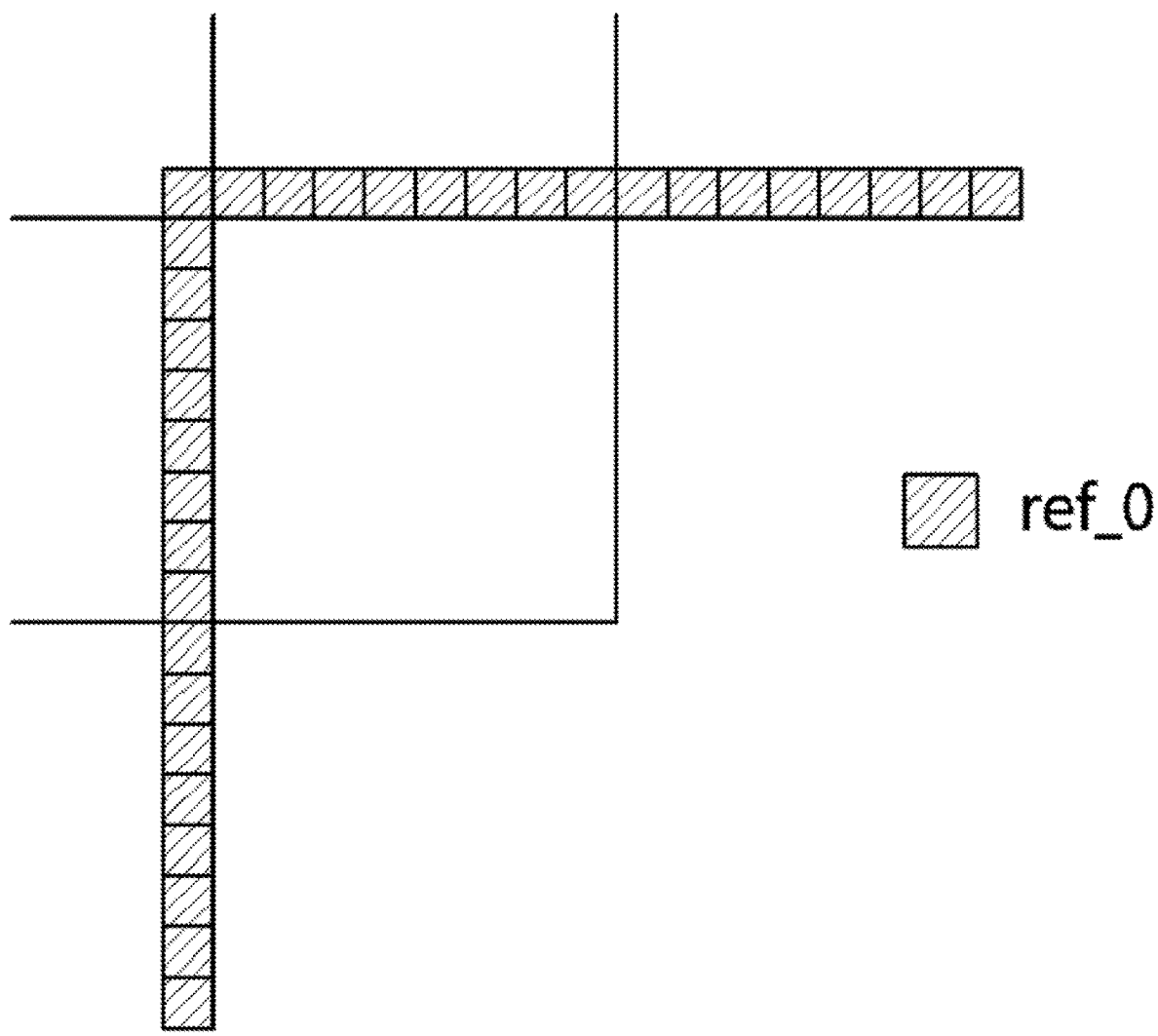
FIGS. 19a to 19c are second exemplary diagrams of reference pixel configurations according to an exemplary embodiment of the present invention.

Referring to FIG. 19*a*, a case in which a reference pixel is configured using only the reference pixel layer ref_0 of FIG. 18 may be confirmed. Subsequent intra prediction (some intra prediction may be adaptively performed depending on the reference pixel configuration such as reference pixel generation, reference pixel filtering, reference pixel interpolation, prediction block generation, post-processing filtering) may be performed after configuring the reference pixel by using pixels belonging to a neighboring block (e.g., bottom left, left, top left, top, top right) for the reference pixel layer ref_0. In this example, when one preset reference pixel layer is used, the example illustrates that setting information about the reference pixel layer is not generated, and intra prediction is performed using a non-directional prediction mode.

Figure 19B:
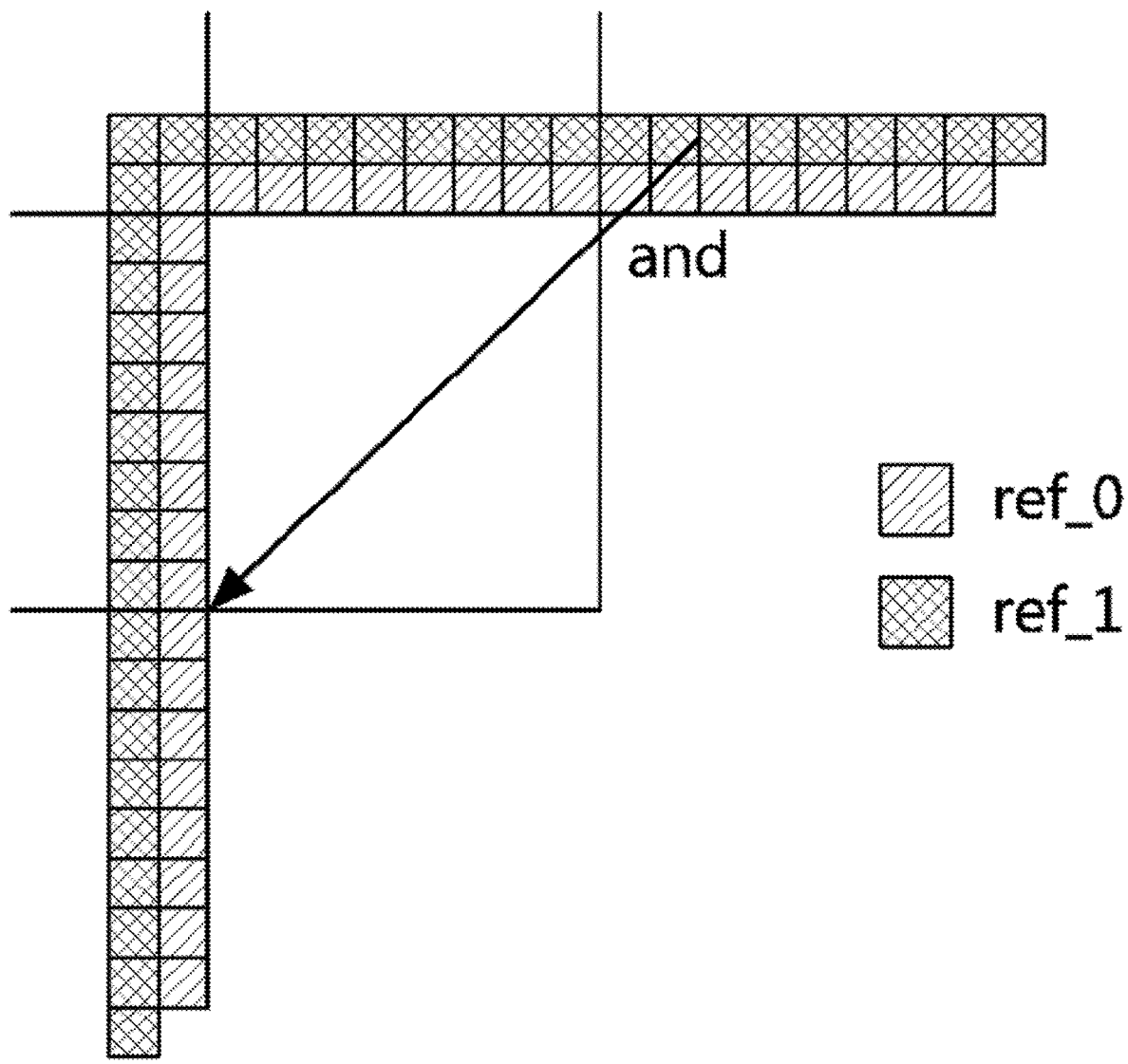

Referring to FIG. 19b, it may be confirmed that a reference pixel is configured using both supported reference pixel layers. That is, after configuring the reference pixel using pixels belonging to the layer ref_0 and the layer ref_1 (or using a weighted average of the pixels belonging to two layers), intra prediction may be performed. In this example, when multiple preset reference pixel layers are used, the example illustrates that setting information about the reference pixel layer is not generated, and intra prediction is performed using some directional prediction modes (from top right to bottom left or vice versa in the drawing).

Figure 19C:
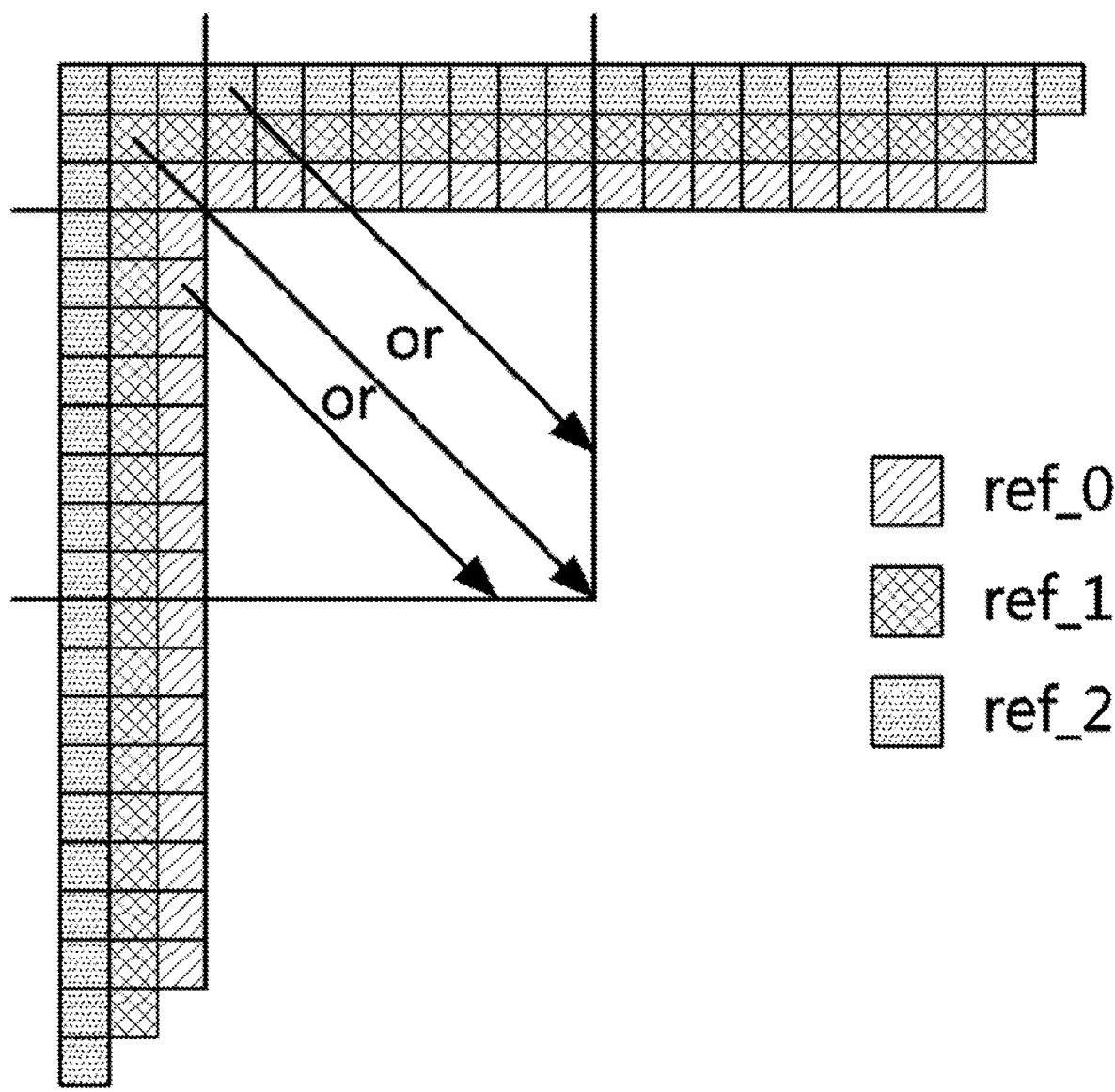

Referring to FIG. 19c, it may be confirmed that a reference pixel is configured using only one reference pixel layer among three supported reference pixel layers. This example illustrates multiple reference pixel layer candidates exist, setting information on the reference pixel layer used therein is generated, and intra prediction is performed using some directional prediction modes (from top left to bottom right in the drawing).

Figure 20:
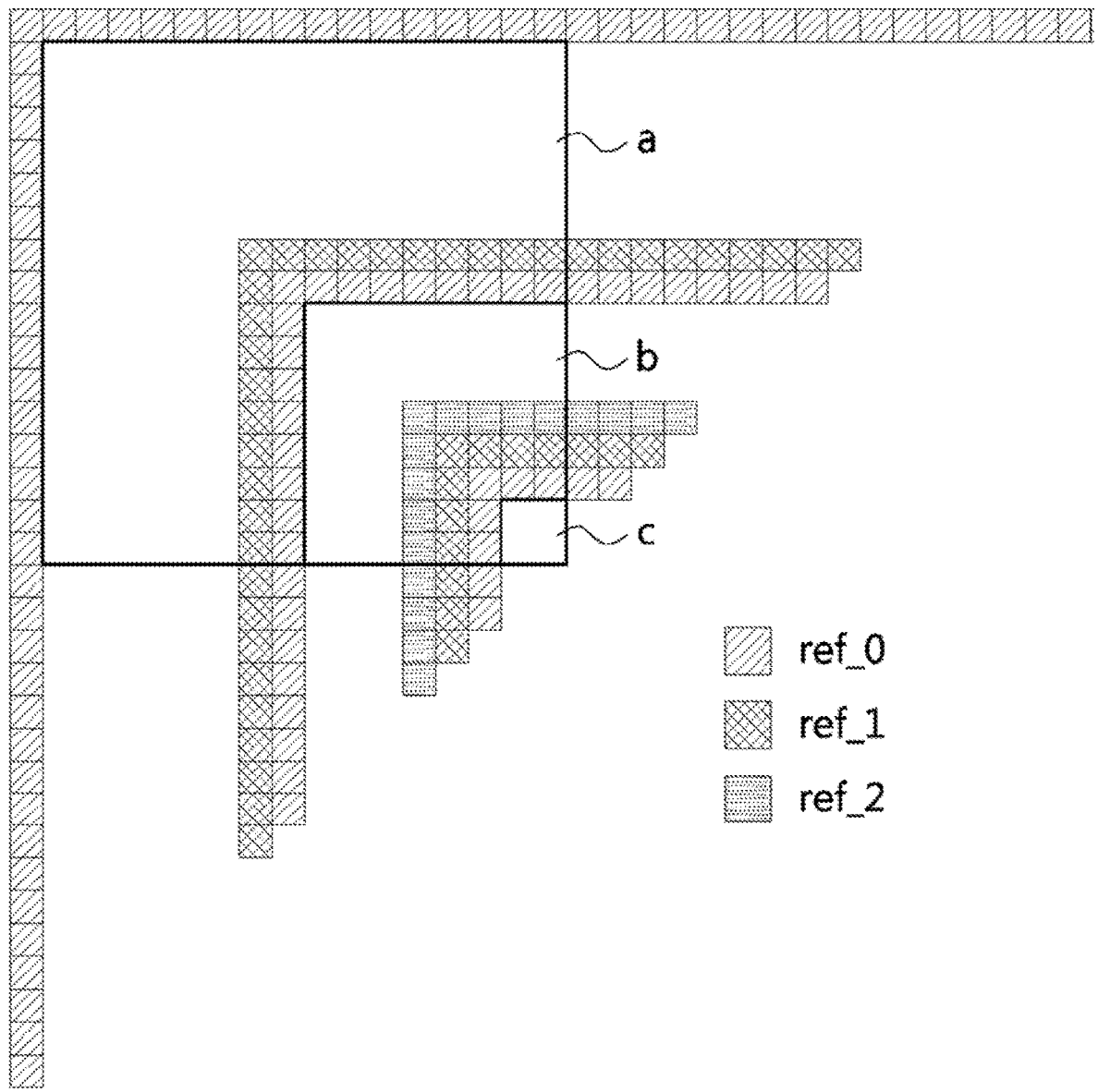
FIG. 20 is a third exemplary diagram of a reference pixel configuration according to an embodiment of the present invention.

FIG. 20 is a third exemplary diagram of a reference pixel configuration according to an embodiment of the present invention.

In FIG. 20, the symbol a is a block having a size of 64×64 or more, the symbol b is a block having a size of 16×16 or more and less than 64×64, and the symbol c is a block having a size of less than 16×16.

If a block according to the symbol a is a current block to perform intra prediction, the intra prediction may be performed by using the one reference pixel layer ref_0 that is the nearest.

In addition, if a block according to the symbol b is a current block to perform intra prediction, the intra prediction may be performed by using the two supportable pixel layers ref_0 and ref_1.

In addition, if a block according to the symbol c is a current block to perform intra prediction, the intra prediction may be performed by using the three supportable pixel layers ref_0, ref_1, and ref_2.

Referring to the description according to the symbols a to c, the number of supportable reference pixel layers may be determined differently according to a size of a current block on which intra prediction is to be performed. In FIG. 20, the larger a size of a current block is, the higher a probability that a size of a neighboring block is smaller. Since this may be a result of division due to characteristics of a different image, for the purpose of preventing prediction from a pixel having a large pixel value distance from the current block, it is assumed that as a size of a block increases, the number of supported reference pixel layers decreases, but other variations including the opposite are possible FIG. 21 is a fourth exemplary diagram of a reference pixel configuration according to an embodiment of the present invention.

Figure 21:
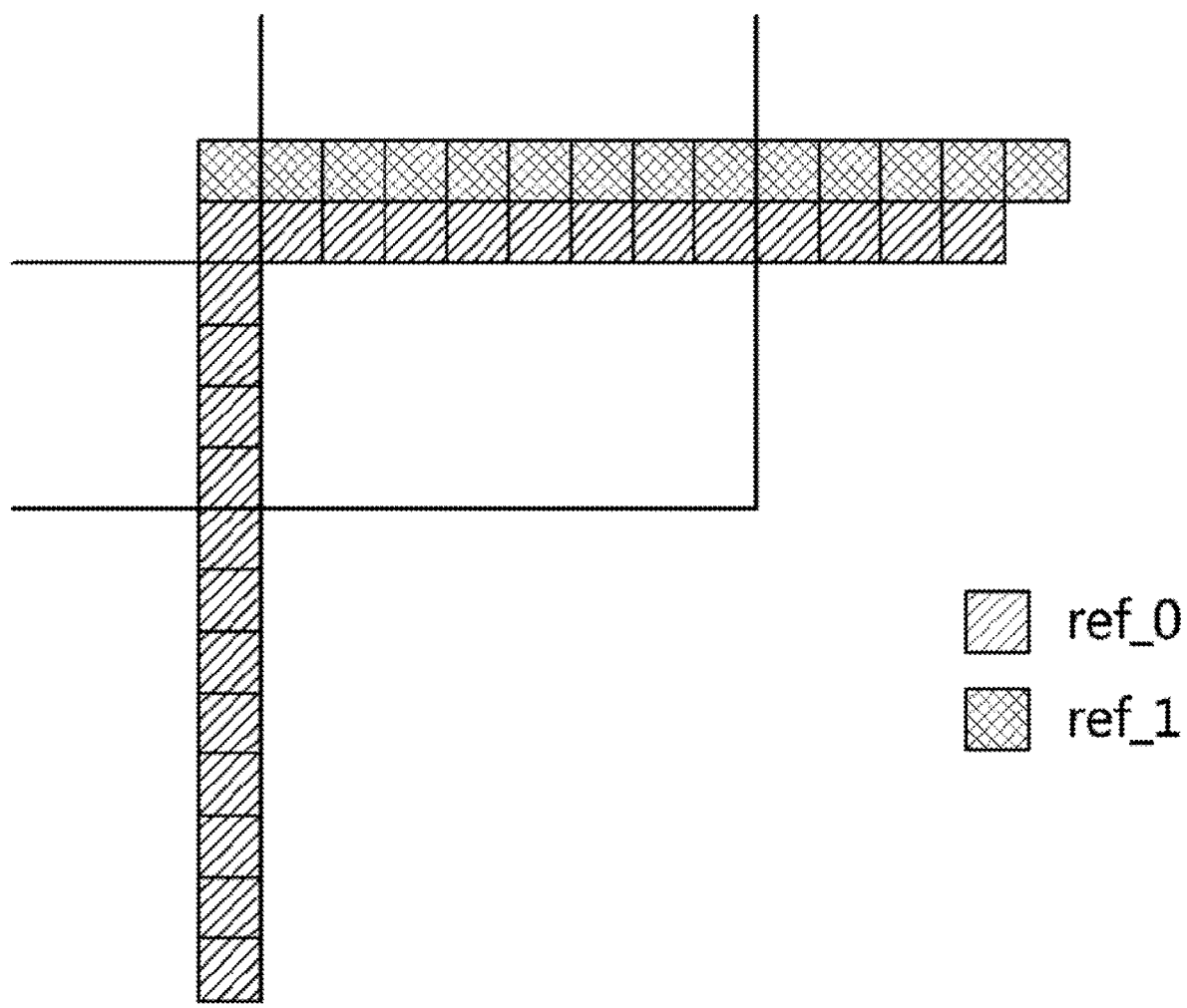
FIG. 21 is a fourth exemplary diagram of a reference pixel configuration according to an embodiment of the present invention.

Referring to FIG. 21, it may be confirmed that a current block for performing intra prediction is in a rectangular shape. If the current block is rectangular and the width and length are asymmetric, it is possible to set the support number of a reference pixel layer adjacent to the long horizontal boundary surface in the current block to be large, and it is possible to set the support number of the adjacent reference pixel layer adjacent to the short vertical boundary surface in the current block to be smaller. In the drawing, it may be confirmed that the reference pixel layer adjacent to the horizontal boundary of the current block is set to two, and the reference pixel layer adjacent to the vertical boundary of the current block is set to one. This is because pixels adjacent to the short vertical boundary in the current block are often far from pixels included in the current block (because the length is long), so that an accuracy of prediction may be reduced. Accordingly, although the support number of the reference pixel layer adjacent to the short vertical boundary surface is set to be smaller, the reverse may also be possible.

In addition, a reference pixel layer to be used for prediction may be differently determined according to a type of an intra prediction mode or a position of a neighboring block adjacent to a current block. For example, a directional mode using a pixel belonging to a block adjacent to the top, top right of the current block as a reference pixel may use two or more reference pixel layers, a directional mode using a pixel belonging to a block adjacent to the left, bottom left of the current block as a reference pixel may use only one nearest reference pixel layer.

On the other hand, if prediction blocks generated through each reference pixel layer in multiple reference pixel layers are identical or similar to each other, generating setting information of the reference pixel layer may be a result of generating unnecessary data additionally.

For example, when distribution characteristics of pixels constituting each reference pixel layer are similar or identical to each other, since similar or identical prediction blocks may be generated using any reference pixel layer, it is not necessary to generate data for selecting the reference pixel layer. In this case, the distribution characteristics of the pixels constituting the reference pixel layer may be determined by comparing an average or dispersion value of the pixels with a preset threshold value.

That is, when reference pixel layers are identical or similar to each other based on the finally determined intra picture prediction mode, the reference pixel layer may be selected by a preset method (e.g., selecting the nearest reference pixel layer).

In this case, a decoder may receive intra prediction information (or intra prediction mode information) from an encoding apparatus, and determine whether to receive information for selecting a reference pixel layer based on the received information.

Although a reference pixel is configured by using multiple reference pixel layers through various examples, various examples of modifications are possible and may be combined with other additional configurations.

The reference pixel unit of intra prediction may include a reference pixel generation unit, a reference pixel interpolation unit, a reference pixel filter unit, and the like, and may include all or part of the above components. Herein, a block including pixels that may become reference pixels may be referred to as a reference candidate block. In addition, the reference candidate block may generally be a neighboring block adjacent to a current block.

According to an availability of reference pixel to be set for the reference candidate block in a reference pixel configuration unit, it may be determined whether a pixel belonging to the reference candidate block is used as the reference pixel.

The reference pixel availability may be determined to be unavailable when at least one of the following conditions is satisfied. For example, at least one of the case that the reference candidate block is located outside the picture boundary, the case that it does not belong to the same division unit as the current block (for example, slice, tile, etc.), the case that encoding/decoding is not completed, or the case that any of the cases where the use is restricted according to encoding/decoding setting is satisfied, it may be determined that the pixels belonging to the reference candidate block cannot be referred to. In this case, when all of the above conditions are not satisfied, it may be determined that it can be referred to.

In addition, a use of a reference pixel may be restricted by an encoding/decoding setting. For example, when a flag for restricting a reference to a reference candidate block (e.g., constrained_intra_pred_flag) is activated, a pixel belonging to the reference candidate block may not be used as a reference pixel. The flag may be applied when the reference candidate block is a block reconstructed with reference to an image different in time from the current picture in order to perform encoding/decoding that is robust to errors due to various external factors including a communication environment.

Herein, when the flag for restricting the reference is deactivated (e.g., constrained_intra_pred_flag=0 in an I picture type or a P or B picture type), all the pixels of the reference candidate block may be used as the reference pixels. In addition, depending on whether the reference candidate block is encoded with intra prediction or inter prediction, when the flag limiting the reference is activated (e.g., constrained_intra_pred_flag=1 in the P or B picture type), it may be determined whether reference is possible. That is, if the reference candidate block is encoded by intra prediction, the reference candidate block may be referred to regardless of whether the flag is activated. If the reference candidate block is encoded by inter prediction, whether the reference candidate block can be referred to may be determined according to whether the flag is activated.

In addition, a reconstruction block having a position corresponding to the current block in another color space may be a reference candidate block. In this case, whether reference is possible may be determined according to an encoding mode of the reference candidate block. For example, if the current block belongs to some chrominance components Cb and Cr, whether reference is possible may be determined according to an encoding mode of a block having a position corresponding to the current block in a luminance component Y and having been encoded/decoded (=reference candidate block). This may be an example corresponding to the case where the encoding mode is independently determined according to the color space.

A flag for limiting a reference may be a setting applied to some image types (e.g., P or B slice/tile type, etc.).

Through an availability of reference pixels, reference candidate blocks may be classified as being available, partially available, or not available at all. In all cases except when all are available, reference pixels at unavailable candidate block positions may be filled or generated.

When the reference candidate block is available, a pixel (or a pixel adjacent to the current block) at a predetermined position of the corresponding block may be stored in a reference pixel memory of the current block. In this case, pixel data of a position of the corresponding block may be copied as it is or stored in the reference pixel memory through a process such as reference pixel filtering.

When the reference candidate block is unavailable, a pixel acquired through the reference pixel generation process may be included in the reference pixel memory of the current block.

In summary, a reference pixel may be configured when the reference pixel candidate block is in an available state, and the reference pixel may be generated when the reference pixel candidate block is in an unavailable state.

A method of filling a reference pixel at a preset position in an unavailable reference candidate block is as follows. First, a reference pixel may be generated using an arbitrary pixel value. Herein, the arbitrary pixel value may be a specific pixel value belonging a the pixel value range, may be a minimum value, maximum value, or median value of a pixel value used in a pixel value adjustment process based on a bit depth or a pixel value adjustment process based on pixel value range information of an image, and may be a value derived from the values. Herein, generating a reference pixel with the arbitrary pixel value may be applied when all reference candidate blocks are unavailable.

Next, a reference pixel may be generated using pixels belonging to blocks adjacent to an unavailable reference candidate block. In detail, pixels belonging to an adjacent block may be filled by extrapolation, interpolation, or copying at a predetermined position in the unavailable reference candidate block. In this case, a direction of performing copying or extrapolation may be clockwise or counterclockwise, and may be determined according to an encoding/decoding setting. For example, a direction of generating the reference pixel in a block may follow one preset direction or may follow an adaptively determined direction depending on a location of the unavailable block.

Figure 22A:
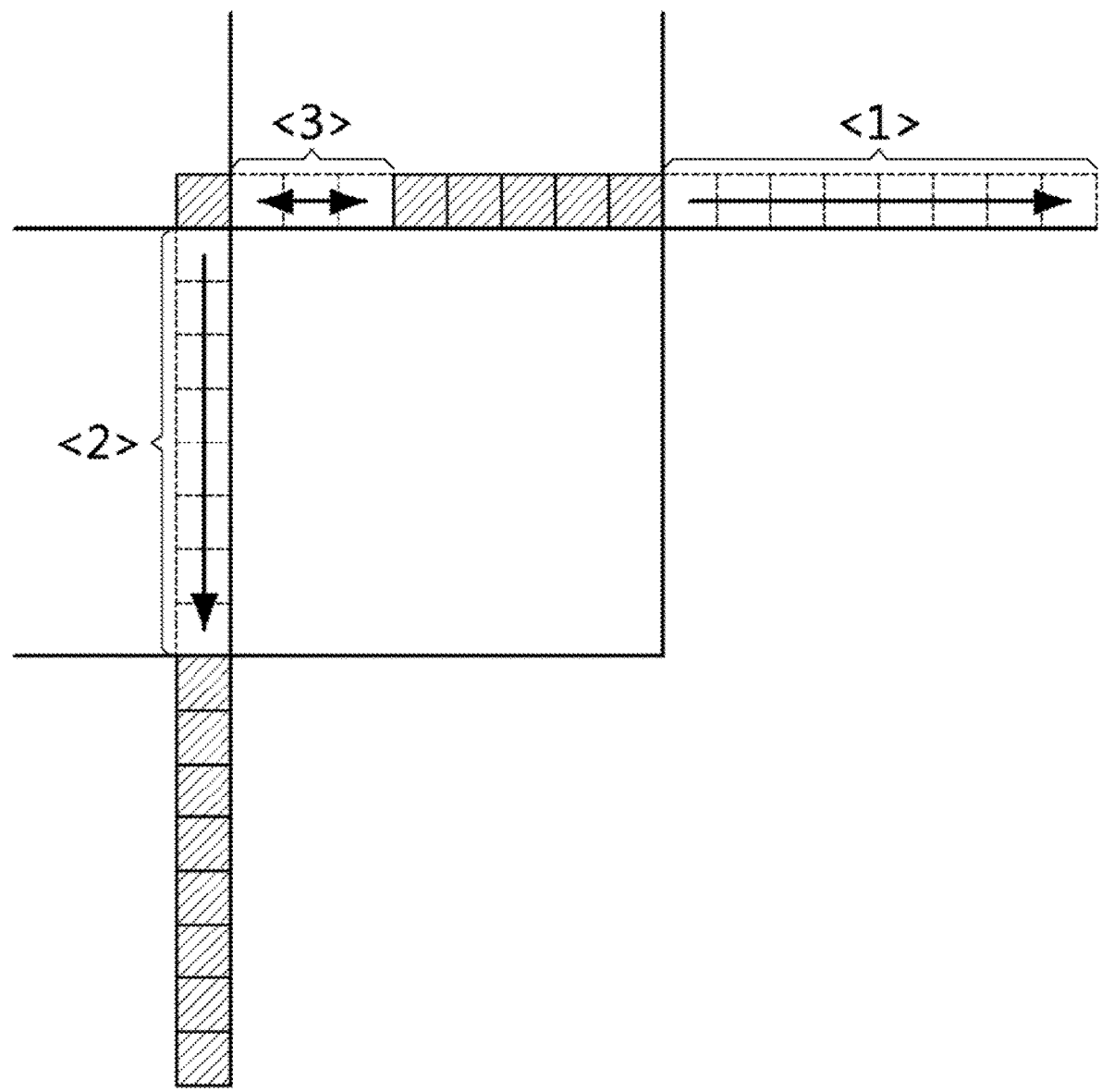
FIGS. 22a to 22b are exemplary diagrams of a method of filling a reference pixel at a preset position in an unavailable reference candidate block.
Figure 22B:
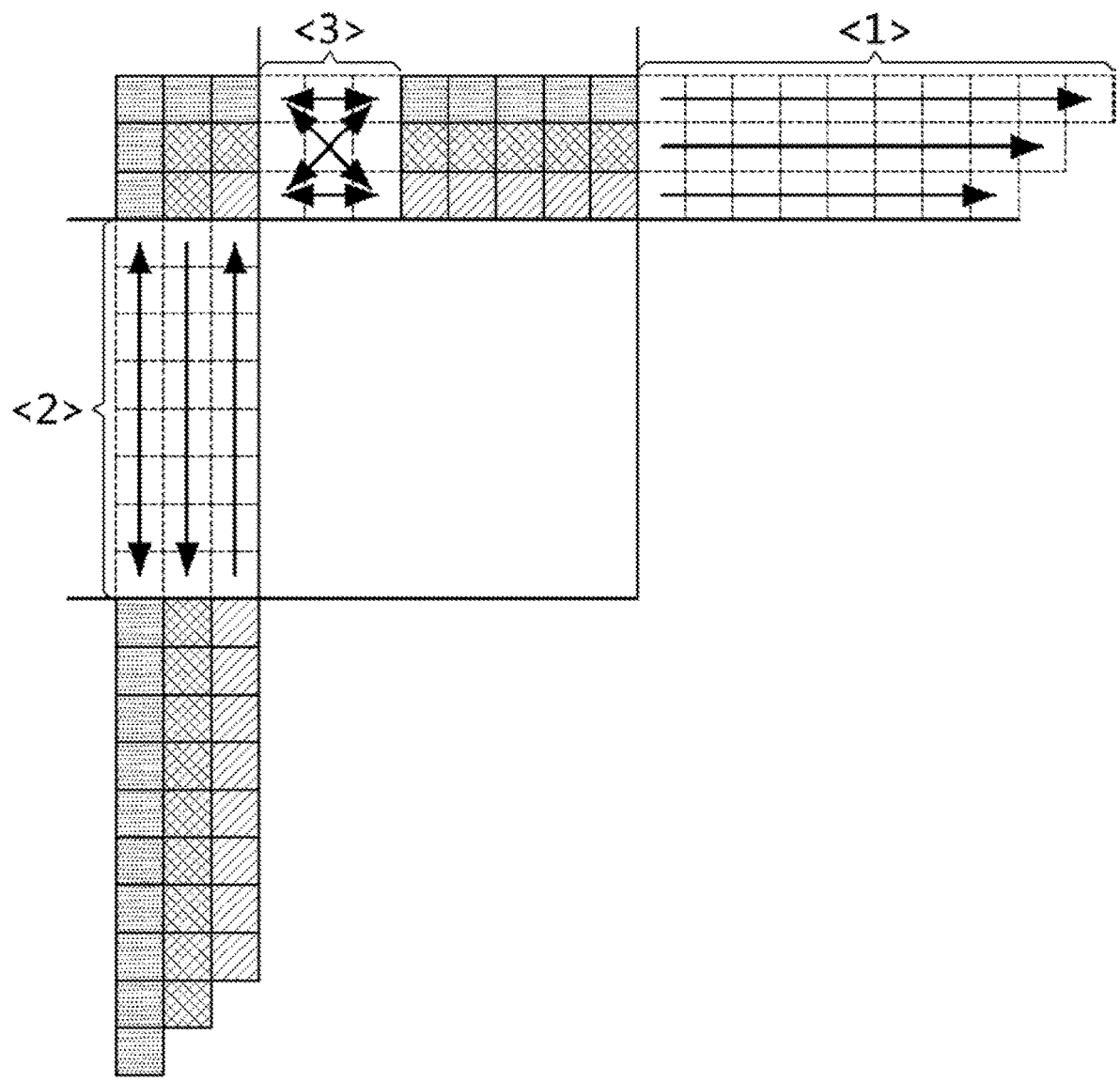

FIGS. 22a to 22b are exemplary diagrams of a method of filling a reference pixel at a preset position in an unavailable reference candidate block.

Referring to FIG. 22a, a method of filling pixels belonging to an unavailable reference candidate block among reference pixels having one reference pixel layer may be confirmed. In FIG. 22a, when a neighboring block adjacent to the top right of a current block is the unavailable reference candidate block, a reference pixel (indicated by <1>) belonging to the neighboring block adjacent to the top right of the current block may be generated by extrapolating or linearly extrapolating a reference pixel belonging to a neighboring block adjacent to the top of the current block in a clockwise direction.

In addition, in FIG. 22a, when a neighboring block adjacent to the left of the current block is an unavailable reference candidate block, reference pixels belonging to the neighboring block adjacent to the left (denoted by <2>) may be generated by extrapolating or linearly extrapolating a reference pixel belonging to a neighboring block adjacent to the top left of the current block (corresponding to an available block) in a counterclockwise direction. In this case, when extrapolation or linear extrapolation is performed in a clockwise direction, reference pixels belonging to a neighboring block adjacent to the bottom left of the current block may be used.

In addition, in FIG. 22a, a part of the reference pixels (indicated by <3>) belonging to a neighboring block adjacent to the top of the current block may be generated by interpolating or linearly interpolating the reference pixels usable on both sides. That is, a case in which some but not all of the reference pixels belonging to the neighboring blocks are unavailable may be set, and in this case, unavailable reference pixels may be filled using adjacent pixels of the unavailable reference pixels.

Referring to FIG. 22b, a method of filling a reference pixel that is unavailable when some reference pixels are not available among reference pixels composed of multiple reference pixel layers may be confirmed. Referring to FIG. 22b, when a neighboring block adjacent to the top right of the current block is an unavailable reference candidate block, pixels belonging to three reference pixel layers belonging to the corresponding neighboring block (denoted by <1>) may be generated in a clockwise direction using pixels belonging to a neighboring block (corresponding to an available block) adjacent to the top of the current block.

In addition, in FIG. 22b, if a neighboring block adjacent to the left of the current block is an unavailable reference candidate block, and a neighboring block adjacent to the top left and bottom left of the current block is an available reference candidate block, reference pixels of the available reference candidate block may be filled in a clockwise, counterclockwise or bidirectional direction to generate reference pixels of the unavailable reference candidate block.

In this case, an unavailable reference pixel of each reference pixel layer may be generated using pixels of the same reference pixel layer, but a use of pixels of non-identical reference pixel layers is not excluded. For example, in FIG. 22b, reference pixels (denoted by <3>) according to three reference pixel layers belonging to a neighboring block adjacent to the top of the current block are assumed to be unavailable reference pixels. In this case, pixels belonging to the reference pixel layer ref_0 that is farthest from the reference pixel layer ref_0 that is closest to the current block may be generated by using reference pixels that belong to the same reference pixel layer and are available. In addition, pixels belonging to the reference pixel layer ref_1 separated by one pixel from the current block may be generated by using not only pixels belonging to the same reference pixel layer ref_1 but also pixels belonging to other reference pixel layers ref_0 and ref_2. In this case, reference pixels available on both sides may be filled with reference pixels which are not available by using a method such as quadratic linear interpolation.

The above example shows an example of generating a reference pixel when some reference candidate blocks are unavailable when multiple reference pixel layers are configured as reference pixels. Alternatively, a setting (e.g., when at least one reference candidate block is unavailable or all reference candidate blocks are unavailable) that does not allow an adaptive reference pixel configuration (in this example, adaptive_intra_ref_sample_flag=0) may be possible according to an encoding/decoding setting. In other words, the reference pixel may be configured according to a predetermined setting without any additionally occurring information.

The reference pixel interpolation unit may generate reference pixels in a decimal unit through linear interpolation of a reference pixel. In the present invention, it is assumed and described as some processes of the reference pixel configuration unit, but it may be included in the prediction block generation unit and may be understood as a process performed before generating a prediction block.

In addition, although it is assumed to be a separate process from the reference pixel filter unit to be described later, it may be integrated into one process. This may be configured to prepare for the case where distortion is generated in a reference pixel by increasing the number of filtering applied to the reference pixel when a plurality of filtering is applied through the reference pixel interpolation unit and the reference pixel filter unit.

The reference pixel interpolation process is not performed in some prediction modes (e.g., horizontal, vertical, some diagonal modes <modes having 45 degree angles such as Diagonal down right, Diagonal down left, Diagonal up right>, non-directional mode, color mode, color copy mode, etc., that is, modes that does not require interpolation in a decimal unit when generating a prediction block) and may be performed in other prediction modes (that is, modes that require interpolation in a decimal unit when generating a prediction block).

Interpolation precision (e.g., a pixel unit such as 1, ½, ¼, ⅛, 1/16, 1/32, 1/64, etc.) may be determined according to a prediction mode (or a prediction mode directionality). For example, an interpolation process is not necessary in a prediction mode having a 45 degree angle, and an interpolation in a ½ pixel unit is required in a prediction mode having a 22.5 degree angle or 67.5 degree angle. As described above, at least one interpolation precision and a maximum interpolation precision may be determined according to the prediction mode.

For reference pixel interpolation, only one preset interpolation filter (e.g., 2-tap linear interpolation filter) may be used, or a filter selected according to an encoding/decoder setting among multiple interpolation filter candidate groups (e.g., 4-tap cubic filter, 4-tap Gaussian filter, 6-tap winner filter, 8-tap Kalman filter, etc.) may be used. In this case, the interpolation filter may be classified into a difference in the number of filter taps (that is, the number of pixels to which filtering is applied) and a filter coefficient.

Interpolation may be performed step by step in order of low precision to high precision (e.g., ½→¼→⅛), or may be performed in batches. In the former case, interpolation may be performed based on pixels in integer units and pixels in decimal units (pixels previously interpolated with a lower precision than an interpolation target pixel at present). In the latter case, interpolation may be performed based on pixels of an integer unit.

When using one of multiple filter candidate groups, filter selection information may be explicitly generated or implicitly determined, and may be determined according to an encoding/decoding setting (e.g. interpolation precision, block size, shape, prediction mode, etc.). In this case, a unit explicitly generated may be a video, a sequence, a picture, a slice, a tile, a block, and the like.

For example, when an interpolation precision (½, ¼) of ¼ or more is applied, an 8-tap Kalman filter may be applied to a reference pixel in integer units. When the interpolation precision (⅛, 1/16) of less than ¼ and more than 1/16, a 4-tap Gaussian filter may be applied to the reference pixel in integer units and an interpolated reference pixel on the basis of ¼ or more, When the interpolation precision (1/32, 1/64) is less than 1/16, a 2-tap linear filter may be applied to the reference pixel in integer units and the interpolated reference pixel on the basis of 1/16 or more.

Alternatively, for blocks of more than 64×64, an 8-tap Kalman filter may be applied, for blocks of less than 64×64 and 16×16 or more, a 6-tap winner filter may be applied, and for blocks of less than 16×16, a 4-tap Gaussian filter may be applied.

Alternatively, a 4-tap cubic filter may be applied to a prediction mode in which an angle difference is less than 22.5 degrees based on the vertical or horizontal mode, and a 4-tap Gaussian filter may be applied to a prediction mode in which an angle difference is 22.5 degrees or more.

Alternatively, multiple filter candidate groups may be configured with a 4-tap cubic filter, a 6-tap winner filter, and an 8-tap Kalman filter in some encoding/decoding settings, or may be configured with a 2-tap linear filter or a 6-tap winner filter in some encoding/decoding settings.

Figure 23A:
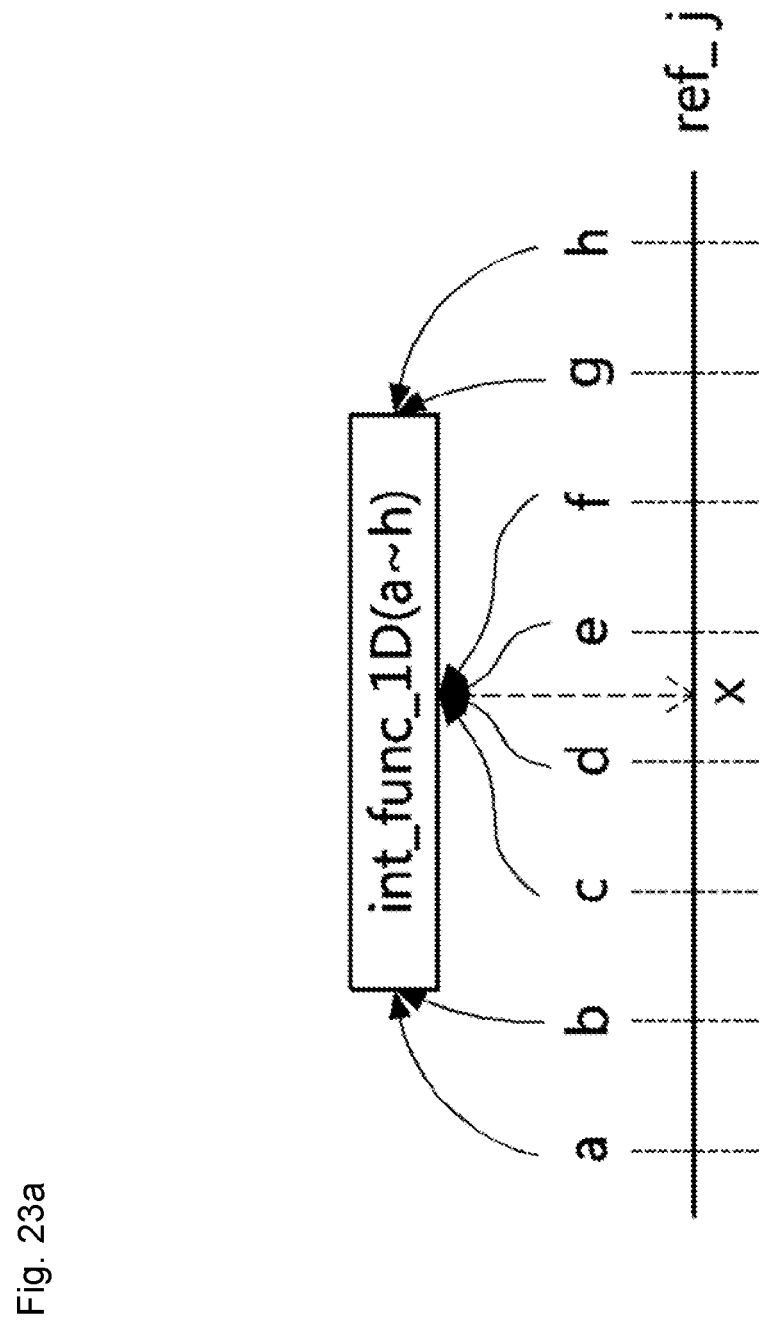
FIGS. 23a to 23c are exemplary diagrams of a method of performing interpolation based on a fractional pixel unit for reference pixels configured according to an embodiment of the present invention.
Figure 23B:
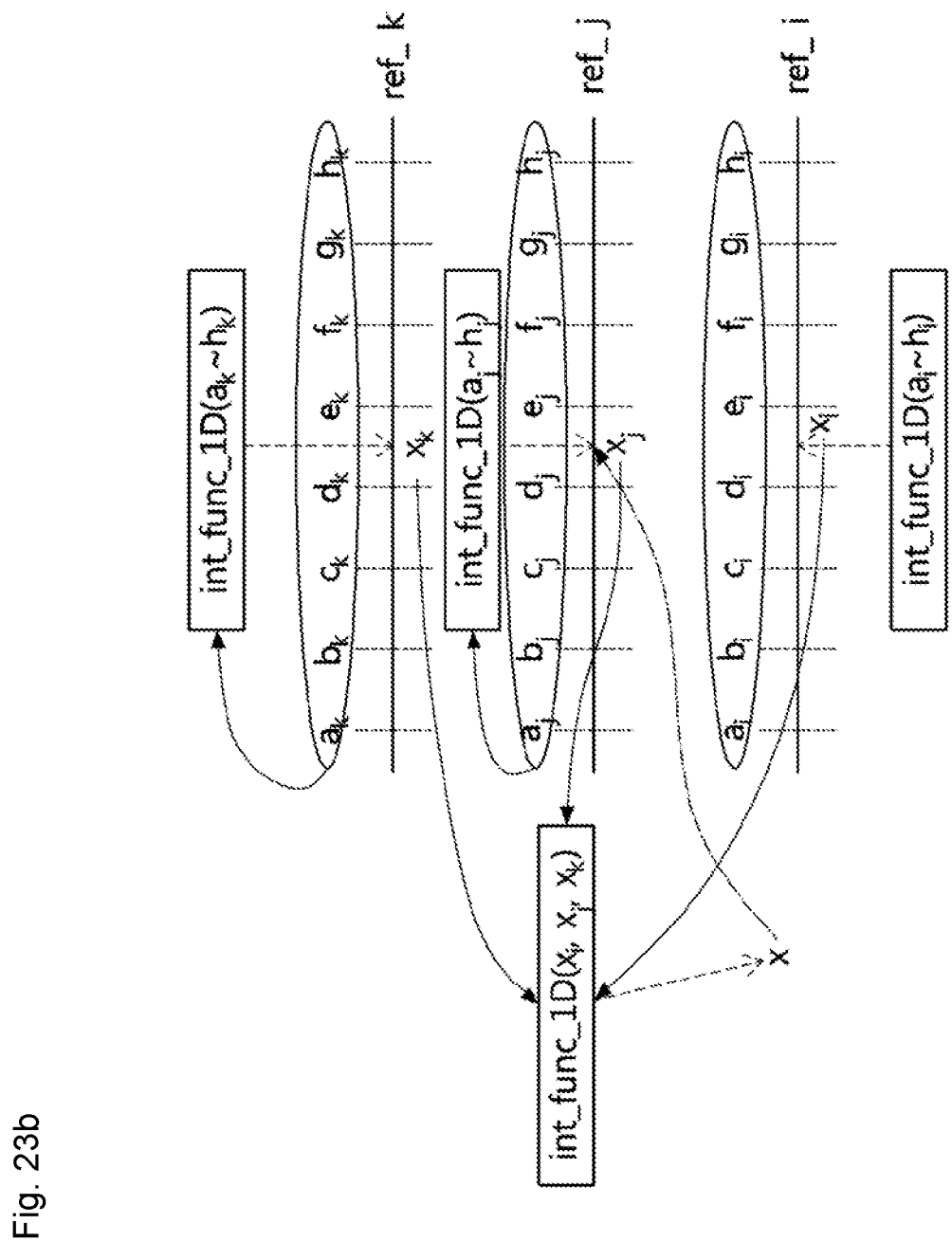
Figure 23C:
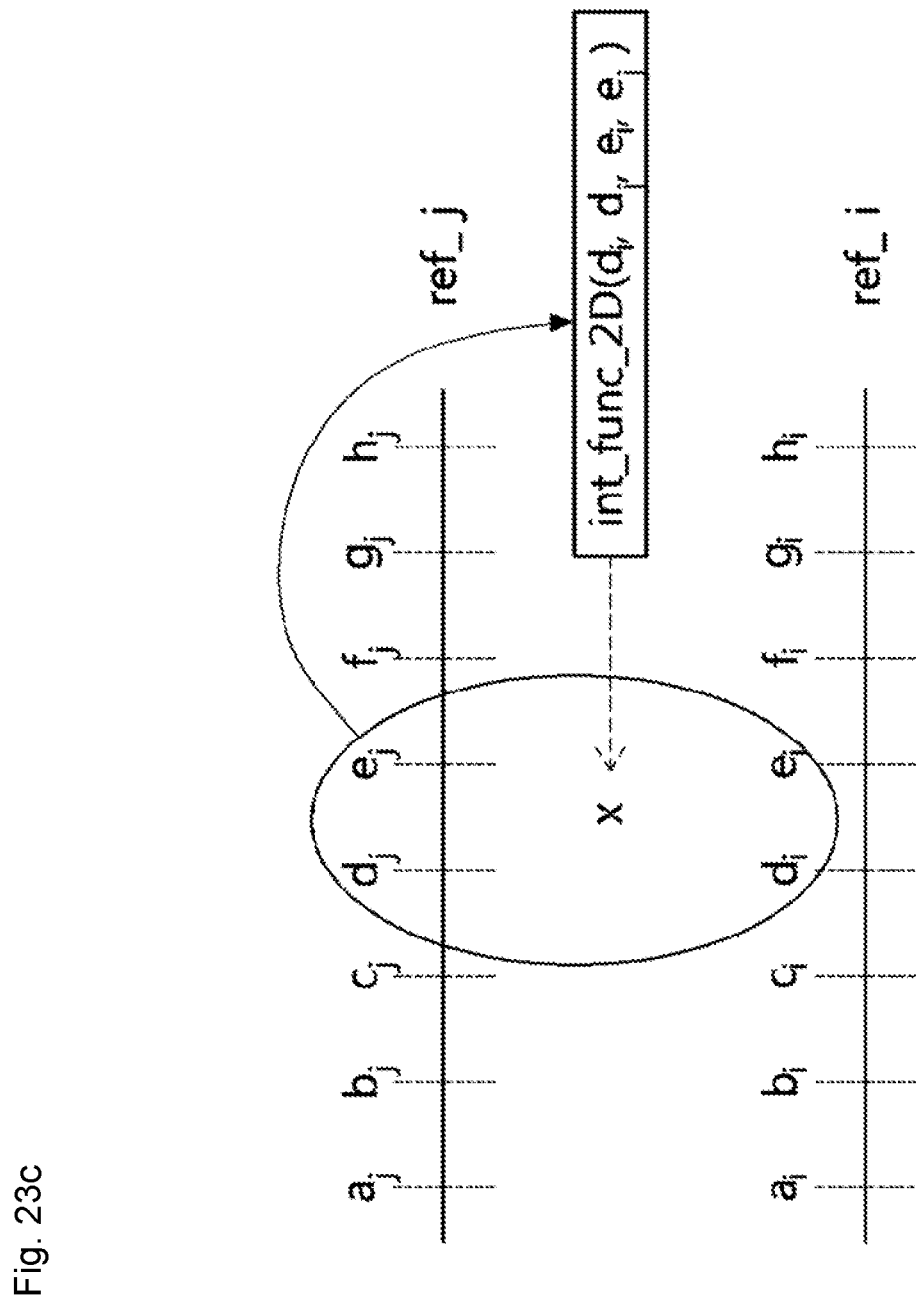

FIGS. 23a to 23c are exemplary diagrams of a method of performing interpolation based on a fractional pixel unit for reference pixels configured according to an embodiment of the present invention.

Referring to FIG. 23a, when one reference pixel layer ref_i is supported as reference pixels, a method of interpolating pixels in a decimal unit may be confirmed. In detail, interpolation may be performed by applying filtering (denoted int_func_1D as a filtering function) to pixels (assuming that a filter is applied to an integer unit pixel in this example) adjacent to an interpolation target pixel (denoted as x). Herein, since one reference pixel layer is used as the reference pixel, interpolation may be performed using adjacent pixels belonging to the same reference pixel layer as the interpolation target pixel x.

Referring to FIG. 23b, when two or more reference pixel layers ref_i, ref_j, and ref_k are supported as reference pixels, a method of obtaining interpolation pixels having a decimal unit may be confirmed. In FIG. 23b, when a reference pixel interpolation process is performed in the reference pixel layer ref_j, interpolation of the interpolation target pixel in a decimal unit may be performed by additionally using other reference pixel layers ref_k and ref_i. Specifically, each of the interpolation target pixel (location of xj) and pixels (xk, xi) at positions (corresponding position in each reference pixel layer according to a direction of a prediction mode) belonging to other reference pixel layers and corresponding to the interpolation target pixel may be obtained by filtering (interpolation process. Int_func_1D function) adjacent pixels (ak~hk, aj~hj, ai~hi), and the final interpolation pixel x in the reference pixel layer ref_j may be obtained by additional filtering (may be filtering that is not an interpolation, but is a weighted average such as [1, 2, 1]/4, [1, 6, 1]/8) on the obtained first interpolation pixels (xk, xj, xi). In this example, the pixels (xk, xi) of the other reference pixel layer corresponding to the interpolation target pixel is assumed to be a decimal unit pixel that may be obtained through an interpolation process.

In the above example, though it was described as a case that the first interpolation pixels are obtained through filtering in each reference pixel layer and the final interpolation pixel is obtained by performing additional filtering on the first interpolation pixels, adjacent pixels (ak~hk, aj~hj, ai~hi) of various reference pixel layers may be filtered to obtain the final interpolated pixel at a time.

The layer used as an actual reference pixel among the three reference pixel layers supported in FIG. 23b may be the ref_j. That is, it may be the case that another reference pixel layer included in a candidate group (e.g., although not consisting of reference pixels may mean that pixels of a reference pixel layer are not used for prediction, the pixels are referenced for interpolation in this case, so they may be technically included in a case that the pixels are used for prediction) is used for interpolation of one reference pixel layer composed of reference pixels.

Referring to FIG. 23c, an example of a case in which two supported reference pixel layers are used as reference pixels is illustrated. The final interpolation pixel x may be obtained by configuring pixels (di, dj, ei, ej in this example) adjacent to the decimal unit position to be interpolated in each supported reference pixel layer as input pixels and performing filtering on the adjacent pixels. However, as shown in FIG. 23b, it may also be possible to obtain a first interpolation pixel in each reference pixel layer and perform additional filtering on the first interpolation pixel to obtain the final interpolation pixel x.

The above example is not limited to the reference pixel interpolation process, and may be understood as a process combined with other processes (e.g., reference pixel filter process, prediction block generation process, etc.) of intra prediction.

Figure 24A:
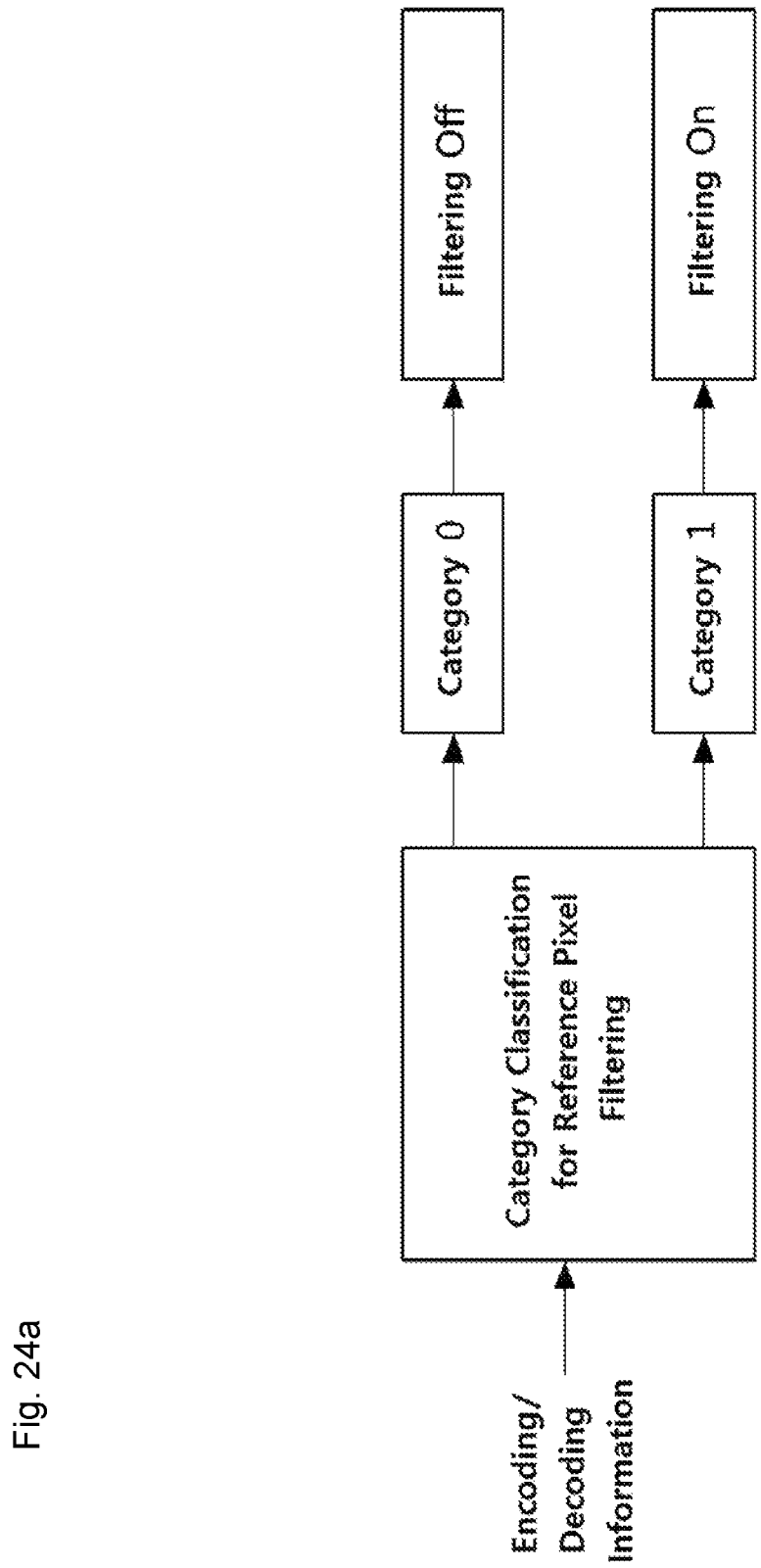
FIGS. 24a and 24b are first exemplary diagrams for illustrating an adaptive reference pixel filtering method according to an embodiment of the present invention.
Figure 24B:
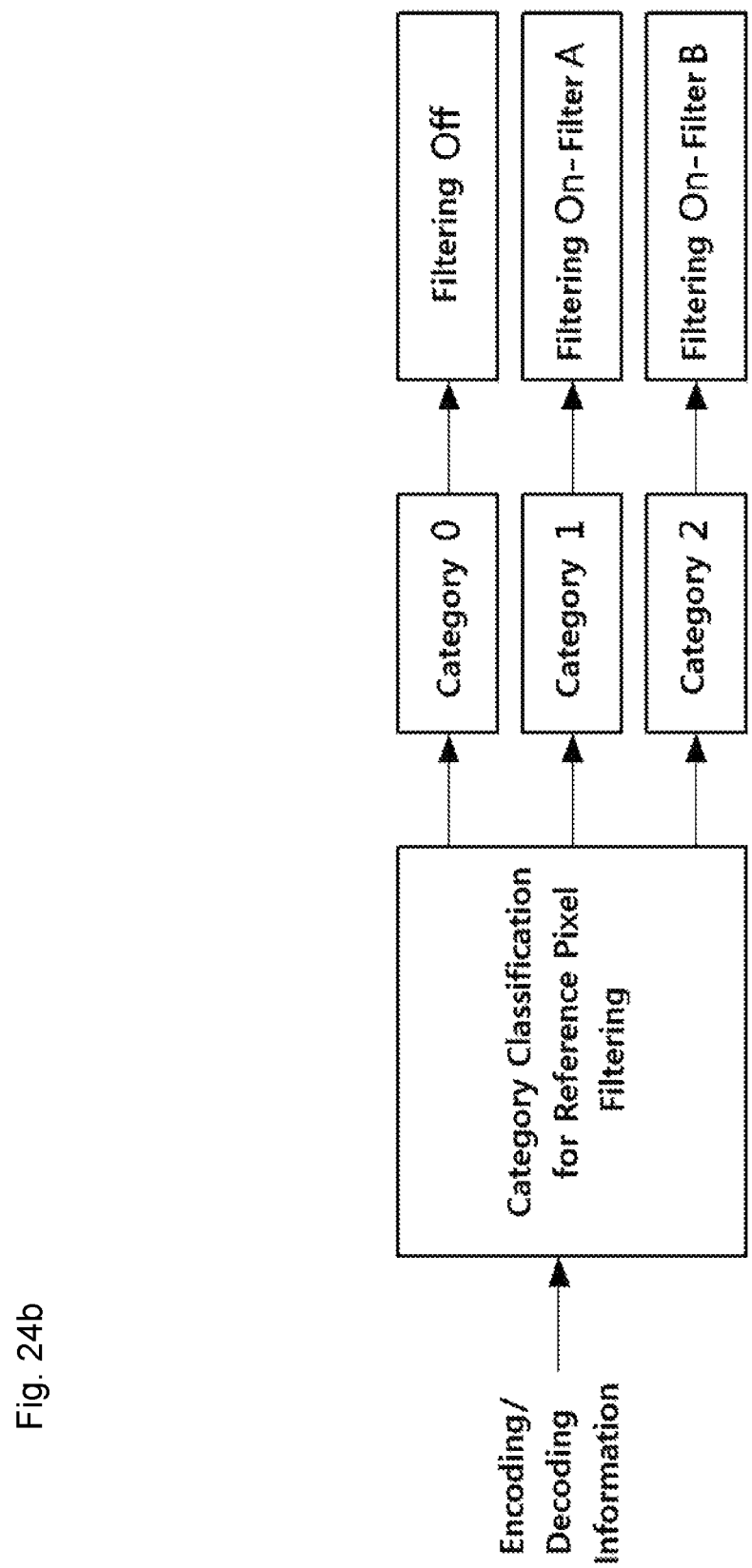

FIGS. 24a and 24b are first exemplary diagrams for illustrating an adaptive reference pixel filtering method according to an embodiment of the present invention.

In general, though the reference pixel filter unit may perform smoothing using a low pass filter {Low-pass Filter. e.g., a 3-tap, 5-tap filter such as [1, 2, 1]/4, [2, 3, 6, 3, 2]/16, etc.}, different types of filters (e.g., high pass filters, etc.) may be used depending on a filter application purpose {e.g. sharpening, etc.}. In the present invention, the filtering is performed for the purpose of smoothing to reduce deterioration occurring in an encoding/decoding process.

Reference pixel filtering may be determined according to an encoding/decoding setting. However, applying a presence or absence of filtering in a batch does not reflect partial characteristics of an image, and thus, filtering based on the partial characteristics of the image may be advantageous for improving encoding performance. Herein, the characteristics of the image may be determined according to an image type, color component, quantization parameter, encoding/decoding information of a current block (e.g. size, shape, partition information, prediction mode, etc. of the current block) as well as encoding/decoding information of the neighboring block, a combination of encoding/decoding information of the current block and the neighboring block, and the like. It may also be determined according to a reference pixel distribution characteristic (e.g. dispersion, standard deviation, flat area, discontinuous area, etc. of reference pixel area).

Referring to FIG. 24a, filtering may not be applied when belonging to a classification (category 0) according to some encoding/decoding settings (e.g., block size range A, prediction mode B, color component C, etc.), and the filtering may be applied when belonging to a classification (category 1) according to some encoding/decoding settings (e.g., prediction mode A of the current block, prediction mode B of a preset neighboring block, etc.).

Referring to FIG. 24b, filtering may not be applied when belonging to a classification (category 0) according to some encoding/decoding settings (e.g., size A of the current block, size B of the neighboring block, prediction mode C of the current block, etc.), the filtering may be applied when belonging to a classification (category 1) according to some encoding/decoding settings (e.g., size A of the current block, shape B of the current block, size C of the neighboring block, etc.), and the filtering may be applied by using a filter A when belonging to a classification (category 2) according to some encoding/decoding settings (e.g., parent block A of the current block, parent block B of the neighboring block, etc.).

Accordingly, whether to apply filtering, a type of filter, whether to encode filter information (explicit or implicit), the number of filtering, etc. may be determined according to a size of the current block and the neighboring block, a prediction mode, a color component, and the like. The type of filter may be classified into a difference in the number of taps of a filter, a filter coefficient, and the like. In this case, when the number of times of filtering is applied to two or more times, applications such as applying the same filter multiple times or applying different filters may be possible.

The above example may be a case where reference pixel filtering is set in advance according to characteristics of an image. That is, it may be the case that filter related information is implicitly determined. However, when the determination of the characteristics of the image as described above is not correct, a coding efficiency may have a negative effect. Therefore, this part needs to be considered.

In order to prevent the above case, an explicit setting in reference pixel filtering may be possible. For example, information about whether filtering is applied may occur. In this case, filter selection information does not occur when there is one filter, and the filter selection information may occur when multiple filter candidate groups exists.

Although an implicit setting and an explicit setting have been described with reference to reference pixel filtering through the above example, a mixed case in which an explicit setting is set in some cases and an implicit setting in some cases may be possible. The implicit meaning here means that information (e.g., whether to apply filtering information and filter type information) related to a reference pixel filter can be derived from a decoder.

Figure 25:
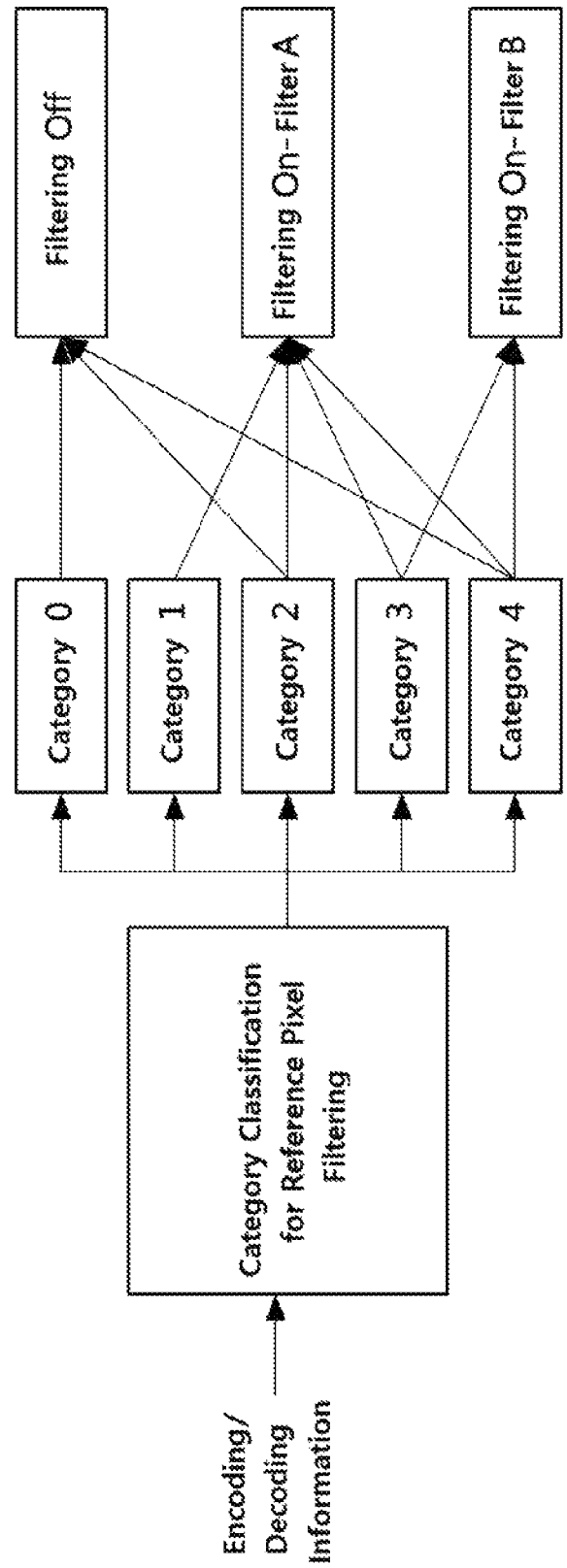
FIG. 25 is a second exemplary diagram for illustrating an adaptive reference pixel filtering method according to an embodiment of the present invention.

FIG. 25 is a second exemplary diagram for illustrating an adaptive reference pixel filtering method according to an embodiment of the present invention.

Referring to FIG. 25, categories may be classified according to characteristics of an image identified through encoding/decoding information, and reference pixel filtering may be adaptively performed according to the classified categories.

For example, no filtering is applied when classified as category 0, and filtering A is applied when classified as category 1. The categories 0 and 1 may be examples of implicit reference pixel filtering.

In addition, when classified as category 2, filtering may not be applied or filtering A may be applied. In this case, the generated information may be information on whether filtering is applied, and filter selection information does not occur.

In addition, when classified as category 3, filtering A may be applied or filtering B may be applied. In this case, the generated information may be filter selection information, and it may be an example where filtering is performed unconditionally. That is, when classified as category 3, it may be understood as a situation in which filtering must be performed but a type of filtering must be selected.

In addition, when classified as category 4, filtering may not be applied, filtering A may be applied, or filtering B may be applied. In this case, the generated information may be information on whether filtering is applied and filter selection information.

In summary, an explicit or implicit process may be determined according to a category, and a candidate group setting related to each reference pixel filter may be adaptively configured when the explicit process is performed.

The following example may be considered with respect to the category.

First, in the case of a block having a size of 64×64 or more, one of <Filtering off>, <filtering on+filter A>, <filtering on+filter B>, and <filtering on+filter C> may be implicitly determined according to a prediction mode of a current block. In this case, when considering reference pixel distribution characteristics, an additional candidate may be <filtering on+filter C>. That is, when filtering is on, filter A, filter B, or filter C may be applied.

In addition, for a block having a size of less than 64×64 and 16×16 or more, one of <filtering off>, <filtering on+filter A>, and <filtering on+filter B> may be implicitly determined according to the prediction mode of the current block.

In addition, in the case of a block having a size of less than 16×16, one of <filtering off>, <filtering on+filter A>, and <filtering on+filter B> is selected according to the prediction mode of the current block. In some prediction modes, it is implicitly determined as <filtering off>, and in some prediction modes, one of <filtering off> and <filtering on+filter A> is explicitly selected, and in some prediction modes, <filtering off> and <filtering+filter B> may be explicitly selected.

As an example of explicit processing of multiple reference pixel filter related information, when reference pixels acquired according to each filtering (In this example, the filtering off situation is also included) are the same or similar, generating the reference pixel filter information (e.g., reference pixel filtering allowance information, reference pixel filter information, etc.) may be a result of generating unnecessary redundant information. For example, reference pixel filter related information may be omitted if reference pixel distribution characteristics (e.g., characteristics determined by comparing a threshold value with a value obtained through an average, variance, etc. of each reference pixel) obtained by each filtering are the same or similar. If the reference pixel filter related information is omitted, filtering may be applied by a preset method (e.g., filtering off). In the decoder, the same determination as that of the encoder may be performed as to whether to receive the reference pixel filter related information by receiving intra prediction information, and based on this determination, it may be determined whether to receive the reference pixel filter related information.

Assuming information is explicitly generated in relation to reference pixel filtering, indication information (adaptive_ref_filter_enabled_flag in this example) that allows adaptive reference pixel filtering may occur on the basis of a video, a sequence, a picture, a slice, a tile, and the like.

If the indication information means to allow adaptive reference pixel filtering (adaptive_ref_filter_enabled_flag=1 in this example), allowance information of the adaptive reference pixel filtering (adaptive_ref_filter_flag in this example) may occur on the basis of a picture, a slice, a tile, a block, and the like.

If the allowance information means adaptive reference pixel filtering (adaptive_ref_filter_flag=1 in this example), the reference pixel filtering related information may be generated on the basis of a picture, a slice, a tile, and a block.

In this case, when the adaptive reference pixel filtering is not allowed or the adaptive reference pixel filtering is not applied, the filtering operation of the reference pixel may be determined according to a predetermined setting (as described above, whether to apply filtering, the type of filter, etc. are determined according to image encoding/decoding information in advance).

Figure 26A:
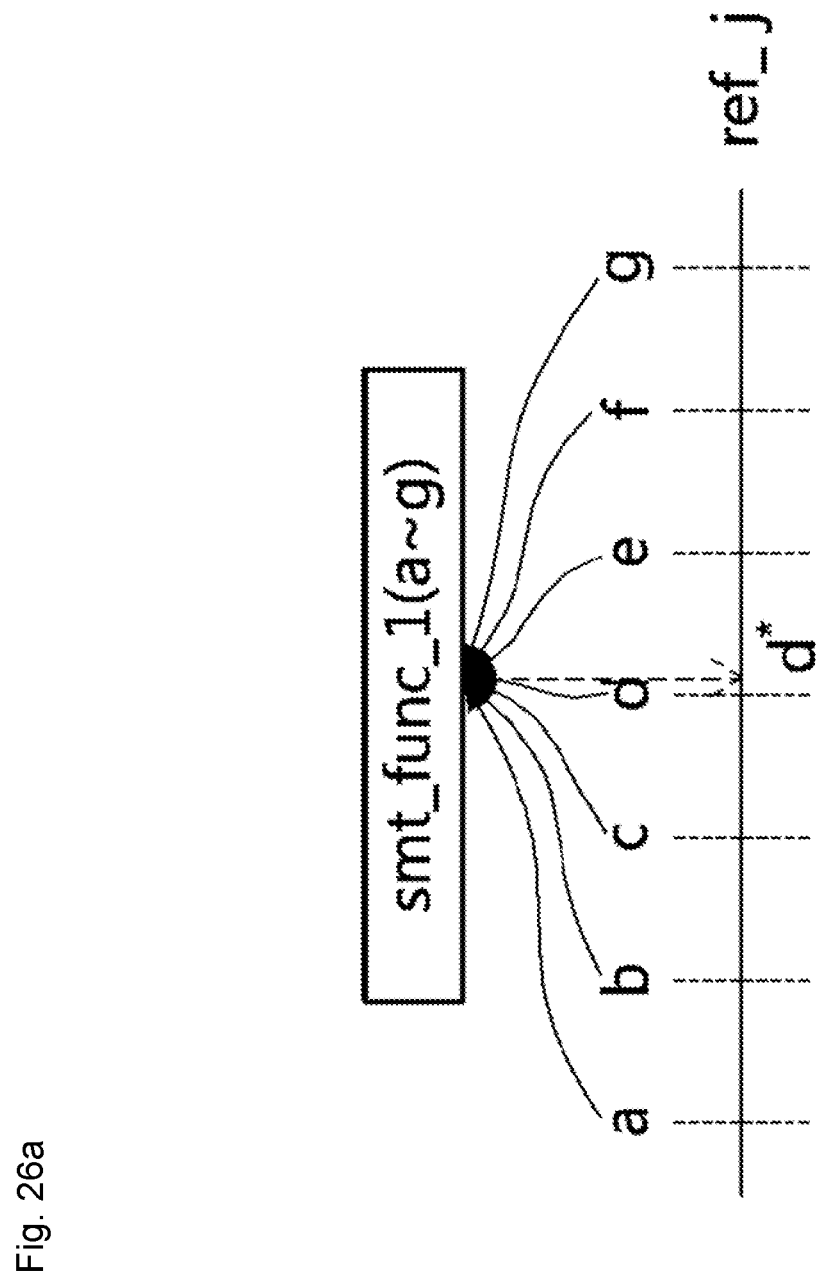
FIGS. 26a to 26b are exemplary diagrams of using one reference pixel layer in reference pixel filtering according to an embodiment of the present invention.
Figure 26B:
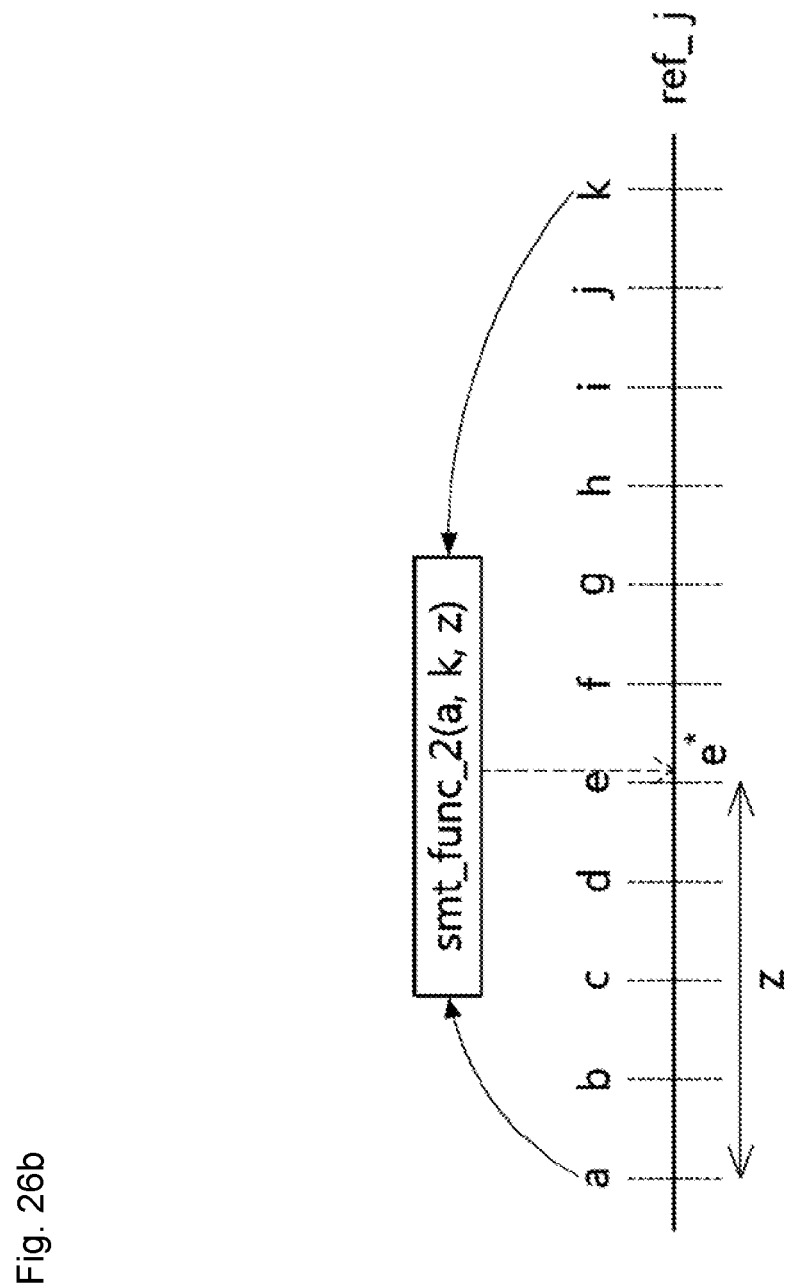

FIGS. 26a to 26b are exemplary diagrams of using one reference pixel layer in reference pixel filtering according to an embodiment of the present invention.

Referring to FIG. 26a, it may be confirmed that interpolation is performed by applying filtering (called smt_func_1 function) to a target pixel d and pixels (a, b, c, e, f, g) adjacent to the target pixel d among pixels belonging to the reference pixel layer ref_i.

Although FIG. 26a may be an example in which one filtering is generally applied, the case that a plurality of filtering is applied is also be possible. For example, the second filtering may be applied to a reference pixel obtained by applying the first filtering.

Referring to FIG. 26b, a filtered (called smt_func_2 function) pixel e* may be obtained through linear interpolation proportional to distance (e.g., distance z to a) with respect to pixels located at both sides of the target pixel e. Herein, the pixels located at both sides may be pixels located at both end points of adjacent pixels in a block which consists of the top block, the left block, the top block+the top right block, the left block+the bottom left block, the top left block+the top block+the top right block, the top left block+ the left block+the bottom left block, the top left block+the left block+the top block+the bottom left block+the top right block, etc. of the current block. FIG. 26b may be reference pixel filtering performed according to reference pixel distribution characteristics.

FIGS. 26a to 26b illustrate a case in which pixels of the same reference pixel layer as a filtering target reference pixel are used for reference pixel filtering. In this case, the type of filter used for the reference pixel filtering may or may not be the same according to the reference pixel layer.

In addition, when using multiple reference pixel layers, it may be possible to use not only pixels of the same reference pixel layer but also pixels of other reference pixel layers for reference pixel filtering in some reference pixel layers.

Figure 27:
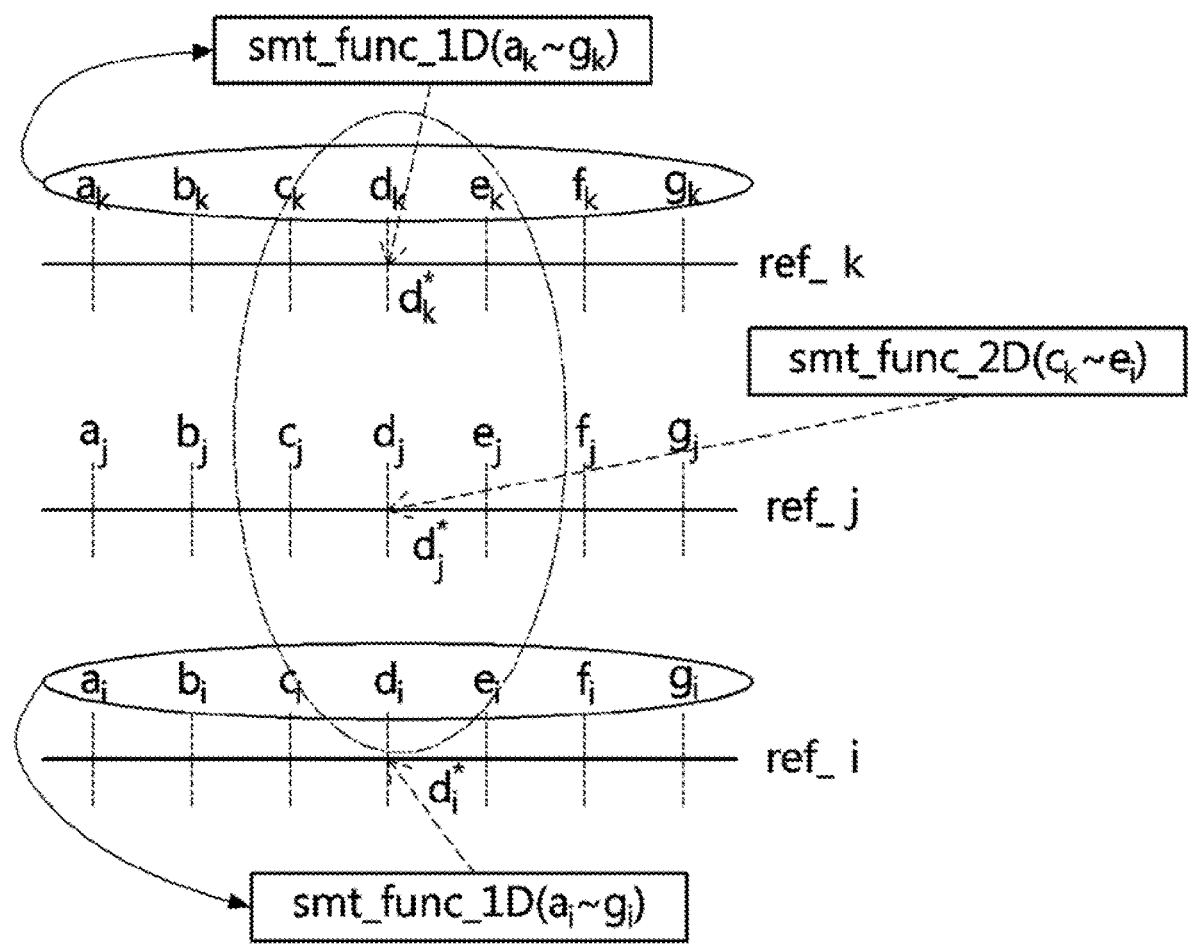
FIG. 27 is an exemplary diagram of using multiple reference pixel layers in reference pixel filtering according to an embodiment of the present invention.

FIG. 27 is an exemplary diagram of using multiple reference pixel layers in reference pixel filtering according to an embodiment of the present invention.

Referring to FIG. 27, first, filtering may be performed using pixels belonging to the same reference pixel layer in the reference pixel layers ref_k and ref_i, respectively. That is, the filtered pixel dk* may be obtained by performing filtering (defined by function smt_func_1D) on the target pixel dk and its adjacent pixels ak to gk in the reference pixel layer ref_k, and the filtered pixel di* may be obtained by performing filtering (defined by function smt_func_1D) on the target pixel di and its adjacent pixels ai to gi in the reference pixel layer ref_i.

In addition, when performing reference pixel filtering in the reference pixel layer ref_j, not only the same reference pixel layer ref_j but also pixels belonging to other reference pixel layers ref_i and ref_k spatially adjacent to the reference pixel layer ref_j may be used. In detail, the interpolated pixel dj* may be obtained by applying filtering (defined by smt_func_2D function) on spatially adjacent pixels (ck, dk, ek, cj, ej, ci, di, ei. that may be a filter having a 3×3 square mask) around the target pixel dj. However, the present invention is not limited to a 3×3 square shape, and a filter having a mask such as a 5×2 rectangular shape (bk, ck, dk, ek, fk, bj, cj, ej, fj), a 3×3 diamond shape (dk, cj, ej, di), or a 5×3 cross shape (dk, bj, cj, ej, fj, di) may be used around target pixel.

Herein, a reference pixel layer is composed of pixels belonging to a neighboring block adjacent to the current block and close to a boundary of a current block, as shown in FIGS. 18 to 22b. In consideration of this aspect, filtering using pixels in the same reference pixel layer in the reference pixel layer ref_k and the reference pixel layer ref_i may apply a filter in the form of a one-dimensional mask using pixels that are horizontally or vertically adjacent to an interpolation target pixel. However, an interpolation pixel for the reference pixel dj in the reference pixel layer ref_j may be obtained by applying a filter in the form of a two-dimensional mask using all adjacent pixels in spatially up/down/left/right directions.

In addition, the second reference pixel filtering may be applied to a reference pixel to which the first reference pixel filtering is applied in each reference pixel layer. For example, the first reference pixel filtering may be performed using reference pixels included in each reference pixel layer ref_k, ref_j, and ref_i, and in the reference pixel layer (referred to as ref_k*, ref_j*, and ref_i*) where the first reference pixel filtering is performed, reference pixel filtering may be performed using reference pixels of not only respective reference pixel layers but also other reference pixel layers.

The prediction block generation unit may generate a prediction block according to at least one intra prediction mode (or may be referred to simply as a prediction mode), and may use a reference pixel based on the prediction mode. In this case, the prediction block may be generated by extrapolating, interpolating, averaging (DC mode), or copying the reference pixel according to the prediction mode. Herein, the extrapolation may be applied to a directional mode among intra prediction modes, and the rest may be applied to a non-directional mode.

Meanwhile, when copying reference pixels, one or more prediction pixels may be generated by copying one reference pixel to multiple pixels in a prediction block, one or more prediction pixels may be generated by copying one or more reference pixels, and the number of the copied reference pixels may be equal to or less than the number of the copied prediction pixels. One or more prediction pixels may be generated by copying one or more reference pixels, and the number of copied reference pixels may be equal to or less than the number of copied prediction pixels.

In addition, although one prediction block may be generally generated for each prediction according to one intra prediction mode, the final prediction block may be generated by obtaining multiple prediction blocks and applying a weighted sum to the obtained plurality of prediction blocks. Herein, the plurality of prediction blocks may mean prediction blocks obtained according to a reference pixel layer.

The prediction mode determination unit of an encoding apparatus performs a process for selecting an optimal mode among multiple prediction mode candidate groups. In general, an optimal mode may be determined in terms of encoding cost by using a rate-distortion technique that predicts an amount of bits generated according to a block distortion {e.g., Distortion of the current block and the restore block. Sum of Absolute Difference (SAD), Sum of Square Difference, etc.} and a prediction mode. The prediction block generated based on the prediction mode determined through the above process may be transmitted to the subtractor and the adder (at this time, since a decoding apparatus may obtain information indicating the optimal prediction mode from the encoding apparatus, the process of selecting the optimal prediction mode may be omitted).

The prediction mode encoding unit of an encoding apparatus may encode an optimal intra prediction mode selected through the prediction mode determination unit. In this case, index information indicating an optimal prediction mode may be encoded as it is, or a prediction mode may be predicted through a prediction mode that can be obtained from another block, and prediction information (e.g., difference between a predicted prediction mode index and a prediction mode index of the current block) about the prediction mode may be encoded. Herein, the former case may be applied to a chrominance component and the latter case to a luminance component.

In the case of predicting and encoding an optimal prediction mode for a current block, a prediction value (or prediction information) for the prediction mode may be referred to as Most Probable Mode (MPM). In this case, the MPM is a prediction mode that is likely to be the optimal prediction mode for the current block, and may be configured as a preset prediction mode (e.g. DC, Planar, Vertical, Horizontal, Diagonal mode, etc.) or a prediction mode of a spatially adjacent block (e.g., left, top, top left, top right, bottom left block, etc.). Herein, the diagonal mode may mean a Diagonal up right, a Diagonal down right, and a Diagonal down left, and may correspond to modes 2, 18, and 34 of FIG. 17.

In addition, a mode derived from a prediction mode included in an MPM candidate group, which is a set of prediction modes that may be configured as the MPM, may be added as the MPM candidate group. In the case of a directional mode, the MPM candidate group may include a prediction mode having a preset index interval from the prediction mode included in the MPM candidate group. For example, in FIG. 17, when mode 10 is a mode included in the MPM candidate group, it may correspond to a mode in which modes 9, 11, 8, 12, etc. are derived.

The above example may correspond to a case in which the MPM candidate group is configured in multiple modes, and the MPM candidate group configuration (e.g., number of prediction modes included in the MPM candidate group, configuration priority) is determined according to an encoding/decoding setting (e.g., prediction mode candidate group, image type, block size, block shape, etc.) and may include at least one mode.

The priority of prediction modes to be included in an MPM candidate group may be set. The order of prediction modes to be included in the MPM candidate group may be determined according to set priority, and the MPM candidate group configuration may be completed by filling the prediction modes by a predetermined number. Herein, the priority may be set in order of a prediction mode of a block spatially adjacent to a current block to be predicted, a preset prediction mode, and a mode derived from a prediction mode first included in the MPM candidate group, but is not limited thereto.

More specifically, a priority may be set in the order of the left—top—bottom left—top right—top left blocks among spatially adjacent blocks, the priority may be set in the order of DC—Planar—Vertical—Horizontal mode among preset prediction modes, and an MPM candidate group may include a prediction mode obtained by adding +1, −1, and the like (an integer value) to an index value according to the prediction mode included in the MPM candidate group (corresponds to a prediction mode number according to FIG. 17). As one of such examples, the priority may be set in the order of left—top—DC—Planar—bottom left—top right—top left—(spatial adjacent block mode+1)–(spatial adjacent block mode−1)~horizontal—vertical—diagonal modes.

Although the priority of the configuration of the MPM candidate group is fixed in the above example, the priority may be adaptively determined according to a shape, size, and the like of the block.

When a prediction mode encoding of a current block is performed using MPM, information (e.g., most_probable_mode_flag) about whether the prediction mode matches the MPM may be generated.

When matching with the MPM (e.g., most_probable_mode_flag=1), MPM index information (e.g., mpm_idx) may be additionally generated according to a configuration of the MPM. For example, if the MPM is configured with one prediction mode, no additional MPM index information may be generated. If the MPM is configured with multiple prediction modes, index information corresponding to the prediction mode of the current block may be generated in the MPM candidate group.

When not matching with the MPM (e.g., most_probable_mode_flag=0), non-MPM index information (e.g., non_mpm_idx) corresponding to a prediction mode of the current block may be generated in a prediction mode candidate group (referred to as a non-MPM candidate group) other than the MPM candidate group among supported intra prediction modes. This may be an example of the case where the non-MPM is composed of one group.

When a non-MPM candidate group is composed of multiple groups, information about which group a prediction mode of a current block belongs to may be generated. For example, when the non-MPM is composed of groups A and B, if the prediction mode of the current block matches a prediction mode of the group A (e.g, non_mpm_A_flag=1), index information corresponding to the prediction mode of the current block may be generated in a candidate group of the A group. If there is no match (e.g., non_mpm_A_flag=0), index information corresponding to the prediction mode of the current block may be generated in a remaining prediction mode candidate group (or a candidate group of B group). As in the above example, the non-MPM may be composed of multiple groups, and the number of groups may be determined according to a prediction mode candidate group. For example, when a prediction mode candidate group is 35 or less, it may be one, or in other cases, two or more.

In this case, a specific A group may be composed of modes that are determined to have a high probability of matching a prediction mode of a current block except for an MPM candidate group. For example, prediction modes of the next rank that are not included in the MPM candidate group may be included in the A group, or directional modes having regular intervals may be included in the A group.

When a non-MPM is composed of multiple groups as in the above example, when the number of prediction modes is large and the prediction mode of the current block does not match an MPM, the amount of mode coding bits may be reduced.

When performing prediction mode encoding (or prediction mode decoding) of a current block using an MPM, a binarization table applied to each prediction mode candidate group (e.g., MPM candidate group, non-MPM candidate group, etc.) may be generated separately, and a binarization method applied to each candidate group may also be applied individually.

In the above examples, terms such as the MPM candidate group, the non-MPM candidate group, and the like are not limited thereto but only some terms used in the present invention. In detail, it is represented by information about which category belongs to and mode information in the category by classifying a current intra prediction mode into multiple categories. As another expression, it may also be possible to use terms such as the first MPM candidate group, the second MPM candidate group, and the like.

Figure 28:
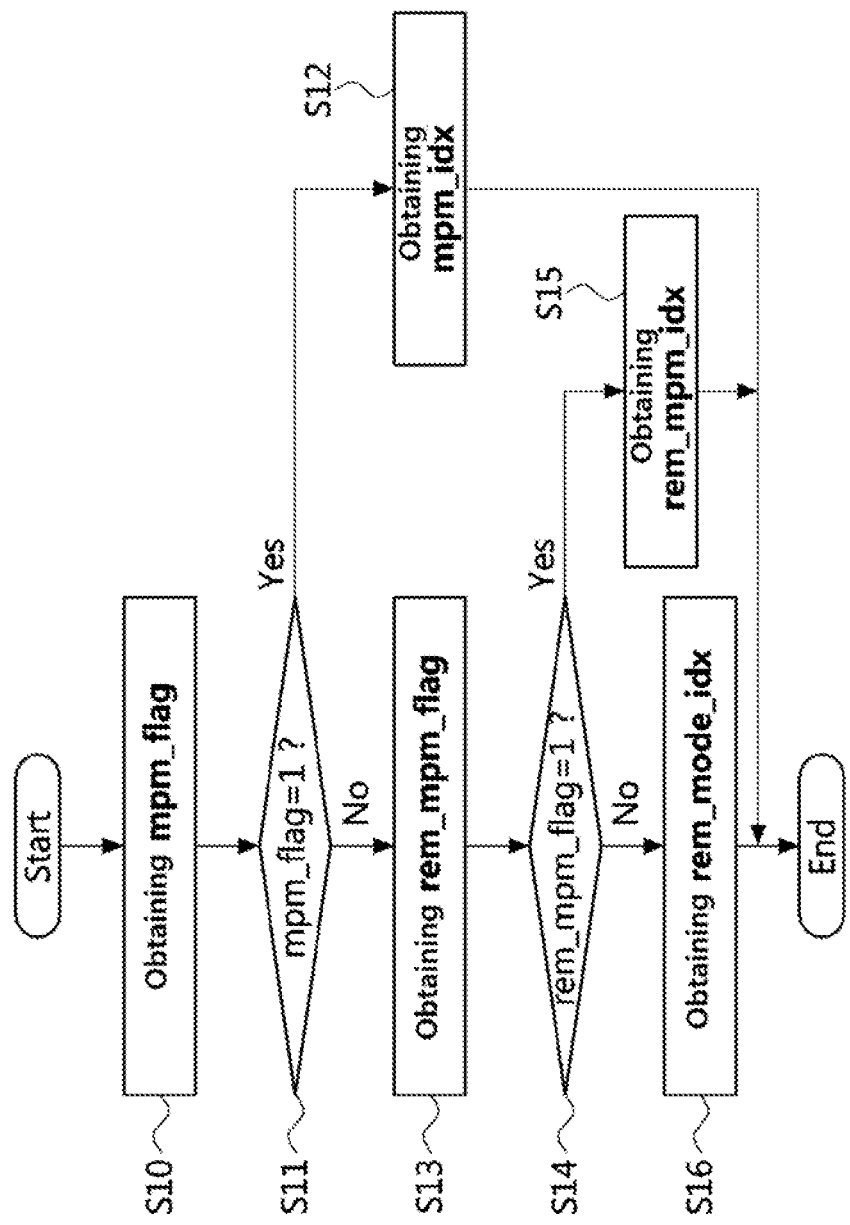
FIG. 28 is a block diagram for illustrating a encoding/decoding method for an intra prediction mode according to an embodiment of the present invention.

FIG. 28 is a block diagram for illustrating a encoding/decoding method for an intra prediction mode according to an embodiment of the present invention.

Referring to FIG. 28, first, mpm_flag is acquired (S10) to confirm whether it matches the first MPM (indicated by the mpm_flag) (S11), and if it matches, MPM index information (mpm_idx) is checked (S12). If it does not match the first MPM, rem_mpm_flag is acquired (S13) to confirm whether it matches the second MPM (indicated by the rem_mpm_flag), and if it matches, the second MPM index information (rem_mpm_idx) is checked (S16). If the second MPM does not match, index information (rem_mode_idx) for a candidate group configured with remaining prediction modes may be checked (S15). In the present example, although the index information generated according to whether the second MPM is matched is represented by the same syntax element, another mode encoding setting (for example, a binarization method or the like) may be applied, or the index information may be set differently and processed.

In the image decoding method according to an embodiment of the present invention, an intra prediction may be configured as follows. The intra prediction of a prediction unit may include decoding a prediction mode, constructing a reference pixel, and generating a prediction block. In addition, the image decoding apparatus may be configured to include a prediction mode decoding unit for decoding the prediction mode, a reference pixel construction unit for constructing the reference pixel, and a prediction block generation unit for generating the prediction block. Some of the processes described above may be omitted or other processes may be added, and may be changed in an order other than the order described above Since the reference pixel construction unit and the prediction block generation unit of the image decoding apparatus play the same role as the corresponding components of the image encoding apparatus, a detailed description thereof will be omitted. In addition, the prediction mode decoding unit may be performed by using the inverse method used by the prediction mode encoding unit.

Hereinafter, various embodiments of intra prediction according to a reference pixel configuration of a decoding apparatus will be described with reference to FIGS. 29 to 31. In this case, a description about the support of the reference pixel layer and the reference pixel filtering method described above with reference to the drawings should be interpreted to be equally applicable to a decoding apparatus, and detailed descriptions thereof will be omitted in order to prevent duplication.

Figure 29:
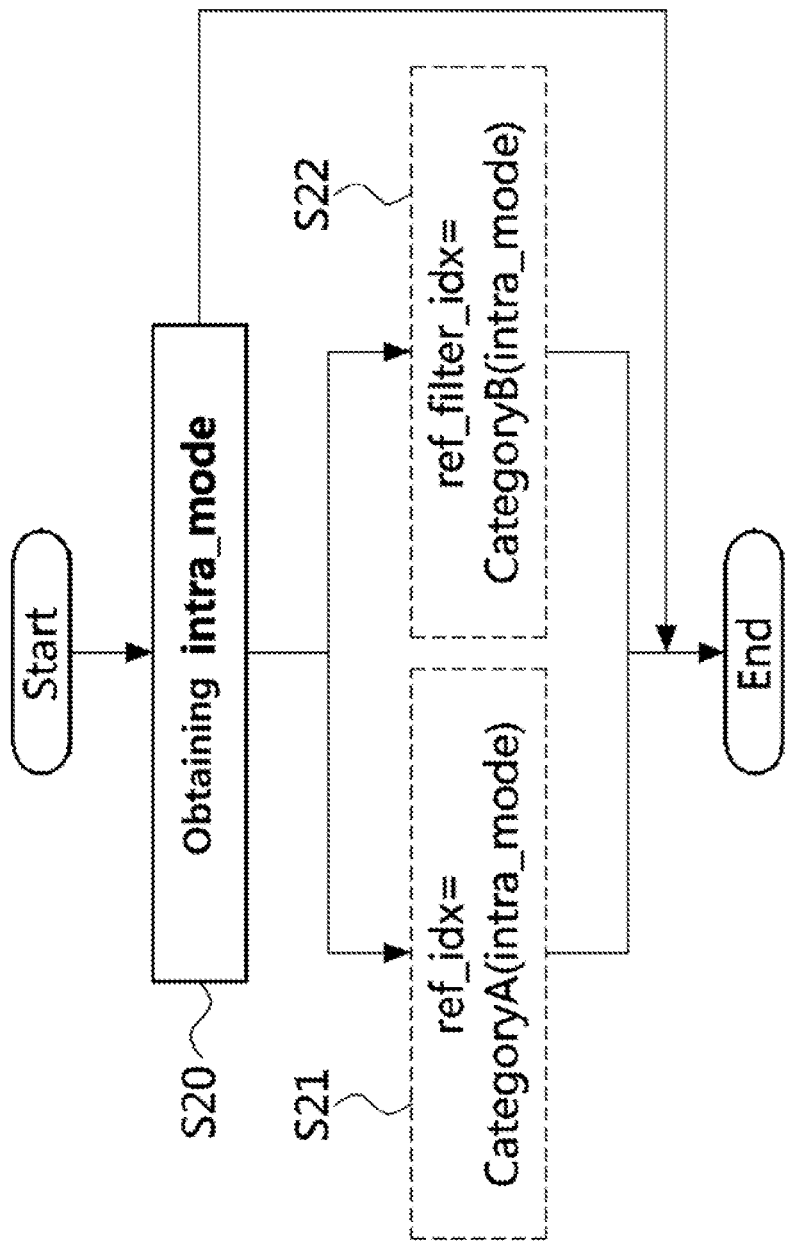
FIG. 29 is a first exemplary diagram for illustrating a bitstream configuration for intra prediction according to a reference pixel configuration.

FIG. 29 is a first exemplary diagram for illustrating a bitstream configuration for intra prediction according to a reference pixel configuration.

In the first exemplary diagram according to FIG. 29, It is assumed that multiple reference pixel layers are supported, at least one reference pixel layer among the supported reference pixel layers is used as reference pixels, and multiple candidate groups for reference pixel filtering are supported and one of them is selected.

After an encoder configures multiple reference pixel layers as reference pixels candidate group (in this example, completed until the process of reference pixel generation), reference pixel filtering and reference pixel interpolation are applied after configuring at least one reference pixel layer as reference pixels. At this time, multiple candidate groups for reference pixel filtering are supported.

A process for selecting an optimal mode among prediction mode candidate groups is performed. When the optimal prediction mode is determined, a prediction block according to the corresponding mode is generated and transmitted to the subtractor, and an encoding process for intra prediction information is performed. In this example, it is assumed that a reference pixel layer and reference pixel filtering are implicitly determined according to encoding information.

The decoder restores intra prediction information (e.g., prediction mode, etc.), generates a prediction block according to the reconstructed prediction mode, and delivers the prediction block to the subtractor. In this case, it is assumed that a reference pixel layer and reference pixel filtering for generating the prediction block are implicitly determined.

Referring to FIG. 29, a bitstream may be configured in one intra prediction mode (intra mode) (S20). In this case, the reference pixel layer ref_idx and the reference pixel filtering category ref_filter_idx that are supported (or used) in the current block may be implicitly determined (determined as Categories A and B, respectively, S21 to S22) according to the intra prediction mode. However, at this time, encoding/decoding information (e.g., image type, color component, block size, shape, etc.) may be additionally considered.

Figure 30:
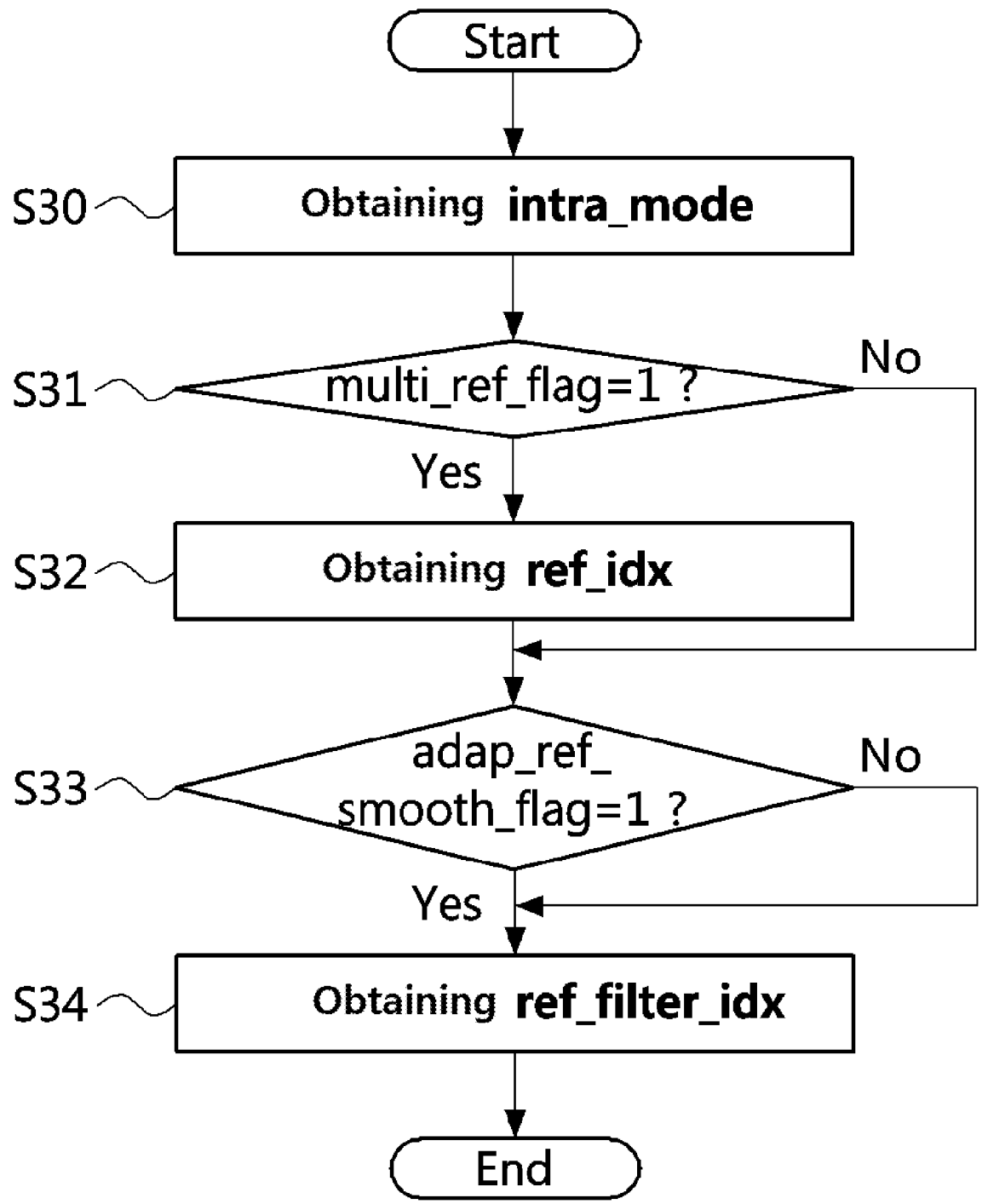
FIG. 30 is a second exemplary diagram for illustrating a bitstream configuration for intra prediction according to a reference pixel configuration.

FIG. 30 is a second exemplary diagram for illustrating a bitstream configuration for intra prediction according to a reference pixel configuration.

In the second exemplary diagram according to FIG. 30, it is assumed that multiple reference pixel layers are supported, and one reference pixel layer is used as reference pixels among multiple supported reference pixel layers. In addition, it is assumed that multiple candidate groups for reference pixel filtering are supported and one of the filters is selected. The difference from FIG. 29 is that the encoding apparatus explicitly generates the information about the selection.

If an encoder determines that multiple reference pixel layers are supported, reference pixel filtering and reference pixel interpolation are applied after one reference pixel layer is configured as reference pixels. In this case, multiple filtering methods related to reference pixel filtering are supported.

When the process of determining an optimal prediction mode for a current block in an encoder is performed, selecting an optimal reference pixel layer and optimal reference pixel filtering may be further considered for each prediction mode. When the optimal prediction mode, the optimal reference pixel layer, and reference pixel filtering for the current block are determined, the generated prediction block is transferred to the subtractor and an encoding process for intra prediction information is performed.

The decoder restores intra prediction information (e.g., information of prediction mode, reference pixel layer, reference pixel filtering, etc.), generates a prediction block using the reconstructed information, and delivers the prediction block to the subtractor. In this case, the reference pixel layer and the reference pixel filtering for generating the prediction block depend on a setting determined according to the information transmitted from an encoder.

Referring to FIG. 30, a decoder checks an optimal prediction mode for a current block through intra prediction mode (intra mode) information included in a bitstream (S30), and determine whether multiple reference pixel layers are supported (multi ref flag) (S31). If multiple reference pixel layers are supported, a reference pixel layer used for intra prediction may be determined by checking the reference pixel layer selection information ref_idx (S32). If multiple reference pixel layers are not supported, the process of obtaining reference pixel layer selection information ref_idx (S32) may be omitted.

Next, it is determined whether adaptive reference pixel filtering is supported (adap_ref_smooth_flag) (S33), and if the adaptive reference pixel filtering is supported, a filtering method for a reference pixel is determined through reference pixel filter information (ref_filter_idx) (S34).

Figure 31:
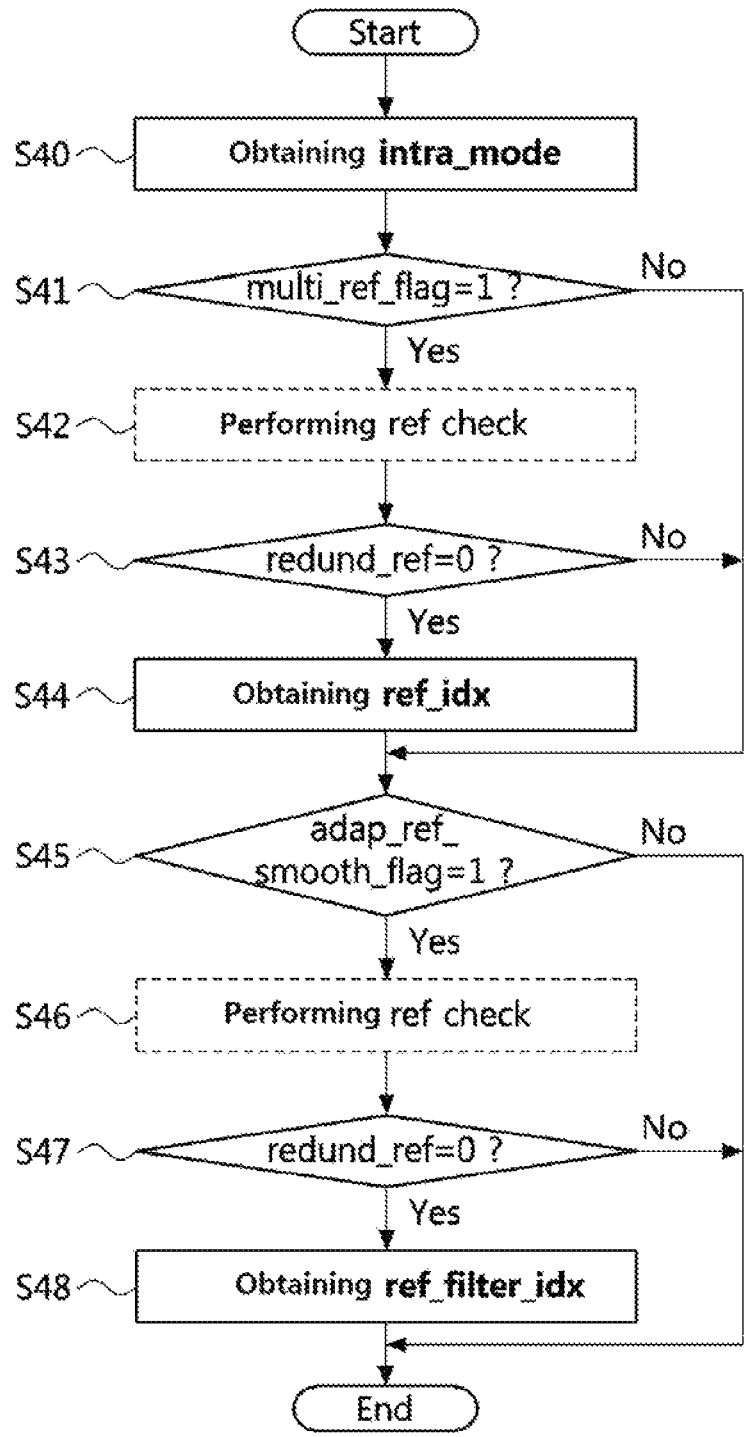
FIG. 31 is a third exemplary diagram for illustrating a bitstream configuration for intra prediction according to a reference pixel configuration.

FIG. 31 is a third exemplary diagram for illustrating a bitstream configuration for intra prediction according to a reference pixel configuration.

In the third exemplary view according to FIG. 31, it is assumed that multiple reference pixel layers are supported and one reference pixel layer is used among multiple reference pixel layers. It is also assumed that multiple candidate groups for reference pixel filtering are supported and one of them is selected. The difference from FIG. 30 is that the selection information is adaptively generated.

Reference pixel filtering and reference pixel interpolation are applied after configuring reference pixels using one reference pixel layer among multiple reference pixel layers supported by an encoder. In this case, a plurality of filtering related to the reference pixel filtering is supported.

When a process for selecting an optimal mode among multiple prediction mode candidate groups are performed, selecting an optimal reference pixel layer and selecting an optimal reference pixel filtering may be further considered for each prediction mode. When an optimal prediction mode, reference pixel layer, and reference pixel filtering are determined, a prediction block is generated and transmitted to the subtractor, and an encoding process of intra prediction related information is performed.

In this case, if a redundancy of the generated prediction block is checked, and if it is the same as or similar to a prediction block obtained by using another reference pixel layer, selection information on the optimal reference pixel layer may be omitted and a preset reference pixel layer may be used. In this case, the preset reference pixel layer may be a layer closest to the current block.

For example, the redundancy may be determined based on a difference value (distortion value) between the prediction block generated through ref_0 and the prediction block generated through ref_1 of FIG. 19C. If the difference value is smaller than a preset threshold, it may be determined that there is redundancy of the prediction block, otherwise it may be determined that there is no redundancy of the prediction block. In this case, the threshold may be adaptively determined according to a quantization parameter.

In addition, if optimal reference pixel filtering information also checks a redundancy of a prediction block and is the same or similar to a prediction block obtained by applying another reference pixel filtering, the reference pixel filtering information may be omitted and preset reference pixel filtering may be applied.

For example, it is determined whether a redundancy is based on a difference value between the prediction block obtained through filtering A (3-tap filter in this example) and the prediction block obtained through filtering B (5-tap filter in this example). In this case, when the difference value is smaller than a preset threshold value, it may be determined that there is a redundancy of a prediction block. if there is the redundancy of the prediction block, the prediction block may be generated through a preset reference pixel filtering method. Herein, the preset reference pixel filtering may be a filtering method having a low tap number or a low complexity, and may include a case in which filtering application is omitted.

The decoder reconstructs intra prediction related information (e.g., prediction mode, reference pixel layer information, reference pixel filtering information, etc.), generates the corresponding prediction block and transmits it to the subtractor. In this case, reference pixel layer information and reference pixel filtering for generating a prediction block are based on a setting determined according to information transmitted from an encoder, and the decoder directly checks (not through syntax elements) whether there is a redundancy, and if there is the redundancy, a preset method is used.

Referring to FIG. 31, a decoder may first check intra prediction mode (intra mode) information about a current block (S40) and check whether multiple reference pixel layers (multi-ref flag) are supported (S41). If multiple reference pixel layers are supported, a redundancy of the prediction block according to multiple supported reference pixel layers are checked (indicated by a ref check process, S42). If there is no redundancy of the prediction block as a result of the redundancy check (redund_ref=0, S43), the optimal reference pixel layer may be determined by referring to the selection information ref_idx for the reference pixel layer from the bit stream (S44).

Next, whether adaptive reference pixel filtering is supported (adap_ref_smooth_flag) is checked (S45), and if the adaptive reference pixel filtering is supported, a redundancy of a prediction block according to multiple supported reference pixel filtering methods are checked (ref check process, S46). If there is no redundancy of the prediction block (redund_ref=0, S47), an optimal reference pixel filtering method may be determined by referring to selection information (ref_filter_idx) of a reference pixel filtering method from a bitstream (S48).

In this case, in the drawing, redund_ref is a value indicating a result of redundancy check and a value of 0 indicates that there is no redundancy.

In addition, when there is a redundancy of a prediction block, a decoder may perform intra prediction using a preset reference pixel layer and a preset reference pixel filtering method.

Figure 32:
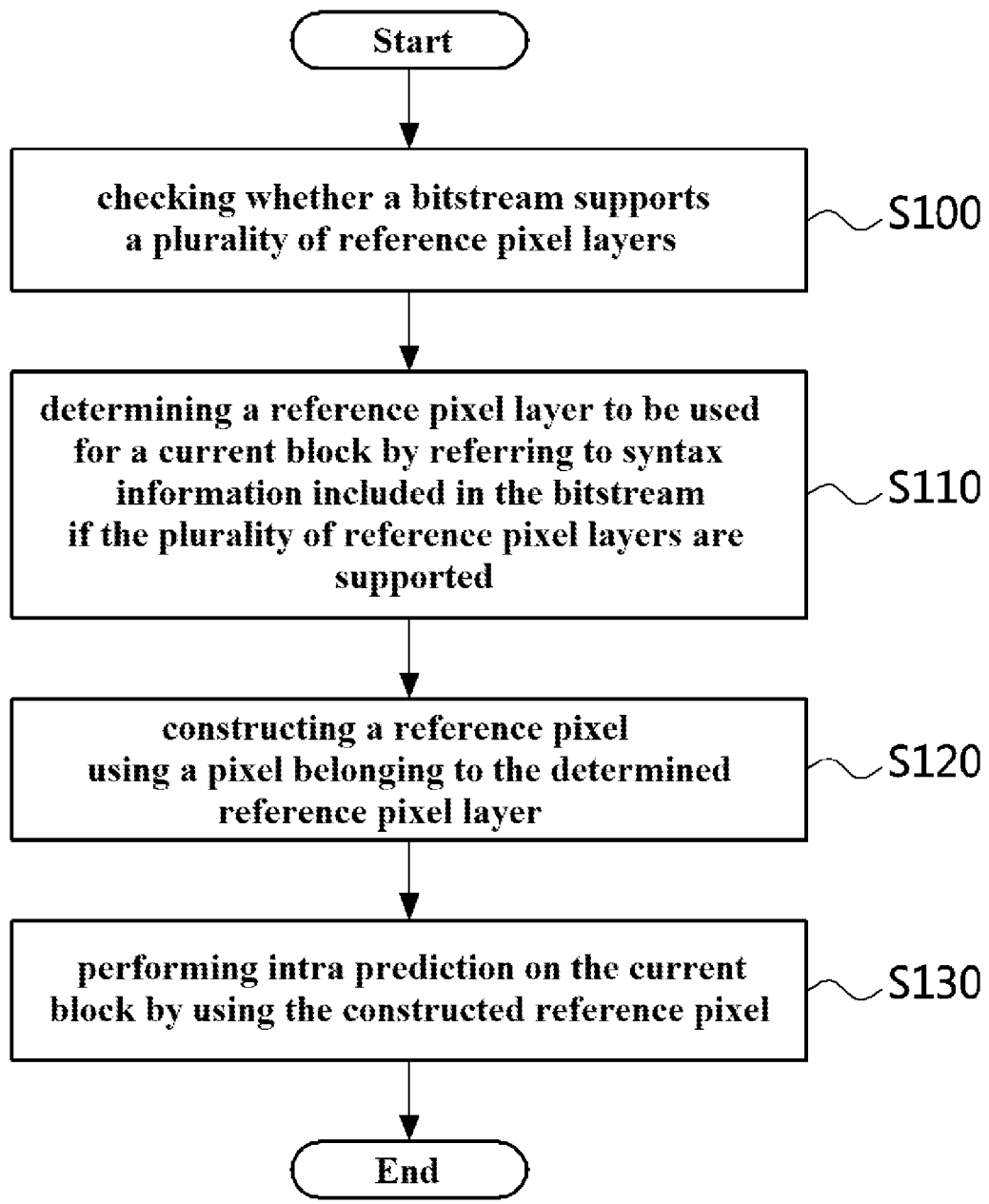
FIG. 32 is a flowchart for illustrating an image decoding method supporting multiple reference pixel layers according to an embodiment of the present invention.

FIG. 32 is a flowchart for illustrating an image decoding method supporting multiple reference pixel layers according to an embodiment of the present invention.

Referring to FIG. 32, an image decoding method supporting multiple reference pixel layers may include checking whether a bitstream supports multiple reference pixel layers (S100), determining a reference pixel layer to be used for a current block by referring to syntax information included in the bitstream if the plurality of reference pixel layers are supported (S110), constructing a reference pixel using a pixel belonging to the determined reference pixel layer (S120), and performing intra prediction on the current block by using the constructed reference pixel (S130).

Herein, after the checking of whether the plurality of reference pixel layers are supported (S100), the method may further include checking whether the bitstream supports an adaptive reference pixel filtering method.

Herein, after checking whether the plurality of reference pixel layers is supported (S100), if the plurality of reference pixel layers is not supported, the method may include configuring a reference pixel using the preset reference pixel layer.

The instructions that can be executed by various computer means and recorded on a computer readable medium. Computer-readable media may include, alone or in combination with program instructions, data files, data structures, and the like. The program instructions recorded on the computer readable medium may be those specially designed and constructed for the present invention, or may be known and available to those skilled in computer software.

Examples of computer readable media may include hardware devices specifically configured to store and execute program instructions, such as ROM, RAM, flash memory, and the like. Examples of program instructions may include high-level language code that can be executed by a computer using an interpreter as well as machine code such as produced by a compiler. The hardware device described above may be configured to operate with at least one software module to perform the operations of the present invention, and vice versa.

In addition, the above-described method or apparatus may be implemented by combining all or part of the configuration or function, or may be implemented separately.

Although described above with reference to a preferred embodiment of the present invention, those skilled in the art will appreciate that various modifications and changes can be made in the present invention without departing from the spirit and scope of the invention as set forth in the claims below.

The invention claimed is:

1. A method for decoding an image using a division unit, comprises:
    dividing an encoded image included in a received bitstream into at least one division unit by referring to a syntax obtained from the received bitstream;
    deriving an intra prediction mode of a current block in the division unit;
    deriving a reference sample layer of the current block from a plurality of reference sample layers;
    generating reference samples based on the derived reference sample layer; and
    generating a prediction sample of the current block based on the reference samples and the intra prediction mode,
    wherein the plurality of reference sample layers are included in reconstructed neighboring blocks of the current block, and
    wherein each of the reference sample layers of the current block has a different distance from a boundary of the current block.

2. The method of claim 1,
    wherein when the intra prediction mode is a non-directional mode, the prediction sample is generated by using only the reference sample layer having a shortest distance from the boundary of the current block.

3. The method of claim 2,
    wherein the non-directional mode is representative of a planar mode.

4. The method of claim 1,
    wherein the reference sample layer is derived based on a color component.

5. The method of claim 1,
    wherein a number of the plurality of reference sample layers is equal to or more than 3.

6. A method for encoding an image using a division unit, comprises:
    dividing the image into at least one division unit;
    determining an intra prediction mode of a current block in the division unit;
    determining a reference sample layer of the current block from a plurality of reference sample layers;
    generating reference samples based on the determined reference sample layer; and
    generating a prediction sample of the current block based on the reference samples and the intra prediction mode,
    wherein the plurality of reference sample layers are included in reconstructed neighboring blocks of the current block, and
    wherein each of the reference sample layers of the current block has a different distance from a boundary of the current block.

7. The method of claim 6,
    wherein when the intra prediction mode is a non-directional mode, the prediction sample is generated by using only the reference sample layer having a shortest distance from the boundary of the current block.

8. The method of claim 7,
    wherein the non-directional mode is representative of a planar mode.

9. The method of claim 6,
    wherein the reference sample layer is determined based on a color component.

10. The method of claim 6,
    wherein a number of the plurality of reference sample layers is equal to or more than 3.

11. A non-transitory computer readable storage medium storing information causing a decoding apparatus to perform operations comprising:
    dividing an encoded image included in a received bitstream into at least one division unit by referring to a syntax obtained from the received bitstream;
    deriving an intra prediction mode of a current block in the division unit;
    deriving a reference sample layer of the current block from a plurality of reference sample layers;
    generating reference samples based on the derived reference sample layer; and
    generating a prediction sample of the current block based on the reference samples and the intra prediction mode,
    wherein the plurality of reference sample layers are included in reconstructed neighboring blocks of the current block, and
    wherein each of the reference sample layers of the current block has a different distance from a boundary of the current block.

* * * * *